United States Patent
Kim et al.

(10) Patent No.: US 12,052,598 B2
(45) Date of Patent: *Jul. 30, 2024

(54) METHOD AND APPARATUS FOR PERFORMING EARLY FREQUENCY MEASUREMENT AND FAST REPORTING BY TERMINAL IN DISCONNECTED STATE IN NEXT GENERATION MOBILE COMMUNICATION SYSTEM

(71) Applicant: Samsung Electronics Co., Ltd., Suwon-si (KR)

(72) Inventors: Donggun Kim, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/882,822

(22) Filed: Aug. 8, 2022

(65) Prior Publication Data

US 2022/0377838 A1 Nov. 24, 2022

Related U.S. Application Data

(63) Continuation of application No. 16/780,245, filed on Feb. 3, 2020, now Pat. No. 11,412,401.

(30) Foreign Application Priority Data

Feb. 1, 2019 (KR) .................. 10-2019-0013662
Feb. 15, 2019 (KR) .................. 10-2019-0017618
(Continued)

(51) Int. Cl.
*H04W 76/30* (2018.01)
*H04W 24/10* (2009.01)
*H04W 76/20* (2018.01)

(52) U.S. Cl.
CPC ........... *H04W 24/10* (2013.01); *H04W 76/20* (2018.02); *H04W 76/30* (2018.02)

(58) Field of Classification Search
CPC ..... H04W 24/10; H04W 76/20; H04W 76/30; H04W 48/16; H04W 76/27
See application file for complete search history.

(56) References Cited

U.S. PATENT DOCUMENTS

| | | |
|---|---|---|
| 2016/0036541 A1 | 2/2016 | Siomina et al. |
| 2018/0368018 A1 | 12/2018 | Kim et al. |

(Continued)

FOREIGN PATENT DOCUMENTS

| | | |
|---|---|---|
| KR | 10-2018-0137385 A | 12/2018 |
| WO | 2014/168539 A1 | 10/2014 |

(Continued)

OTHER PUBLICATIONS

"Vivo, Corrections on the Idle State Measurement, R2-1817016, 3GPP TSG RAN WG2 Meeting #104, Spokane, USA, Nov. 2, 2018" (Year: 2018).*

(Continued)

*Primary Examiner* — Walli Z Butt
*Assistant Examiner* — Thad N Defauw
(74) *Attorney, Agent, or Firm* — Jefferson IP Law, LLP

(57) ABSTRACT

The disclosure relates to a communication method and system for converging a 5th-Generation (5G) communication system for supporting higher data rates beyond a 4th-Generation (4G) system with a technology for Internet of Things (IoT). The disclosure may be applied to intelligent services based on the 5G communication technology and the IoT-related technology, such as smart home, smart building, smart city, smart car, connected car, health care, digital education, smart retail, security and safety services. The disclosure discloses a method and apparatus for performing (Continued)

early frequency measurement and fast reporting a result of frequency measurement.

20 Claims, 21 Drawing Sheets

(30) Foreign Application Priority Data

Feb. 28, 2019 (KR) ........................ 10-2019-0023646
Jul. 29, 2019 (KR) ........................ 10-2019-0091571

(56) References Cited

U.S. PATENT DOCUMENTS

| | | | |
|---|---|---|---|
| 2019/0037425 A1 | 1/2019 | Hong et al. | |
| 2019/0037635 A1 | 1/2019 | Guo et al. | |

FOREIGN PATENT DOCUMENTS

| | | | | |
|---|---|---|---|---|
| WO | 2020/034568 A1 | 2/2020 | | |
| WO | WO-2020034568 A1 | * 2/2020 | ........... | H04L 5/0053 |

OTHER PUBLICATIONS

International Search Report and Written Opinion dated May 13, 2020, Issued in International Application No. PCT/KR2020/001583.
Vivio, 'Corrections on the Idle State Measurement', R2-1817016, 3GPP TSG RAN WG2 Meeting #104, Spokane, USA, Nov. 2, 2018.
Huawei et al., 'Correction on T331 description', R2-1817437, 3GPP TSG RAN WG2 Meeting #104, Spokane, USA, Nov. 2, 2018.
Huawei et al., 'Correction on triggering idle mode measurement', R2-1817425, 3GPP TSG RAN WG2 Meeting #104, Spokane, USA, Nov. 2, 2018.
Nokia et al., 'Using Idle mode measurements with s-Measure', R2-1816592, 3GPP TSG RAN WG2 Meeting #104, Spokane, USA, Nov. 2, 2018.
European Search Report dated Jan. 14, 2022; European Appln. No. 20748185.4-1212/ 3892027 PCT/KR2020001583.
Indian Office Action dated Feb. 15, 2023; Indian Appln. No. 202137032231.
Indian Hearing Notice dated Jan. 28, 2024, issued in Indian Patent Application No. 202137032231.
Chinese Office Action dated Feb. 18, 2024, issued in Chinese Patent Application No. 202080007774.0.

* cited by examiner

FIG. 2I
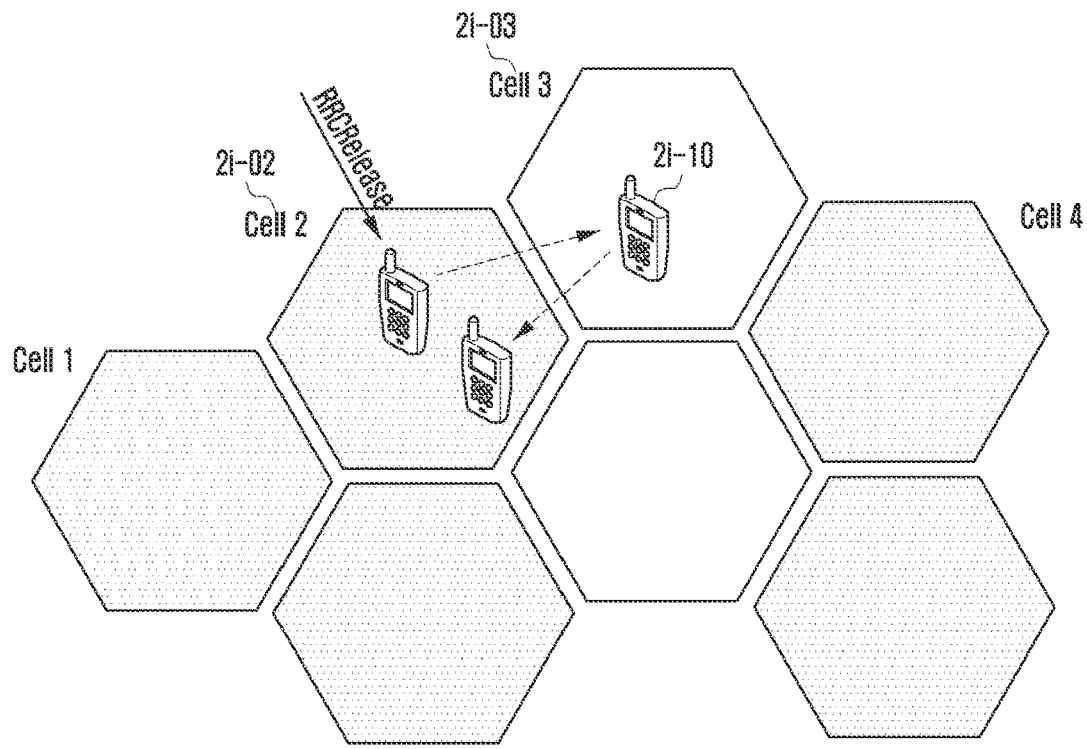
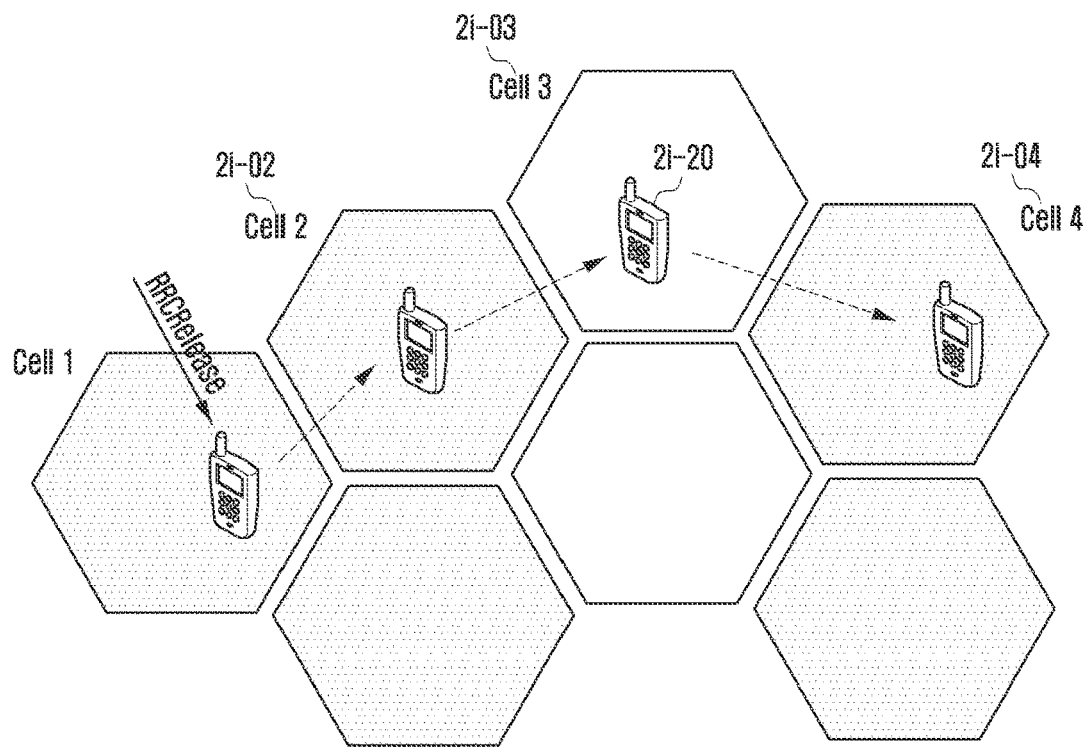

METHOD AND APPARATUS FOR PERFORMING EARLY FREQUENCY MEASUREMENT AND FAST REPORTING BY TERMINAL IN DISCONNECTED STATE IN NEXT GENERATION MOBILE COMMUNICATION SYSTEM

CROSS-REFERENCE TO RELATED APPLICATION(S)

This application is a continuation application of prior application Ser. No. 16/780,245, filed on Feb. 3, 2020, which is based on and claims priority under 35 U.S.C. § 119(a) of a Korean patent application number 10-2019-0013662, filed on Feb. 1, 2019, in the Korean Intellectual Property Office, of a Korean patent application number 10-2019-0017618, filed on Feb. 15, 2019, in the Korean Intellectual Property Office, of a Korean patent application number 10-2019-0023646, filed on Feb. 28, 2019, in the Korean Intellectual Property Office, and of a Korean patent application number 10-2019-0091571, filed on Jul. 29, 2019, in the Korean Intellectual Property Office, the disclosure of each of which is incorporated by reference herein in its entirety.

BACKGROUND

1. Field

The disclosure relates to a method and apparatus for performing early frequency measurement and fast reporting of a result of frequency measurement by a terminal in a disconnected mode in a next generation mobile communication system.

2. Description of Related Art

To meet the demand for wireless data traffic having increased since deployment of 4th-Generation (4G) communication systems, efforts have been made to develop an improved 5th-Generation (5G) or pre-5G communication system. Therefore, the 5G or pre-5G communication system is also called a 'Beyond 4G Network' or a 'Post Long Term Evolution (LTE) System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid frequency-shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Various researches have been made to improve an operation related to frequency measurement of a terminal in a next generation communication system.

The above information is presented as background information only to assist with an understanding of the disclosure. No determination has been made, and no assertion is made, as to whether any of the above might be applicable as prior art with regard to the disclosure.

SUMMARY

In order to support a service having a high data transmission rate and a low transmission latency in a next generation wireless communication, a base station is required to rapidly configure a carrier aggregation (CA) technology or a dual connectivity (DC) technology in a terminal. However, in order to configure the CA or DC technology in the terminal, a result of frequency measurement of the terminal is required. Therefore, in order for a base station to configure the CA or DC technology in the terminal, a method for rapidly receiving a report on a result of frequency measurement of the terminal is required.

In order to enable the terminal to rapidly report a result of frequency measurement, the terminal may be allowed to perform the frequency measurement in a radio resource control (RRC) idle mode or an RRC inactive mode. However, a terminal in the RRC idle mode or the RRC inactive mode may perform a cell reselection procedure while mobile. In addition, a cell, on which the terminal newly camps according to the movement of the terminal, may broadcast different pieces of system information, and may support different functions. Therefore, if the terminal camps on a cell that cannot report a measurement result because the cell does not support frequency measurement in the RRC idle mode or the RRC inactive mode, the terminal may perform unnecessary frequency measurement. In addition, if the terminal rapidly moves, a problem of reporting a result of frequency measurement, which is measured in one cell, to another cell may occur.

Aspects of the disclosure are to address at least the above-mentioned problems and/or disadvantages and to provide at least the advantages described below. Accordingly, an aspect of the disclosure is to provide a method of a terminal in a wireless communication system, the terminal in the wireless communication system, and a base station in the wireless communication system.

Additional aspects will be set forth in part in the description which follows and, in part, will be apparent from the description, or may be learned by practice of the presented embodiments.

In accordance with an aspect of the disclosure, a method performed by a terminal is provided. The method includes receiving, from a base station, a control message including first information on a measurement to be performed while in an RRC idle state or an RRC inactive state, identifying whether the first information includes a first list of carriers to be measured during the RRC idle state or the RRC inactive state, receiving a system information block 5 (SIB5) including second information on a measurement to be performed while in the RRC idle state or the RRC inactive state, in case that the information does not include the first list, storing a second list of carriers to be measured during the RRC idle state or the RRC inactive state which is included in the second information, and performing an idle mode measurement based on the second list included in the second information.

In accordance with another aspect of the disclosure, a method performed by a base station is provided. The method includes generating a control message for a terminal, and transmitting, to the terminal, the control message including first information on a measurement to be performed while in an RRC idle state or an RRC inactive state, wherein whether the first information includes a first list of carriers to be measured during the RRC idle state or the RRC inactive state is identified, wherein a system information block 5 (SIB5) including second information on a measurement to be performed while in the RRC idle state or the RRC inactive state is transmitted to the terminal, in case that the information does not include the first list, wherein a second list of carriers to be measured during the RRC idle state or the RRC inactive state which is included in the second information is stored in the terminal, and wherein an idle mode measurement is performed by the terminal based on the second list included in the second information.

In accordance with another aspect of the disclosure, a terminal is provided. The terminal includes a transceiver configured to transmit and receive a signal, and a controller configured to receive, from a base station, a control message including first information on a measurement to be performed while in an RRC idle state or an RRC inactive state, identify whether the first information includes a first list of carriers to be measured during the RRC idle state or the RRC inactive state, receive a system information block 5 (SIB5) including second information on a measurement to be performed while in the RRC idle state or the RRC inactive state, in case that the information does not include the first list, store a second list of carriers to be measured during the RRC idle state or the RRC inactive state which is included in the second information, and perform an idle mode measurement based on the second list included in the second information.

In accordance with another aspect of the disclosure, a base station is provided. The base station includes a transceiver configured to transmit and receive a signal, and a controller configured to generate a control message for a terminal, and transmit, to the terminal, the control message including first information on a measurement to be performed while in an RRC idle state or an RRC inactive state, wherein whether the first information includes a first list of carriers to be measured during the RRC idle state or the RRC inactive state is identified, wherein a system information block 5 (SIB5) including second information on a measurement to be performed while in the RRC idle state or the RRC inactive state is transmitted to the terminal, in case that the information does not include the first list, wherein a second list of carriers to be measured during the RRC idle state or the RRC inactive state which is included in the second information is stored in the terminal, and wherein an idle mode measurement is performed by the terminal based on the second list included in the second information.

The disclosure proposes a method for enabling a terminal to report a result of neighboring frequency measurement to a base station in a next generation mobile communication system, thereby enabling the base station to rapidly configure a frequency aggregation technology or a dual connectivity technology in the terminal. Specifically, in the disclosure, before the terminal establishes a connection with a network, the terminal performs frequency measurement based on preconfigured frequency configuration information, and if the terminal establishes a connection with the network, the disclosure enables the terminal to immediately report a result of frequency measurement, thereby enabling rapid configuration of a CA technology or a DC technology in the terminal.

In addition, if a terminal in an RRC idle mode or an RRC inactive mode is mobile and performs a cell reselection procedure, the disclosure proposes a procedure for, based on the system information, stopping or restarting frequency measurement in the RRC idle mode or the RRC inactive mode or discarding a result of the frequency measurement. Therefore, the disclosure can solve a problem in which a terminal unnecessarily performs frequency measurement and a problem in which the terminal reports a result of the frequency measurement, measured in another cell, to a current cell.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1I illustrates a block configuration of a transmission and reception point (TRP) in a wireless communication system according to an embodiment of the disclosure;

FIG. 2I illustrates a problem in which, in a case where a UE performs frequency measurement in an RRC idle mode or an RRC inactive mode, if the UE shortly camps on a cell that does not support frequency measurement in the RRC idle mode or the RRC inactive mode and returns to a cell that supports the same, the UE no longer performs frequency measurement according to an embodiment of the disclosure;

Throughout the drawings, like reference numerals will be understood to refer to like parts, components, and structures.

DETAILED DESCRIPTION

Figure 1A:
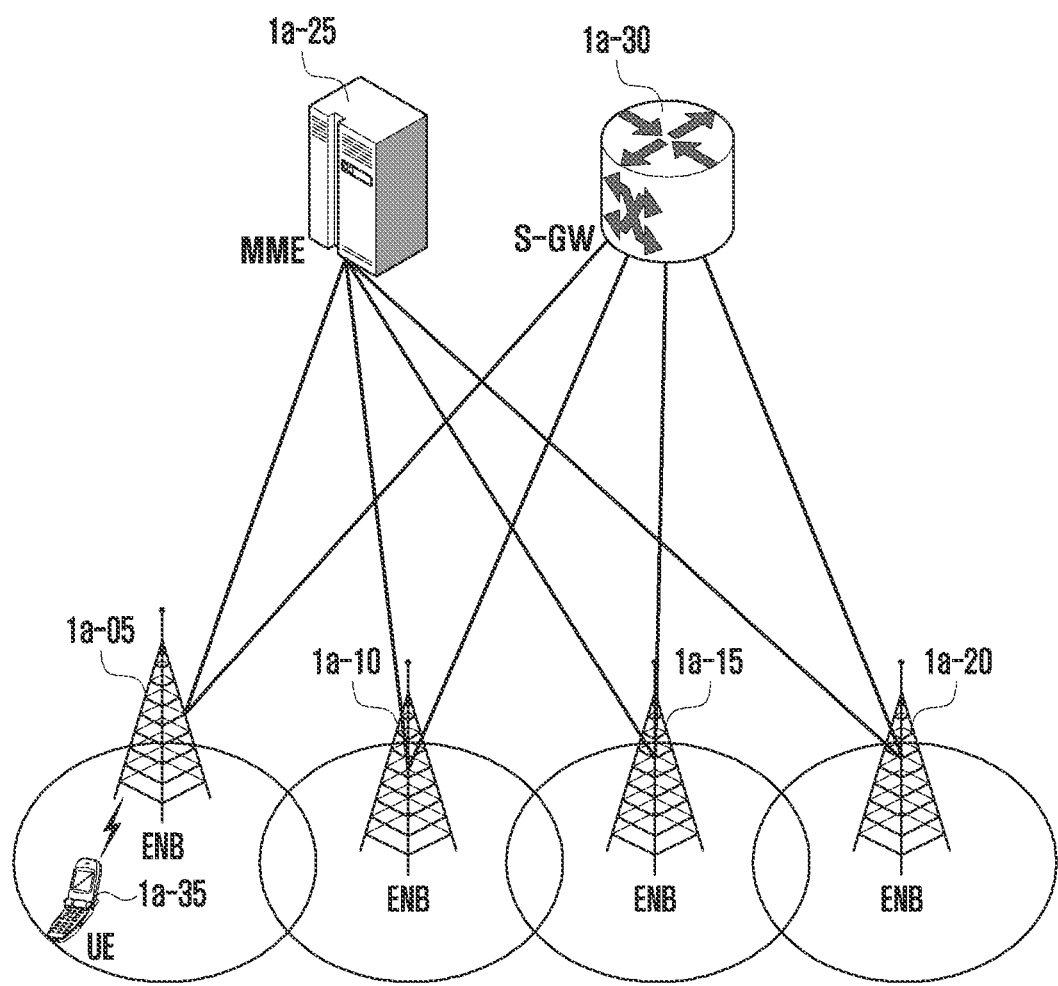
FIG. 1A illustrates the structure of a long term evolution (LTE) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

Each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to be executed by one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more CPUs within a device or a security multimedia card.

Terms used to identify access nodes, terms referring to network entities, terms referring to messages, terms referring to interfaces between network objects, and terms referring to various pieces of identification information used in the following description are illustrated for convenience of explanation. Therefore, the disclosure may not be limited by the terminologies provided below, and other terms that indicate objects having equivalent technical meanings may be used.

For convenience of explanation, the disclosure uses terms and names defined in a 3rd generation partnership project long term evolution (3GPP LTE) standard. However, the disclosure is not limited to the above terms and names, and may be equally applied to systems conforming to other standards. In the disclosure, an evolved node B (eNB) may be used interchangeably with a next generation node B (gNB) for convenience of explanation. That is, a base station described as an eNB may indicate a gNB.

First Embodiment

FIG. 1A illustrates the structure of an LTE system according to an embodiment of the disclosure.

Referring to FIG. 1A, a radio access network of an LTE system includes next generation base stations (also referred to as evolved node Bs, hereinafter eNBs, node Bs, or base stations) 1a-05, 1a-10, 1a-15, and 1a-20, a mobility management entity (MME) 1a-25, and a serving gateway (S-GW) 1a-30. A user equipment (hereinafter UE or terminal) 1a-35 accesses an external network through the eNBs 1a-05 to 1a-20 and S-GW 1a-30.

In FIG. 1A, the eNBs 1a-05 to 1a-20 correspond to an existing node B of an UMTS system. The eNBs 105, 110, 15 or 120 are connected to the UE 1a-35 through a radio channel, and perform a more complicated role than the existing node B. In the LTE system, since all user traffics including a real-time service, such as voice over IP (VoIP), via the Internet protocol, are serviced through a shared channel, a device that performs schedules by collecting state information, such as buffer states, available transmit power states, and channel states of UEs, is required, and eNBs 1a-05 to 1a-20 are in charge of such a function of the device. In general, one eNB controls a plurality of cells. For example, in order to implement a transmission rate of 100 Mbps, the LTE system uses an orthogonal frequency division multiplexing (OFDM) as a radio access technology in the bandwidth of 20 MHz. In addition, the LTE system adopts an adaptive modulation & coding (AMC) scheme for determining a modulation scheme and a channel coding rate based on the channel state of the UE. The S-GW 1a-30 is a device for providing a data bearer and generating or removing a data bearer under a control of the MME 1a-25. The MME is in charge of various control functions in addition to a mobility management function for the UE, and is connected to a plurality of base stations.

Figure 1B:
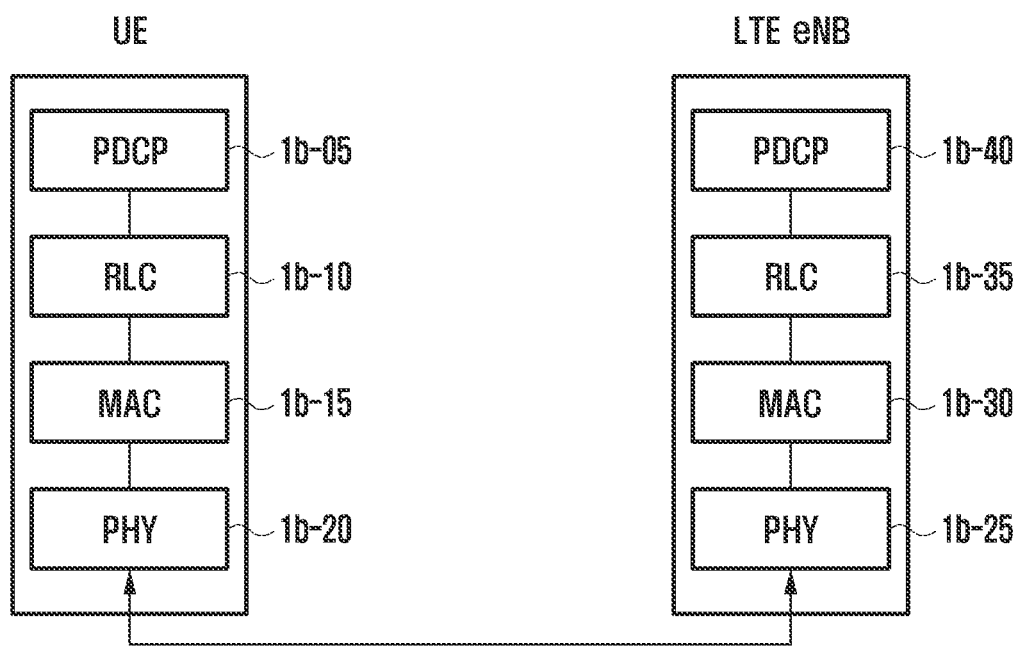
FIG. 1B illustrates a radio protocol architecture in an LTE system according to an embodiment of the disclosure.

FIG. 1B illustrates a radio protocol architecture in an LTE system according to an embodiment of the disclosure.

Referring to FIG. 1B, the radio protocol of the LTE system includes packet data convergence protocols (PDCPs) 1b-05 and 1b-40, radio link controls (RLCs) 1b-10 and 1b-35, and medium access controls (MACs) 1b-15 and 1b-30, in a UE and an eNB, respectively. The packet data convergence protocols (PDCPs) 1b-05 and 1b-40 are in charge of an operation, such as IP header compression/restoration. The main functions of PDCPs are summarized as follows.

Header compression and decompression: robust header compression (ROHC) only

Transfer of user data

In-sequence delivery of higher layer protocol data units (PDUs) in a PDCP re-establishment procedure for RLC acknowledged mode (AM)

Sequence reordering function (For split bearers in DC (only support for RLC AM): PDCP PDU routing for transmission and PDCP PDU reordering for reception)

Duplicate detection of lower layer service data units (SDUs) in a PDCP re-establishment procedure for RLC AM Retransmission of PDCP SDUs at handover and, for split bearers in DC, of PDCP PDUs at PDCP data-recovery procedure, for RLC AM)

Ciphering and deciphering

Timer-based SDU discard function in uplink

The radio link controls (hereinafter referred to as RLCs) 1b-10 and 1b-35 may reconfigure a PDCP packet data unit (PDU) in a suitable size and perform an automatic repeat and request (ARQ) operation. The main functions of RLCs are summarized as follows.

Transfer of higher layer PDUs

ARQ function (Error Correction through ARQ (only for AM data transfer))

Concatenation, segmentation and reassembly of RLC SDUs (only for unacknowledged mode (UM) and AM data transfer)

Re-segmentation of RLC data PDUs (only for AM data transfer)

Reordering of RLC data PDUs (only for UM and AM data transfer)

Duplicate detection (only for UM and AM data transfer)

Protocol error detection (only for AM data transfer)

RLC SDU discard (only for UM and AM data transfer)

RLC re-establishment

The MACs 1b-15 and 1b-30 are connected to multiple RLC layer entities configured in one terminal, and may perform an operation of multiplexing RLC PDUs with a MAC PDU and demultiplexing the RLC PDUs from the MAC PDU. The main functions of the MAC are summarized as follows.

Mapping between logical channels and transport channels
    Multiplexing/demultiplexing of MAC SDUs belonging to one or different logical channels into/from transport blocks (TB) delivered to/from the physical layer on transport channels
    Scheduling information reporting
    Error correction through hybrid automatic repeat request (HARQ)
    Priority handling between logical channels of one UE
    Priority handling between UEs by means of dynamic scheduling
    Multimedia broadcast and multicast service (MBMS) identification
    Transport format selection
    Padding Physical layers 1b-20 and 1b-25 may perform an operation of channel coding and modulating higher layer data, generating the higher layer data into an OFDM symbol, transmitting the OFDM symbol through a radio channel, or demodulating an OFDM symbol received through a radio channel, channel-decoding the OFDM symbol, and transmitting the OFDM symbol to a higher layer.

Figure 1C:
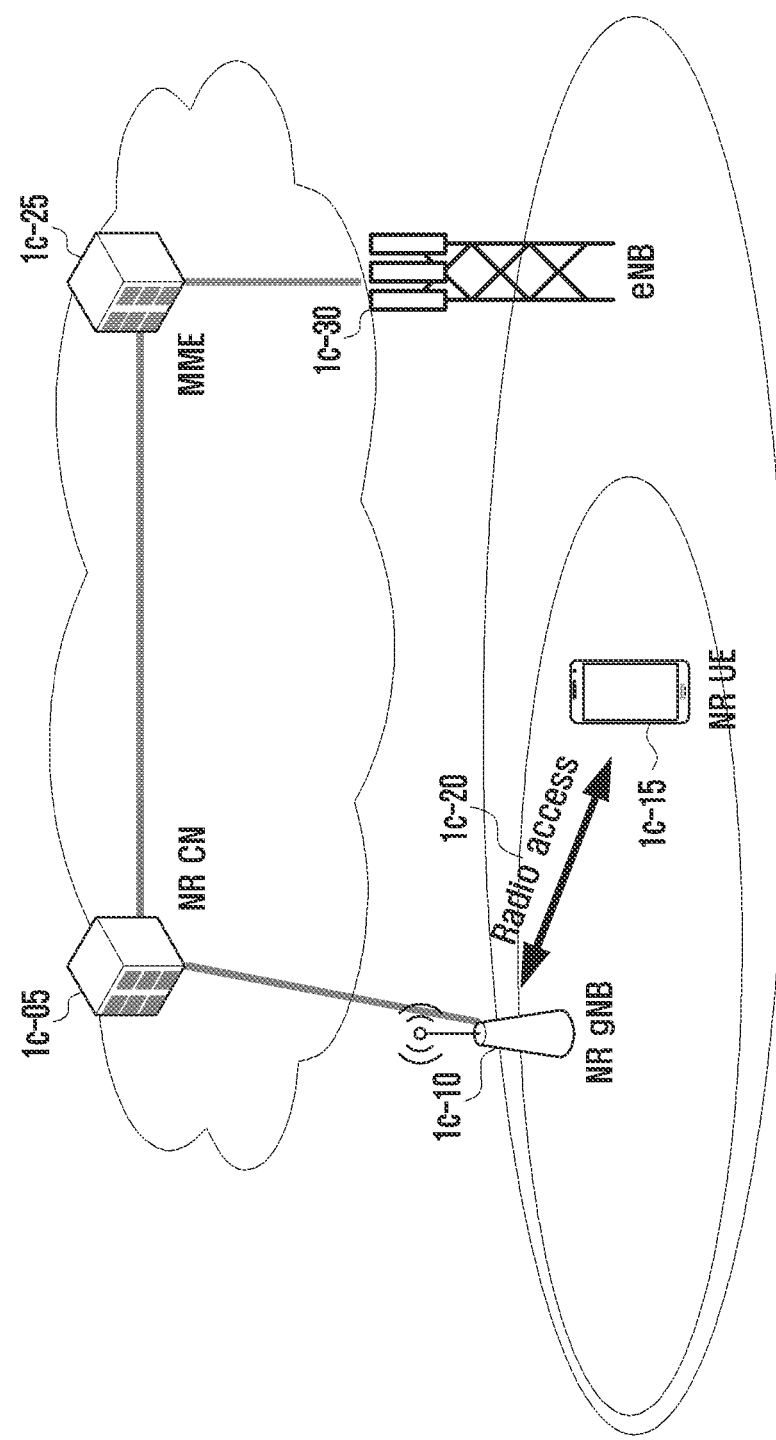
FIG. 1C illustrates a structure of a next generation mobile communication system according to an embodiment of the disclosure.

FIG. 1C illustrates a structure of a next generation mobile communication system according to an embodiment of the disclosure.

Referring to FIG. 1C, a radio access network of a next generation mobile communication system (hereinafter referred to as NR or 5G) includes a new radio node B (hereinafter referred to as NR gNB or NR base station) 1c-10 and a new radio core network (NR CN) 1c-05. A user terminal (a new radio user equipment, hereinafter referred to as NR UE or a terminal) 1c-15 accesses an external network via NR gNB 1c-10 (indicated by reference numeral 1c-20) and NR CN 1c-05.

In FIG. 1C, the NR gNB 1c-10 corresponds to an evolved node B (eNB) of the existing LTE system. The NR gNB is connected to the NR UE 1c-15 via a radio channel and may provide an excellent service as compared to the existing node B. In the next generation mobile communication system, since all types of user traffics are serviced through a shared channel, there is a need for a device for performing scheduling by collecting state information, such as buffer states, available transmission power states, and channel states of UEs. Further, the NR NB 1c-10 is in charge of such function of the device. In general, one NR gNB typically controls a plurality of cells. In order to implement ultra-high speed data transmission as compared to the existing LTE, the NR gNB may have the existing maximum bandwidth or more, and may additionally employ beamforming technology using an orthogonal frequency division multiplexing (OFDM) as a radio access technology. In addition, the NR gNB adopts an AMC scheme that determines a modulation scheme and a channel coding rate based on the channel state of a UE. The NR CN 1c-05 performs functions, such as mobility support, a bearer configuration, a quality of service (QoS) configuration, and the like. The NR CN 1c-05 is a device that is in charge of various control functions in addition to a mobility management function for a UE, and is connected to a plurality of base stations. In addition, the next generation mobile communication system may also operate in conjunction with the existing LTE system, and the NR CN is connected to an MME 1c-25 via a network interface. The MME is connected to an eNB 1c-30, that is, the existing base station.

Figure 1D:
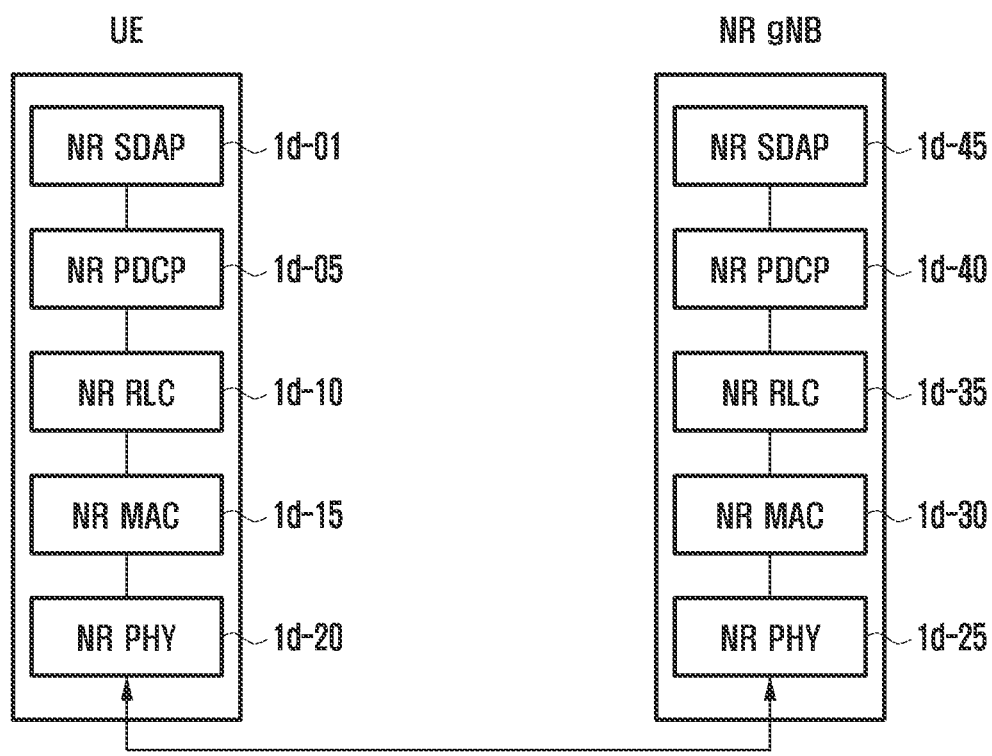
FIG. 1D illustrates a radio protocol architecture of a next generation mobile communication system according to an embodiment of the disclosure.

FIG. 1D illustrates a radio protocol architecture of a next generation mobile communication system according to an embodiment of the disclosure.

Referring to FIG. 1D, the radio protocol of the next generation mobile communication system includes NR service data adaptation protocols (NR SDAPs) 1d-01 and 1d-45, NR PDCPs 1d-05 and 1d-40, NR RLCs 1d-10 and 1d-35, and NR MACs 1d-15 and 1d-30, respectively, in a UE and an NR base station.

The main functions of the NR SDAPs 1d-01 and 1d-45 may include some of the following functions.

Transfer of user plane data
    Mapping between a QoS flow and a data bearer (DRB) for both uplink (UL) and downlink (DL)
    Marking QoS flow identifier (ID) in both UL and DL packets
    Mapping reflective QoS flow to data bearer for UL SDAP PDUs.

A UE may receive a configuration, such as whether to use the header of an SDAP layer entity or the function of the SDAP layer entity, through an RRC message, for each PDCP layer entity, for each bearer, or for each logical channel. If the SDAP header is configured, the UE may be indicated to update or reconfigure mapping information between a QoS flow and a data bearer for the uplink and downlink, through a non-access stratum (NAS) QoS reflection configuration 1-bit indicator (NAS reflective QoS) and an access stratum (AS) QoS reflection configuration 1-bit indicator (AS reflective QoS) of the SDAP header. The SDAP header may include QoS flow ID information indicating QoS. The QoS information may be used as data processing priority, scheduling information, and the like to support a smooth service.

The main function of the NR PDCPs 1d-05 and 1d-40 may include some of the following functions.

Header compression and decompression (ROHC only)
    Transfer of user data
    In-sequence delivery of higher layer PDUs
    Out-of-sequence delivery of higher layer PDUs
    PDCP PDU reordering for reception
    Duplicate detection of lower layer SDUs
    Retransmission of PDCP SDUs
    Ciphering and deciphering
    Timer-based SDU discard in uplink The reordering function of the NR PDCP device refers to a function of sequentially reordering PDCP PDUs, received from a lower layer, based on a PDCP sequence number (SN), and may include a function of transmitting data to a higher layer in the sequence of reordering, a function of directly transmitting data to a higher layer without taking the sequence into consideration, a function of reordering the sequence and recording missing PDCP PDUs, a function of providing a state report on the missing PDCP PDUs to a transmission side, and a function of requesting retransmission for the missing PDCP PDUs.

The main functions of the NR RLCs 1d-10 and 1d-35 may include some of the following functions.

Transfer of higher layer PDUs
    In-sequence delivery of higher layer PDUs
    Out-of-sequence delivery of higher layer PDUs
    Error Correction through ARQ
    Concatenation, segmentation and reassembly of RLC SDUs
    Re-segmentation of RLC data PDUs
    Reordering of RLC data PDUs Duplicate detection
Protocol error detection
RLC SDU discard
RLC re-establishment The in-sequence delivery function of the NR RLC device refers to a function of transmitting RLC SDUs, received from a lower layer, to a higher layer in the sequence of reception, and may include, if one RLC SDU is originally segmented into multiple RLC SDUs and received, a function of reassembling and transmitting the multiple RLC SDUs. The in-sequence delivery function may include a function of reordering the received RLC PDUs based on an RLC sequence number (SN) or PDCP SN, reordering the sequence and recording missing RLC PDUs, providing a state report on the missing RLC PDUs to a transmission side, and requesting retransmission for the missing RLC PDUs. Alternatively, the in-sequence delivery function of the NR RLC device may include a function of sequentially transmitting only the RLC SDUs prior to the missing RLC SDU to a higher layer if the missing RLC SDU occurs, or sequentially transmitting all the RLC SDUs received before a timer starts to a higher layer if the timer expires although there is a missing RLC SDU, or sequentially transmitting all RLC SDUs received so far to a higher layer if a predetermined timer expires although there is a missing RLC SDU. In addition, the RLC PDUs may be processed in the sequence that the RLC PDUS are received (in the sequence of arrival regardless of the sequence of serial number and sequence number), and be transmitted to a PDCP device out of sequence delivery. The in-sequence delivery function may include a function of receiving segments stored in a buffer or segments to be received later, reconfiguring the segments in one complete RLC PDU, processing the RLC PDU, and transmitting the RLC PDU to the PDCP device. The NR RLC layer may not include a concatenation function, and the concatenation function may be performed by the NR MAC layer or may be replaced by a multiplexing function of the NR MAC layer.

The out-of-sequence delivery function of the NR RLC device refers to a function of directly transmitting the RLC SDUs, received from the lower layer, to a higher layer regardless of the order, and may include, if one RLC SDU has been originally segmented into multiple RLC SDUs and received, a function of reassembling the multiple RLC SDUs and transmitting the same, and a function of storing the RLC SNs or PDCP SNs of the received RLC PDUs, reordering the sequence, and recording the missing RLC PDUs.

The NR MACs 1d-15 and 1d-30 may be connected to multiple NR RLC layer entities configured in one UE, and a main function of the NR MAC may include some of the following functions.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding The NR physical (PHY) layers 1d-20 and 1d-25 may perform an operation of channel-coding and modulating higher layer data, generating the higher layer data into an OFDM symbol, transmitting the OFDM symbols via a radio channel, or demodulating and channel decoding of the OFDM symbols received via the radio channel, and transferring the OFDM symbol to a higher layer.

In the LTE system, a UE performs frequency measurement while performing a cell reselection procedure in the RRC idle mode. The frequency measured while performing the cell reselection procedure may denote intra-frequency measurement or serving cell (or Pcell, primary cell) measurement for frequencies broadcasted by a cell configured or camped on by a base station. However, inter-frequency measurement is not performed except for intra-frequency measurement or serving cell measurement, and a result of frequency measurement is not separately reported to a network.

That is, if the UE finds a suitable cell by performing the cell reselection procedure, camps on the cell, and then is switched to the RRC connected mode by performing an RRC connection re-establishment procedure, the base station provides configurations, to a UE in the RRC connected mode, including frequencies (e.g., a frequency list) or frequency bands to be measured; and a priority for each frequency. That is, the base station may provide configurations, to a UE in the RRC connected mode, including: the sequence in which measurements are performed; a filtering method (e.g., an L1 filtering, L2 filtering, or L3 filtering method, a calculation method using a coefficient) to be used for measurement of the intensity of the frequency when measuring the frequency; an event or condition in which the frequency measurement is to begin; an event or condition in which the frequency measurement is to begin; a criterion for performing measurement when compared to a current serving cell (or a frequency on which the UE currently camps); an event or condition in which a result of the frequency measurement is to be reported; the criterion or the condition that should be satisfied for frequency reporting when compared to the current serving cell (or a frequency on which the UE currently camps on); and a period in which a result of the frequency measurement is to be reported. The UE measures corresponding frequencies according to the frequency configuration, configured by the base station as described above, and reports a result of frequency measurement to the base station based on the corresponding event or condition. In addition, the base station may determine whether to apply a carrier aggregation or dual connectivity technology to the UE based on the frequency measurement result received from the UE.

The disclosure proposes a method in which the UE performs frequency measurement in an RRC idle mode or an RRC inactive mode corresponding to a mode before the UE is switched to an RRC connected mode, indicates a result of frequency measurement to a base station if the UE establishes a connection with a network, and enters the RRC connected mode to enable reporting of a result of early frequency measurement in the next generation mobile communication system. Based on the method, the base station may rapidly configure a frequency aggregation technology or a dual connectivity technology in the UE, based on the result measured by the UE in a disconnected state (that is, the RRC idle mode or RRC inactive mode).

In more detail, in a case of switching a UE in the RRC connected mode, which has established a connection with a network, to an RRC idle mode or an RRC inactive mode, the base station may: configure, through an RRC message, frequency information or frequencies to be measured by the UE in the RRC idle mode or the RRC inactive mode, time (or period) information to be measured by the UE in the RRC idle mode or the RRC inactive mode, or area information (or a cell list) to be measured by the UE in the RRC idle mode or the RRC inactive mode; and then instruct the UE, through the RRC message, to perform frequency measurement in the RRC idle mode or the RRC inactive mode. In addition, the disclosure proposes an efficient operation of the UE such that the UE performs a procedure of, for example, reading system information of the newly camped-on cell while performing a cell reselection operation every time the UE moves, and determining whether to continue or end frequency measurement, whether to extend a measurement period (for example, restart a timer), whether to report a result of frequency measurement, or whether to discard the result of frequency measurement in the RRC idle mode or the RRC inactive mode according to the system information.

In the disclosure, a bearer may denote an SRB and a DRB, the SRB denotes a signaling radio bearer, and a DRB denotes a data radio bearer. The UM DRB denotes a DRB using an RLC layer entity operating in a UM mode, and an AM DRB denotes a DRB using an RLC layer entity operating in an AM mode.

Figure 1E:
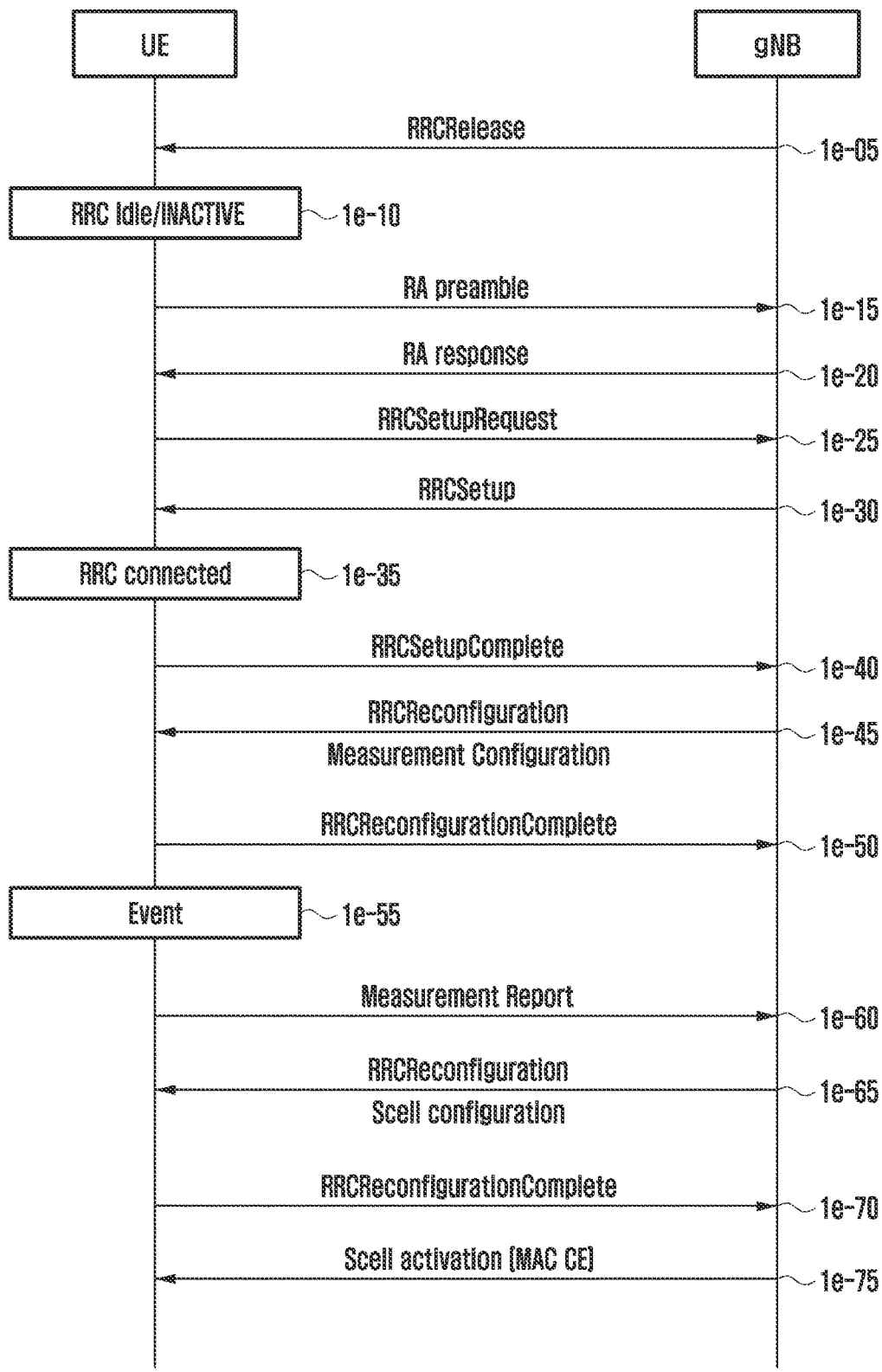
FIG. 1E illustrates a procedure in which a user equipment (UE) is switched from a radio resource control (RRC) idle mode or an RRC inactive mode to an RRC connected mode and configures a carrier aggregation technology in a next generation mobile communication system according to an embodiment of the disclosure.

FIG. 1E illustrates a procedure in which a UE is switched from an RRC idle mode or an RRC inactive mode to an RRC connected mode and configures a carrier aggregation technology in a next generation mobile communication system according to an embodiment of the disclosure.

Referring to FIG. 1E, the base station may switch the RRC connected mode UE, which has established a connection with a network UE, to the RRC idle mode or the RRC inactive mode for a predetermined cause. The predetermined cause may be a lack of scheduling resources of a base station or stopping of data transmission or reception to or from the UE for a predetermined time.

In the above, the base station may transmit an RRCRelease message to the UE and indicate to switch the UE to the RRC idle mode or the RRC inactive mode. In the RRCRelease message, a predetermined indicator (for example, suspend-config) may indicate to switch the UE to the RRC inactive mode, and if the indicator (suspend-config) is not included in the RRCRelease message, the UE may be switched to the RRC idle mode (indicated by reference numeral 1e-05).

If a connection with the network is necessary for some causes, the UE is switched to the RRC idle mode or the RRC inactive mode, and may perform a random access procedure, receive a random access response, request an RRC connection configuration, and receive an RRC message so as to perform an RRC connection configuration (indicated by reference numerals 1e-10, 1e-15, 1e-20, 1e-25, 1e-30, 1e-35, and 1e-40).

The UE establishes reverse transmission synchronization with the base station through a random access procedure and transmits an RRCSetupRequest message to the base station (indicated by reference numeral 1e-25). The RRCSetupRequest message may include a cause (establishmentCause) for establishing a connection with an identifier of the UE.

The base station transmits an RRCSetup message so that the UE establishes an RRC connection (indicated by reference numeral 1e-30). The RRCSetup message may include at least one of configuration information for each logical channel, configuration information for each bearer, configuration information of a PDCP layer entity, configuration information for an RLC layer entity, and configuration information of a MAC layer entity.

The RRCSetup message may allocate a bearer identifier (for example, an SRB identifier or a DRB identifier) to each bearer, and may indicate configurations of a PDCP layer entity, an RLC layer entity, a MAC layer entity, and a PHY layer entity for each bearer. In addition, the base station may configure, through the RRCConnectionSetup message, a length (for example, 12 bits or 18 bits) of a PDCP serial number used by the PDCP layer entity for each bearer, and a length (for example, 6 bits or 12 bits or 18 bits) of the RLC serial number used by the RLC layer entity. In addition, the base station may indicate, through the RRCConnectionSetup message, whether to use a header compression and decompression protocol for a PDCP layer entity in the uplink or the downlink, for each bearer, and may indicate whether to perform an integrity protection or verification procedure. In addition, the base station may indicate whether to perform an out-of-order delivery function in the PDCP layer entity.

The UE, which has established the RRC connection, transmits an RRCSetupComplete message to the base station (indicated by reference numeral 1e-40). The RRCSetupComplete message may include a control message called "SERVICE REQUEST" requesting an access management function (AMF) or MME to establish a bearer configuration for a predetermined service. The base station may transmit the SERVICE REQUEST message received in an RRCSetupComplete message to the AMF or MME, and the AMF or MME may determine whether to provide a service requested by the UE.

As a result of determination, if the AMF or MME determines to provide a service requested by the UE, the AMF or MME transmits a message called "INITIAL CONTEXT SETUP REQUEST" to the base station. The INITIAL CONTEXT SETUP REQUEST message may include information, such as quality of service (QoS) information to be applied if a data radio bearer (DRB) is configured, and security related information (for example, security key and security algorithm) to be applied to the DRB.

The base station transmits or receives a SecurityModeCommand message and a SecurityModeComplete message to configure security with the UE, and if the security configuration is completed, the base station transmits an RRCReconfiguration message to the UE (indicated by reference numeral 1e-45).

The RRCReconfiguration message may allocate a bearer identifier (for example, an SRB identifier or a DRB identifier) to each bearer, and may indicate, for each bearer, configurations of a PDCP layer entity, an RLC layer entity, a MAC layer entity, and a PHY layer entity. In addition, the RRCReconfiguration message may configure, for each bearer, a length (e.g., 12 bits or 18 bits) of a PDCP serial number used by the PDCP layer entity, and a length (e.g., 6 bits, 12 bits, or 18 bits) of an RLC serial number used by the RLC layer entity. In addition, the RRCReconfiguration message may indicate, for each bearer, whether to use a header compression and decompression protocol for the PDCP layer entity in the uplink or the downlink, and may indicate whether to perform an integrity protection or verification procedure. In addition, the RRCReconfiguration message may indicate whether the PDCP layer entity performs out-of-order delivery.

In addition, the RRCReconfiguration message may include configuration information of a DRB in which user data is to be processed, and the UE configures the DRB by applying the information and transmits an RRCReconfigurationComplete message to the base station (indicated by reference numeral 1e-50). After completing DRB configuration with the UE, the base station may transmit an INITIAL CONTEXT SETUP COMPLETE message to the AMF or MME and complete the connection.

If the above process is completed, the UE transmits or receives data through the base station and a core network (indicated by reference numerals 1e-55 and 1e-60). According to some embodiments, the data transmission process largely includes three operations: RRC connection configuration, security configuration, and DRB configuration. In addition, the base station may transmit the RRCReconfiguration message in order to update, add, or change the configuration to the UE for a predetermined cause (indicated by reference numeral 1e-65).

The RRCReconfiguration message may configure frequency configuration information to be measured by the UE (for example, a list of frequencies to be measured or a period for measuring a frequency, a condition for measuring a frequency, a condition for a frequency report after frequency measurement, a cell identifier for reporting a frequency, and the like).

According to the frequency measurement configuration information, the UE performs frequency measurement and if a predetermined condition is satisfied or event occurs (for example, if a signal strength of a specific frequency is better than a predetermined reference (for example, a threshold value) or a signal strength of a current serving cell (frequency) is smaller than a predetermined reference (for example, a threshold value)) (indicated by reference numeral 1e-55), the UE may report a result of frequency measurement to the base station (indicated by reference numeral 1e-60).

If the base station receives the result of frequency measurement, the base station includes secondary cell (Scell) configuration information in the RRCReconfiguration message based on the result of frequency measurement (indicated by reference numeral 1e-65) and transmits the RRCReconfiguration message to the UE to configure a secondary Scell, and may configure the carrier aggregation technology for the UE. The base station may include secondary cell group configuration information in the RRCReconfiguration message, transmit the RRCReconfiguration message to the UE, and configure the dual connectivity technology for the UE (indicated by reference numeral 1e-65). The UE applies information included in the RRCReconfiguration message and transmits an RRCReconfigurationComplete message to the base station (indicated by reference numeral 1e-70).

If the base station has configured the carrier aggregation technology for the UE, the base station may switch the S cells configured above to an active, inactive or dormant state using a MAC control element (MAC CE) (indicated by reference number 1e-75).

As described above, the procedure of configuring the carrier aggregation technology or the dual connectivity technology for the UE by the base station may be summarized as follows. First, if the UE establishes a connection with the base station, and the base station configures frequency measurement configuration information for the UE, the UE performs frequency measurement based on the frequency measurement configuration information and reports a result of frequency measurement to the base station. Further, in order to configure the carrier aggregation technology for the UE based on the frequency measurement result of the UE, the base station may configure, through the RRC message, configuration information for the secondary cell, and may transmit the MAC CE to enable activation, dormancy, or inactivation of the Scell. In addition, the base station may configure additional cell group (for example, secondary cell group) configuration information in order to configure the dual connectivity technology for the UE based on the frequency measurement result of the UE.

As described above, if the base station configures the carrier aggregation technology or the dual connectivity technology for the UE, since the UE first enters the RRC connected mode, receives the frequency configuration information, performs the frequency measurement, and reports the measurement, the measurement report is performed very late. Therefore, there is a problem that the carrier aggregation technology or the dual connectivity technology is configured late. Therefore, in order to resolve the problem, in the following, the disclosure enables the UE to efficiently perform frequency measurement in the RRC idle mode and immediately report a result of frequency measurement if the connection with the network is established.

Figure 1F:
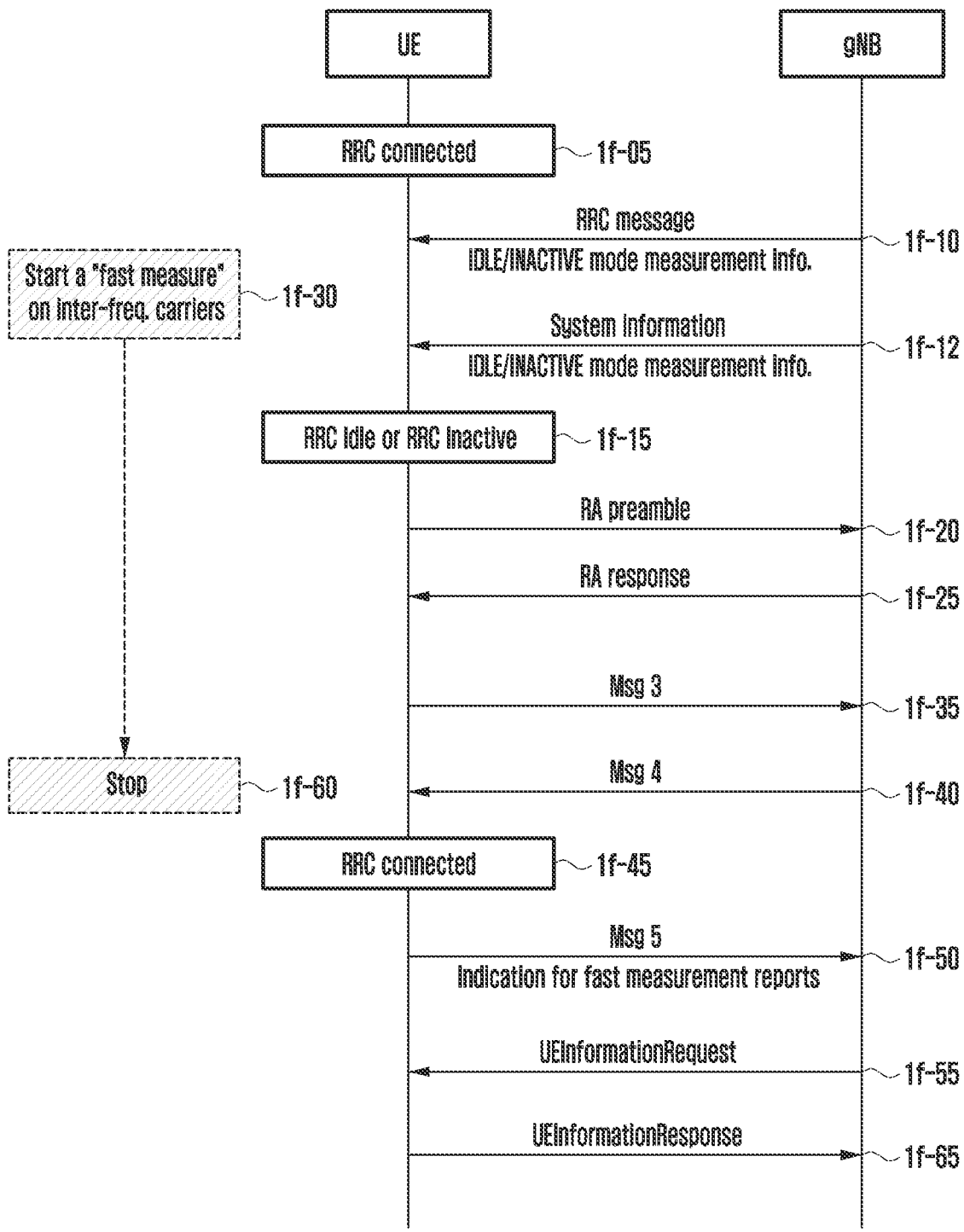
FIG. 1F illustrates a first embodiment in which a UE is enabled to perform early measurement in an RRC idle mode or an RRC inactive mode and to make a fast frequency measurement report in a next generation mobile communication system according to an embodiment of the disclosure.

FIG. 1F illustrates a first embodiment in which a terminal is enabled to perform early frequency measurement and to make a fast frequency measurement report in an RRC idle mode or an RRC inactive mode in a next generation mobile communication system according to an embodiment of the disclosure.

According to the first embodiment, a plurality of frequency measurement groups may be configured for the UE, if a base station configures, through an RRCRelease message, frequency measurement configuration information for the UE to perform frequency measurement in an RRC idle mode or an RRC inactive mode.

For example, the base station may provide configurations, to the UE, including a first LTE frequency group and a second LTE frequency group, and may allow the UE to perform frequency measurement for each of the two groups in the RRC idle mode or the RRC inactive mode and separately store the measurement result for each group and report. For example, the UE may report frequencies with the best signal in the first LTE frequency group and frequencies with the best signal in the second LTE frequency group. In other words, instead of reporting frequencies with the best signal in all of the groups, the UE may configure a plurality of frequency groups to report frequencies with the best signal for each group. Therefore, as the base station efficiently configures a plurality of frequency groups, the carrier aggregation technology or the dual connectivity technology (for example, LTE DC) may be rapidly configured based on the frequency measurement report for each group of the UE.

For example, the base station may provide configurations, to the UE, including a first TE frequency group and a second NR frequency group, and may allow the UE to perform frequency measurement for each of the two groups in the RRC idle mode or the RRC inactive mode and separately store the measurement result for each group and report. For example, the UE may report frequencies with the best signal in the first LTE frequency group and frequencies with the best signal in the second NR frequency group. In other words, instead of reporting frequencies with the best signal in all of the groups, the UE may configure a plurality of frequency groups to report frequencies with the best signal for each group. Therefore, as the base station efficiently configures a plurality of frequency groups, the carrier aggregation technology or the dual connectivity technology (for example, EN-DC or NE-DC (dual connectivity between an LTE base station and an NR base station) may be rapidly configured based on the frequency measurement report for each group of the UE.

For example, the base station may provide configurations, to the UE, including a first NR frequency group and a second NR frequency group, and may allow the UE to perform the frequency measurement for each of the two groups in the RRC idle mode or the RRC inactive mode and separately store the measurement result for each group and report. For example, the UE may report frequencies with the best signal in the first NR frequency group and frequencies with the best signal in the second NR frequency group. In other words, instead of reporting frequencies with the best signal in all of the groups, the UE may configure a plurality of frequency groups to report frequencies with the best signal for each group. Therefore, as the base station efficiently configures a plurality of frequency groups, the carrier aggregation technology or the dual connectivity technology (for example, NR-DC (dual connectivity between NR base stations) may be rapidly configured based on the frequency measurement report for each group of the UE.

In the first embodiment, the UE capable of performing frequency measurement and making a fast frequency measurement report in the RRC idle mode or the RRC inactive mode may be a UE corresponding to one or a plurality of the following cases.

1. All of UEs having a capability of supporting a method for performing early frequency measurement and fast reporting of a result of frequency measurement in RRC idle mode or RRC inactive mode.

2. A UE having received configuration information, which indicates the UE to perform frequency measurement in the RRC idle mode or the RRC inactive mode in a case where the base station switches the UE from the RRC connected mode to the RRC idle mode or the RRC inactive mode, through an RRC message, among the RRC idle mode or inactive mode UEs. For example, a UE having configured frequency configuration information for performing frequency measurement in the RRC idle mode or the RRC inactive mode, a measurement period (e.g., a timer value), or area configuration information (e.g., a list of cell identifiers) for performing the frequency measurement.

Referring to FIG. 1F, the UE in the RRC connected mode 1*f*-05 may be switched to the RRC idle mode or the RRC inactive mode by the base station for a predetermined cause (for example, no data is transmitted or received for a predetermined period of time) (indicated by reference numeral 1*f*-15). In the above, the base station transmits an RRC message if the base station switches the mode of the UE (indicated by reference numeral 1*f*-10). For example, an RRCRelease message (indicating switching to the RRC idle mode) or an RRCRelease message (indicating switching to the RRC inactive mode) including suspend-config may be transmitted. The RRC message may include a plurality of pieces of information or parts thereof to be applied if the UE performs early frequency measurement in the RRC idle mode or the RRC inactive mode.

Frequency configuration information to be measured in the RRC idle mode or the RRC inactive mode
Frequency configuration information
LTE frequency measurement information group or list (EUTRA frequency configuration information/list/group)
The UE may configure frequency measurement configuration information (early measurement setup) including: frequencies or frequency bands (e.g., a frequency list) to be measured; the sequence in which measurements are performed based on a priority configured for each frequency; a filtering method (e.g., an L1 filtering, L2 filtering, or L3 filtering method, a calculation method using a coefficient) to be used for measurement of the intensity of the frequency when measuring the frequency; an event or condition in which the frequency measurement is to begin; a criterion (e.g., in a case where a signal strength is equal to or greater than the indicated threshold value) for performing measurement and reporting when compared to a current serving cell (or a frequency on which the UE currently camps; an event or condition in which a result of the frequency measurement is to be reported; the criterion or the condition that should be satisfied for frequency reporting when compared to the current serving cell (or the frequency on which the UE currently camps on); and a period in which a result of the frequency measurement is to be reported.

NR frequency measurement information group or list (NR frequency configuration information/list/group)
The UE may configure frequency measurement configuration information (early measurement setup) including: frequencies or frequency bands (for example, frequency list) to be measured; the sequence in which measurements are performed based on a synchronization signal block (SSB) identifier information of each frequency or SSB transmission resources (frequency and time resources), or the priority configured for each frequency; a filtering method (e.g., an L1 filtering, L2 filtering, or L3 filtering method, a calculation method using a coefficient) to be used for measurement of the intensity of the frequency when measuring the frequency; an event or condition in which the frequency measurement is to begin; a criterion (e.g., in a case where a signal strength is equal to or greater than the indicated threshold value) for performing measurement and reporting when compared to a current serving cell (or a frequency on which the UE currently camps; an event or condition in which a result of frequency measurement is to be reported; the criterion or the condition that should be satisfied for frequency reporting when compared to the current serving cell (or the frequency on which the UE currently camps on); and a period in which a result of the frequency measurement is to be reported.

A period of time for performing frequency measurement or a timer value (for example T331) for performing frequency measurement in the RRC idle mode or the RRC inactive mode. For example, if the RRCRelease message indicates the UE to perform frequency measurement in the RRC idle mode or the RRC inactive mode, the UE may start a timer to perform frequency measurement while the timer is running, and the frequency measurement may be stopped if the timer expires.

Area information for performing frequency measurements in the RRC idle mode or the RRC inactive mode. For example, if the area information indicates a list of physical cell identifiers (PCID) and the UE is located in a cell indicated by the area information, frequency measurement may be performed and if the UE is located out of cell indicated by the area information, the frequency measurement may be stopped. For example, if UE is located out of the cell indicated by the area information, the timer may be stopped and frequency measurement may be stopped.

A measurement report threshold value may be configured and a plurality of frequencies, which have a better signal strength than the threshold value, among the configured frequency group may be reported.

In the above, if the UE performs frequency measurement ("early measurement) in the RRC idle mode or the RRC inactive mode, the frequency measurement may start if one of the following conditions is satisfied (indicated by reference numeral 1f-30).

1. In a case where the UE has received the RRCRelease message, if the RRCRelease message includes an indicator indicating the UE to perform frequency measurement in the RRC idle mode or the RRC inactive mode and frequency information to be measured and a period of time (e.g., a timer value) for measuring the frequency are configured therein, the UE may start a timer and perform frequency measurement according to the frequency information.

2. In a case where the UE has received the RRCRelease message, if the RRCRelease message includes an indicator indicating the UE to perform frequency measurement in the RRC idle mode or the RRC inactive mode and a period of time (e.g., a timer value) for measuring the frequency is configured but frequency information to be measured is not included, the UE may start the timer and if the frequency information, which is to be measured in the RRC idle mode or the RRC inactive mode, is broadcasted in the system information, the UE may perform frequency measurement according to the frequency information. If the UE moves to another cell, and if frequency information to be measured in the RRC idle mode or the RRC inactive mode is broadcasted in the system information of a newly camped-on cell, the UE may perform frequency measurement according to the new frequency information.

That is, in the case of not configuring frequency measurement configuration information for performing the frequency measurement in the RRC idle mode or the RRC inactive mode through the RRCRelease message, the UE may perform, based on the case where the frequency configuration information for performing frequency measurement in the RRC idle mode or the RRC inactive mode is broadcasted in the system information, frequency measurement in the RRC idle mode or the RRC inactive mode. If the UE moves to camp on a new cell, the frequency measurement information may be updated with frequency configuration information, which is broadcasted to a new cell and used for frequency measurement in the RRC idle mode or the RRC inactive mode, and may perform again frequency measurement (indicated by reference numeral 1f-12).

However, in the case of configuring the frequency measurement configuration information for performing frequency measurement in the RRC idle mode or the RRC inactive mode through the RRCRelease message, the UE may preferentially employ frequency measurement configuration information configured in the RRCRelease message prior to frequency measurement information in the RRC idle mode or the RRC inactive mode, broadcasted in system information, and may perform frequency measurement. That is, if the frequency measurement configuration information for performing frequency measurement in the RRC idle mode or the RRC inactive mode is configured in the RRCRelease message, the UE does not reflect or consider the frequency configuration information broadcasted in the system information or discard the frequency configuration information.

According to one or a plurality of the conditions as described above, the UE may start early frequency measurement. The UE may transmit a random access preamble to the base station (1f-20), receive a random access response (1f-25) from the base station, transmit message 3 (e.g., RRCSetupRequest or RRCResumeRequest message) to the base station (indicated by reference numeral 1f-35) while performing frequency measurement, receive message 4 (e.g., RRCSetup or RRCResume message) from the base station in response thereto and may be aware that a random access procedure has been successful (indicated by reference numeral 1f-40), and may be switched to the RRC connected mode (indicated by reference numeral 1f-45).

In the above, through the system information (for example, SIB2), which has been received by the UE in a current cell prior to establishing a connection, if an indicator supporting frequency measurement in the RRC idle mode or the RRC inactive mode or an indicator capable of receiving a result of frequency measurement in the RRC idle mode or the RRC inactive mode is broadcasted, the UE may provide, to the base station, a notification that the UE includes a result of the frequency measurement in the RRC idle mode or the RRC inactive mode, via message 5. As another method, indicators indicating LTE frequency measurement support and NR frequency measurement support, respectively, may be defined and used.

In the case of transmitting message 5 (for example, RRCSetupComplete or RRCResumeComplete), the UE may transmit message 5 by including an indicator indicating that the UE has performed early frequency measurement in the RRC idle mode or the RRC inactive and there is a frequency measurement result to report. Message 5 may include a new indicator defined to indicate that there is a result of early (or fast) frequency measurement, and may reuse an indicator indicating that there is UE information already defined in the RRC message (RRCSetupComplete or RRCResumeComplete) (indicated by reference numeral 1f-50).

If the base station identifies, via an indicator included in message 5, that the UE has performed early frequency measurement in the RRC idle mode or the RRC inactive mode and has a measurement result to report, the base station may transmit a message (UEInformationRequest) indicating to report the measurement result to the UE in order to rapidly receive a frequency measurement result report (indicated by reference numeral 1f-55). For example, the base station may request frequency measurement result information from the UE, using the UEInformationRequest through a downlink dedicated control channel (DL-DCCH) message. Upon receiving the message, the UE may rapidly report a result of early frequency measurement to the base station (UEInformationResponse, indicated by reference numeral 1f-65). For example, upon receiving the message, the UE may report, through an uplink dedicated control channel (UL-DCCH) message, a frequency measurement report by using a UEInformationResponse message. In the above, frequency measurement results may include serving cell/frequency measurement results (e.g., NR-synchronization signal (SS) reference signal received power (RSRP)/ reference signal received quality (RSRQ), neighbor cell/ frequency measurement results of a serving cell/frequency, neighbor cell/frequency measurement results that may be measured by the UE, and a cell/frequency measurement results indicated to be measured.

In the above, the conditions in which the UE stops early frequency measurement may be as follows.

1. After transmitting, to the base station, message 5 indicating that there is a measurement result to report,
2. If the measurement report timer (e.g., T331) expires,
3. If the UE is out of the area indicated in the RRC idle mode or RRC inactive mode frequency measurement area information configured in the RRCRelease message, The UE may stop frequency measurement in the RRC idle mode or the RRC inactive mode according to one or multiple conditions (indicated by reference numeral 1f-60).

In the above, the UE performs measurement on frequencies that may be measured by the UE itself, for example, frequencies that the UE itself supports, based on the fast frequency configuration-related information, and at this time, the UE may preferentially select a frequency to be measured according to a predetermined priority.

The first embodiment proposes a method for performing early frequency measurement and fast reporting in an RRC idle mode or an RRC inactive mode. The disclosure proposes a (1-1)-th embodiment for a detailed UE operation in a case where a UE has received the RRCRelease message with respect to the first embodiment, as follows.

In a case where the UE has received the RRCRelease message:
  If the RRCRelease message includes configuration information (measIdleConfig) for measuring frequency in the RRC idle mode or the RRC inactive mode,
    The UE initializes and clears UE-internal variables storing the RRC idle mode or the RRC inactive mode frequency measurement configuration information and UE-internal variables storing the measurement result,
    The UE stores, in the UE-internal variables (VarMeasIdleConfig) storing the measurement configuration information, a measurement period (or a timer value, measureDuration) included the RRC idle mode or RRC inactive mode frequency measurement configuration information, and
    The UE starts a timer (for example, T331) by configuring the measurement period (or a timer value) included the RRC idle mode or RRC inactive mode frequency measurement configuration information.
  If the RRC idle mode or the RRC inactive mode frequency measurement configuration information includes LTE or NR frequency measurement list or group information,
    The UE stores the LTE or NR frequency measurement list or group information in the UE-internal variables storing the RRC idle mode or the RRC inactive mode frequency measurement configuration information.
  Otherwise, if the RRC idle mode or RRC inactive mode frequency measurement configuration information does not include the LTE or the NR frequency measurement list or group information,
    If there is LTE or the NR frequency measurement list or group information broadcasted in the system information, the UE stores the RRC idle mode or RRC inactive mode frequency measurement configuration information in the UE-internal variables (for example, VarMeasIdleConfig).
    Specifically, if the UE is in the RRC idle mode or the RRC inactive mode and the system information (for example, SIB5) includes the RRC idle mode or RRC inactive mode frequency measurement configuration information (measIdleConfigSIB), and if the UE supports the frequency measurement in order to perform a carrier aggregation technology or a dual connectivity technology,
      If the timer T331 is running and there is no frequency measurement configuration information in the UE-internal variables storing the RRC idle mode or RRC inactive mode frequency measurement configuration information,
        The UE updates, stores, or replaces the frequency measurement configuration information received from the system information.
      In addition, the UE starts the frequency measurement in the RRC idle mode or the RRC inactive mode according to the embodiments of the UE operation proposed below.
  If the RRC idle mode or RRC inactive mode frequency measurement configuration information includes NR frequency measurement list or group information,
    The NR frequency measurement list or group information is stored in the UE-internal variables storing the RRC idle mode or RRC inactive mode frequency measurement configuration information.
  Otherwise, if the RRC idle mode or RRC inactive mode frequency measurement configuration information does not include the NR frequency measurement list or group information,
    if there is NR frequency measurement list or group information broadcasted in the system information, the UE stores the NR frequency measurement list or group information in the UE-internal variables storing the RRC idle mode or the RRC inactive mode frequency measurement configuration information.
  The UE starts frequency measurement in the RRC idle mode or the RRC inactive mode according to embodiments of the UE operation proposed below, and stores and reports the frequency measurement result.

The disclosure proposes a method for performing early frequency measurement and fast reporting in an RRC idle mode or an RRC inactive mode. The disclosure proposes a (1-2)-th embodiment for a detailed UE operation of performing frequency measurement, storing, and reporting a measurement result, with respect to the first embodiment, as follows.

If a timer (the T331 timer) that permits frequency measurement in the RRC idle mode or the RRC inactive mode is running, the UE operates as follows.
  If the UE-internal variables storing the RRC idle mode or RRC inactive mode frequency measurement configuration information includes the LTE frequency measurement list or group information (measIdleCarrierListEUTRA), the UE performs frequency measurements as follows, with respect to each pieces of frequency information or each entry of the LTE frequency measurement list or group.
    If the UE supports a carrier aggregation technology or a dual connectivity technology with a current serving frequency (a serving carrier) and the frequency, and supports a bandwidth indicated by the frequency information,
      The UE performs frequency measurement at the frequency and bandwidth indicated by the frequency information.
      If cell identifier list information (e.g., a cell identifier list measCellList) for frequency measurement in the RRC idle mode or the RRC inactive mode is included or configured, The UE considers a serving cell (or Pcell) and cells indicated in the cell identifier list, as cells capable of performing frequency measurement in the RRC idle mode or the RRC inactive mode.

Otherwise, if a cell identifier list (e.g., a cell identifier list measCellList) for frequency measurement in the RRC idle mode or the RRC inactive mode is not included or is not configured, The UE considers a serving cell (or Pcell) and cells in which RSRP or RSRQ measurement result is greater than a configured threshold value and having the strongest signal strength, as cells capable of performing frequency measurement in the RRC idle mode or the RRC inactive mode. The base station may configure whether to select several strongest cells among the cells.

A result of the frequency measurement in the RRC idle mode or the RRC inactive mode is stored in the UE-internal variables (for example, VarMeasIdleReport). In a case where the measurement result is stored, the NR frequency measurement list or group information (measIdleCarrierListNR) or the LTE frequency measurement list or group information (measIdleCarrierListNR) may be separately stored and reported later.

Otherwise, if the UE does not support a carrier aggregation technology or a dual connectivity technology between the current serving frequency (a serving carrier) and the frequency, or does not support the bandwidth indicated by the frequency information, The UE does not consider the RRC idle mode or the RRC inactive mode frequency measurement in the frequency information, and does not perform the frequency measurement.

If the UE-internal variables storing the RRC idle mode or RRC inactive mode frequency measurement configuration information includes an NR frequency measurement list or group information (measIdleCarrierListNR), the UE performs frequency measurements as follows with respect to each piece of frequency information or each entry of the NR frequency measurement list or group.

If the UE supports a current serving frequency (a serving carrier) or an SSB and supports a carrier aggregation technology or a dual connectivity technology with the frequency or the SSB, and supports a bandwidth part (BWP) or a bandwidth indicated by the frequency information or SSB information, A frequency measurement is performed at a frequency and a bandwidth or a bandwidth part or a synchronization system block (SSB, a signal for synchronizing with a base station), indicated by the frequency information.

If cell identifier list information (e.g., cell identifier list measCellList) for frequency measurement in the RRC idle mode or the RRC inactive mode is included or configured, The UE considers a serving cell (or Pcell) and cells indicated in the cell identifier list, as cells capable of performing frequency measurement in an RRC idle mode or an RRC inactive mode.

Otherwise, if a cell identifier list (e.g., a cell identifier list measCellList) for frequency measurement in the RRC idle mode or the RRC inactive mode is not included or is not configured, the UE considers a serving cell (or Pcell), SSBs, and cells in which RSRP or RSRQ measurement result is greater than a configured threshold value and having the strongest signal strength, as cells capable of performing frequency measurement in the RRC idle mode or the RRC inactive mode. The base station may configure whether to select several strongest cells among the cells.

A result of the frequency measurement in the RRC idle mode or the RRC inactive mode is stored in the UE-internal variables (for example, VarMeasIdleReport). In a case where the measurement result is stored, the NR frequency measurement list or group information (measIdleCarrierListNR) or the LTE frequency measurement list or group information (measIdleCarrierListNR) may be separately stored and reported later.

Otherwise, if the UE does not support a carrier aggregation technology or a dual connectivity technology between the current serving frequency (a serving carrier) and the frequency, or does not support the bandwidth indicated by the frequency information, The UE does not consider the RRC idle mode or the RRC inactive mode frequency measurement in the frequency information, and does not perform the frequency measurement.

If area information (for example, a validity area) or a cell identifier list is configured in a UE-internal variables storing the RRC idle mode or the RRC inactive mode frequency measurement configuration information, and the UE selects or camps-on cells rather than cells or an area indicated by the area information, The UE stops the timer T331 and stops frequency measurement in the RRC idle mode or the RRC inactive mode.

The first embodiment proposes a method for performing early frequency measurement and fast reporting in an RRC idle mode or an RRC inactive mode. With respect to the first embodiment, a (1-3)-th embodiment, which is a detailed operation of a UE timer is proposed below.

The UE operates a timer T331 for performing frequency measurement in the RRC idle mode or the RRC inactive mode, and the UE performs frequency measurement in the RRC idle mode or the RRC inactive mode only while the timer is running, and if the timer expires, the UE stops performing the frequency measurement in the RRC idle mode or the RRC inactive mode.

The UE receives configuration information for frequency measurement in the RRC idle mode or the RRC inactive mode from the RRC message and starts a timer if the measurement period is configured.

The UE may establish a connection with a network while performing frequency measurement in the RRC idle mode or the RRC inactive mode, may stop the timer if the RRCSetup message or the RRCResume message is received via message 4, or may stop the timer if area configuration information is configured and the UE selects and camps on a cell located out of the area.

If the timer expires or stops, the UE releases information of the UE-internal variables (e.g., VarMeasIdleConfig) storing the RRC idle mode or RRC inactive mode as frequency measurement configuration information.

The disclosure relates to a method for performing early frequency measurement and fast reporting in an RRC idle mode or an RRC inactive mode. The disclosure proposes a (1-4)-th embodiment for a detailed UE operation in a case where a UE has received the RRCRelease message with respect to the first embodiment, as follows.

If the UE has received the RRCSetup message or the RRCResume message, via message 4, from the base station, the following operation may be performed.

If the system information (e.g., SIB2) broadcasts and/or includes an indicator (idle or inactive mode measurement) that supports frequency measurement in the RRC idle mode or the RRC inactive mode, and the UE includes a result of frequency measurement measured in the RRC idle mode or the RRC inactive mode, The UE configures message 5 by including an indicator (idle or inactive Measavailable) that the RRCSetupComplete message or the RRCResumeComplete message includes a result of the frequency measurement in the RRC idle mode or the RRC inactive mode. Accordingly, the message may indicate that there is frequency measurement information in the RRC idle mode or the RRC inactive mode to be reported to the base station.

The UE stops the timer (e.g., T331) for the frequency measurement in the RRC idle mode or the RRC inactive mode because the frequency measurement result is to be reported.

If the UE has received a message (UE information request) requesting information of the UE from the base station, the message includes an indicator requesting the frequency measurement in the RRC idle mode or the RRC inactive mode results, and the UE includes a result of the frequency measurement in the RRC idle mode or the RRC inactive mode, The UE may include a result of frequency measurement in the RRC idle mode or the RRC inactive mode in a message (UE information response) transmitting the UE information and transmit the same, and the UE may report the frequency measurement result based on a frequency list configured in the RRC message of the base station or system information or in group units. For example, the UE may report the measurement results for the LTE frequency list group and the NR frequency list group, respectively, and the measurement results may be reported for the first NR frequency list group and the second NR frequency list group, respectively.

If the UE reports a result of the frequency measurement in the RRC idle mode or the RRC inactive mode, the UE receives a response indicating that the base station has successfully received the measurement report (HARQ ACK or RLC ACK), and discards a result of the frequency measurement in the RRC idle mode or the RRC inactive mode from the UE-internal variables.

In the disclosure, the LTE frequency list group or the NR frequency list group may be included in one configuration information and be broadcasted in the system information (SIB5). The LTE frequency list group or the NR frequency list group may be broadcasted in different system information (for example, SIB3 or SIB5 or another SIB) so that the UE may distinguish the same. In addition, the LTE frequency list group or the NR frequency list group may include intra-frequency configuration information as well as inter-frequency configuration information.

Figure 1G:
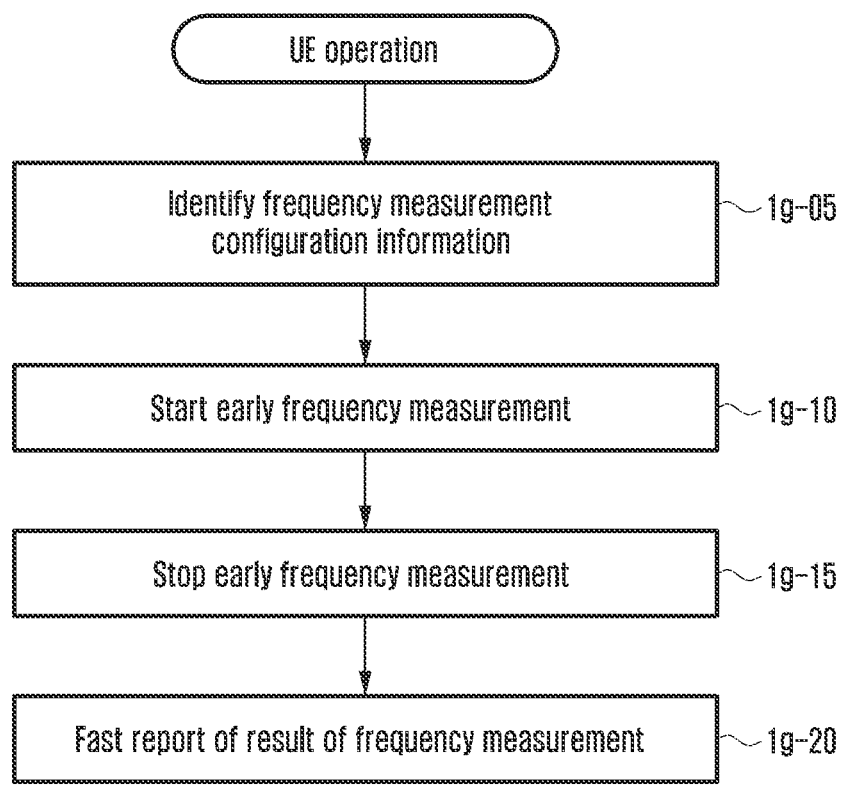
FIG. 1G illustrates a UE operation of performing frequency measurement in an RRC idle mode or an RRC inactive mode and reporting a result of frequency measurement according to an embodiment of the disclosure.

FIG. 1G illustrates a UE operation of performing frequency measurement in an RRC idle mode or RRC inactive mode and reporting a result of frequency measurement according to an embodiment of the disclosure.

Referring to FIG. 1G, upon receiving an RRC message, the UE operates a timer for frequency measurement in the RRC idle mode or the RRC inactive mode, and if the RRC message includes frequency measurement configuration information for frequency measurement in an RRC idle mode or an RRC inactive mode (indicated by reference numeral 1g-05), the UE performs frequency measurement in the RRC idle mode or the RRC inactive mode based on the information (indicated by reference numeral 1g-10). If the RRC message does not include frequency measurement configuration information for frequency measurement in the RRC idle mode or the RRC inactive mode, the UE may receive frequency information from the system information (indicated by reference numeral 1g-05) to perform the frequency measurement in the RRC idle mode or the RRC inactive mode (indicated by reference numeral 1g-10). If the UE performs frequency measurement, the UE stores the measurement result, and if system information of a cell that has established a connection with a network includes an indicator indicating to support the frequency measurement in the RRC idle mode or the RRC inactive mode, the UE receives message 4 at the time of establishing a connection to a network and stops the timer (indicated by reference numeral 1g-15) and may notify that message 5 includes a result of the frequency measurement in the RRC idle mode or the RRC inactive mode. If the base station requests a result of the frequency measurement in the RRC idle mode or the RRC inactive mode, the UE reports the measurement result to the base station (indicated by reference numeral 1g-20), and if the measurement result is successfully reported, the UE discards the measurement result.

In the above embodiment, a method for rapidly configuring a carrier aggregation technology or a dual connectivity technology in a UE has been proposed and described. Hereinafter, a method for configuring a multi-connectivity technology in the UE by extending a dual connectivity technology is proposed.

In the disclosure, if the base station configures the multi-connectivity technology in the UE, connection of the UE with a plurality of base stations is configured through the RRC message (e.g., an RRCSetup message, an RRCResume message, or an RRCReconfiguration message), as shown in FIG. 1E. The plurality of base stations may be configured as one or a plurality of LTE base stations and one or a plurality of NR base stations, and a plurality of NR base stations may be configured using another method.

In the case of configuring connection of the UE with a plurality of base stations through the RRC message, the RRC message indicates one base station which serves as a master. The base station configured as the master denotes a base station capable of directly transmitting the RRC message to the UE through the SRB. The base stations other than the master may transmit the RRC message through the master base station.

In a case where the base station configures, in the UE, one LTE base station and a plurality of NR base stations using a multi-connectivity technology, if the base station tries to configure the LTE base station as a master base station, one base station among a plurality of NR base stations may be indicated as a master base station. That is, the disclosure may be characterized in that one master base station is indicated for each radio access technology (RAT) with respect to a plurality of base stations configured using a multi-connectivity technology. For example, one LTE base station among a plurality of LTE base stations may be configured as a master base station, and one NR base station among the plurality of NR base stations may be configured as a master base station. In the above, the master LTE base station and the master NR base station may transmit an RRC message for each radio access technology to the UE through an independent SRB. In addition, if a plurality of NR base stations are configured in the UE using a multi-connectivity technology, one NR base station may be configured as a master base station.

In the following, the disclosure proposes a method for implementing a base station, which can effectively use the multi-connectivity technology of the disclosure.

If a central unit and distributed unit (CU-DU) split structure is implemented in the base station implementation, one DU is implemented to support a low frequency range (frequency range 1 (FR1), for example, a frequency range from 450 MHz to 7 GHz), and another DU is implemented to support a high frequency range (frequency range 2 (FR2), for example, a frequency range from 24.25 GHz to 52.6 GHz). That is, the disclosure is characterized in that one DU is implemented not to simultaneously support a low frequency range and a high frequency range. Since the frequency characteristics are different in the low frequency range and the high frequency range and coverages for the low and high frequency ranges for supporting the UE are different from each other, it may be difficult to arrange the base station without a shadow area. In addition, if one DU is implanted to operate the low frequency range and the high frequency range at the same time, the implementation complexity increases so that the disclosure proposes, for convenience of implementation, that one DU is implemented not to operate the low frequency range and the high frequency range at the same time.

The CU-DU split structure refers that a higher layer entity (for example, an application layer entity, an SDAP layer entity, or a PDCP layer entity) is operated in one CU, a plurality of DUs are connected to the one CU by wire or wirelessly, and a lower layer entity (e.g., RLC layer entity or MAC layer entity or PHY layer entity) is operated in each of the DUs.

As proposed by the disclosure, if one DU is implemented to support only one of the low frequency range or the high frequency range, the multi-connectivity technology proposed by the disclosure can be efficiently used. That is, since each DU is implemented to support only one frequency range among the low frequency range or the high frequency range, the complexity of the implementation is lowered, and the degree of freedom of deployment of the base station is improved. In addition, the multi-connectivity technique proposed in the disclosure may simultaneously support a low frequency range and a high frequency range to the one UE. That is, the UE may be configured to simultaneously connect to a plurality of DUs (or base stations, for example, a low frequency range supporting DU and a high frequency range supporting DU) by using a multi-connectivity technology in order to provide a service of a low delay and higher data transmission rate to the UE. Accordingly, the base station may serve the UE by utilizing both the high frequency range and the low frequency range, and may efficiently apply the above-described carrier aggregation technology, a dual connectivity technology, or a multi-connectivity technology. That is, if one CU and two DUs (DU1 supports low frequency range and DU2 supports high frequency range) are regarded as one base station, a high frequency range and a low frequency range may be simultaneously serviced to one UE by using the carrier aggregation technology. If one CU and two DUs (DU1 supports low frequency range and DU2 supports high frequency range) are considered as two base stations, a high frequency range and a low frequency range may be simultaneously serviced to one UE by using the dual connectivity technology. The multi-connectivity technology may be applied to a plurality of DUs.

Figure 1H:
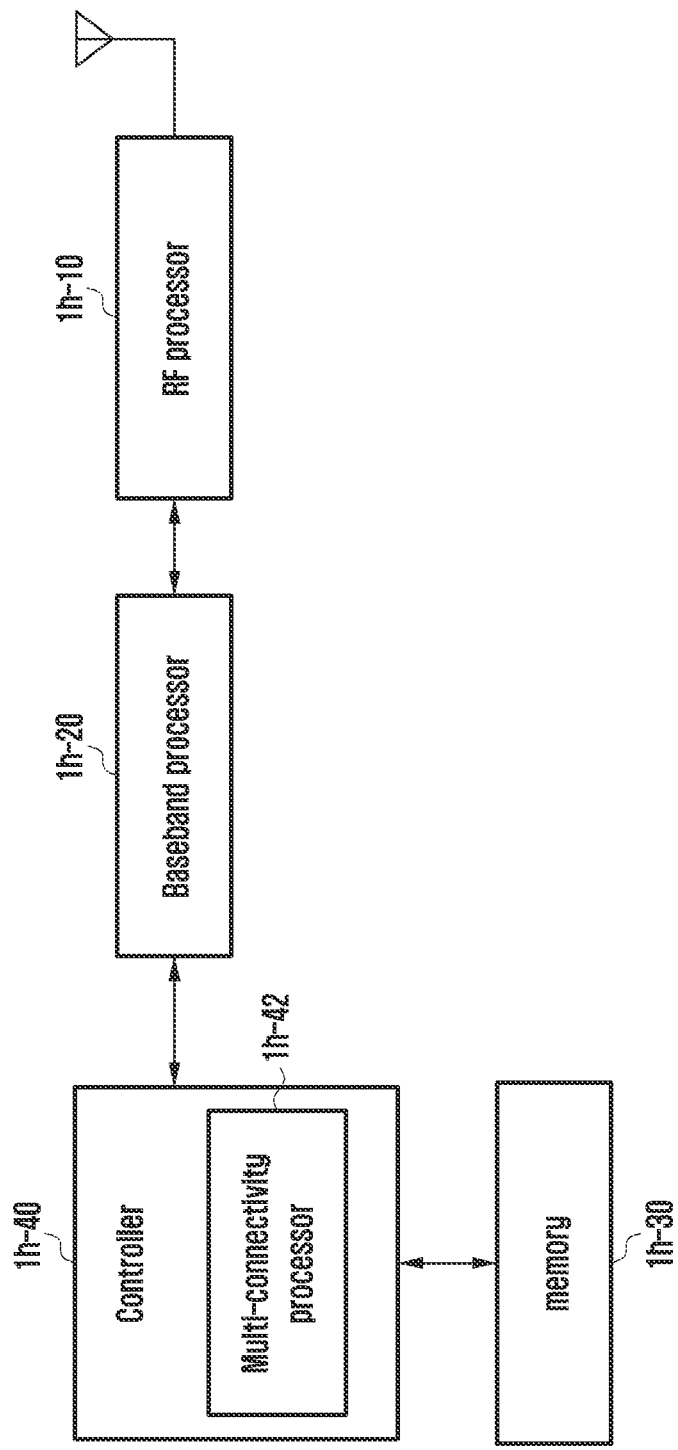
FIG. 1H illustrates a structure of a UE according to an embodiment of the disclosure.
Figure 11:
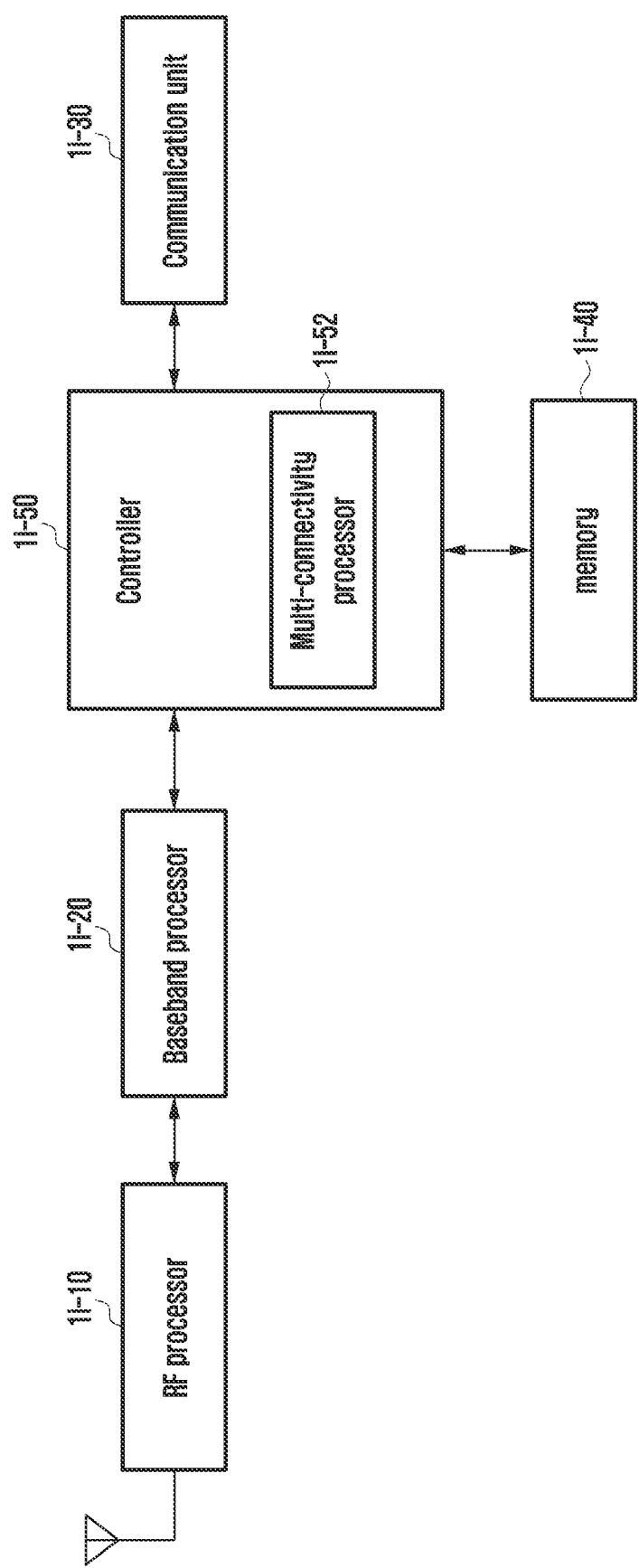

FIG. 1H illustrates a structure of a UE according to an embodiment of the disclosure.

Referring to FIG. 1H, the UE includes a radio frequency (RF) processor 1h-10, a baseband processor 1h-20, a storage unit (memory) 1h-30, and a controller 1h-40.

The RF processor 1h-10 performs a function for transmitting or receiving a signal through a radio channel, such as band conversion and amplification of a signal. That is, the RF processor 1h-10 up-converts a baseband signal provided from the baseband processor 1h-20 into an RF band signal and transmits the same through an antenna, and down-converts a RF band signal, received through the antenna, to a baseband signal. For example, the RF processor 1h-10 may include a transmission filter, a reception filter, an amplifier, a mixer, an oscillator, a digital to analog converter (DAC), an analog to digital converter (ADC), and the like. In FIG. 1H, only one antenna is shown, but the UE may include a plurality of antennas. In addition, the RF processor 1h-10 may include a plurality of RF chains. Moreover, the RF processor 1h-10 may perform beamforming. For the beamforming, the RF processor 1h-10 may control a phase and a size of each signal transmitted or received through a multiple of antennas or antenna elements. In addition, the RF processor may perform MIMO, and may receive multiple layers in the case of performing the MIMO operation. The RF processor 1h-10 may perform reception beam sweeping by appropriately configuring a plurality of antennas or antenna elements under the control of the controller, or may adjust a direction and a beam width of the reception beam so that the reception beam is coordinated with the transmission beam.

The baseband processor 1h-20 performs a function for a conversion between a baseband signal and a bit stream according to a physical layer standard of the system. For example, if data is transmitted, the baseband processor 1h-20 generates complex symbols by encoding and modulating a transmission bit stream. In addition, if data is received, the baseband processor 1h-20 reconstructs the received bit string by demodulating and decoding the baseband signal provided from the RF processor 1h-10. For example, in an OFDM scheme, if data is transmitted, the baseband processor 1h-20 generates complex symbols by encoding and modulating a transmission bit stream, mapping the complex symbols to subcarriers, and then configures OFDM symbols through an inverse fast Fourier transform (IFFT) operation and a cyclic prefix (CP) insertion. Further, if data is received, the baseband processor 1h-20 divides the baseband signal provided from the RF processor 1h-10 in units of OFDM symbols, reconstructs the signals mapped to the subcarriers through a fast Fourier transform (FFT) operation, and then reconstructs a reception bit stream through demodulation and decoding.

The baseband processor 1h-20 and the RF processor 1h-10 transmit and receive signals as described above.

Accordingly, the baseband processor 1h-20 and the RF processor 1h-10 may be referred to as a transmitter, a receiver, a transceiver, or a communication unit. Furthermore, at least one of the baseband processor 1h-20 and the RF processor 1h-10 may include a plurality of communication modules to support different radio access technologies. In addition, at least one of the baseband processor 1h-20 and the RF processor 1h-10 may include different communication modules to process signals of different frequency bands. For example, the different radio access technologies may include an LTE network, an NR network, and the like. Further, the different frequency bands may include a super high frequency (SHF) (for example, 2.5 GHz and 5 GHz) band and a millimeter (mm) wave (for example, 60 GHz) band.

The storage unit 1h-30 stores data, such as a basic program, an application program, and configuration information for the operation of the UE. The storage unit 1h-30 provides stored data at the request of the controller 1h-40.

The controller 1h-40 controls overall operations of the UE. For example, the controller 1h-40 transmits or receives a signal through the baseband processor 1h-20 and the RF processor 1h-10. In addition, the controller 1h-40 records and reads data in and from the storage unit 1h-30. To this end, the controller 1h-40 may include at least one processor. For example, the controller 1h-40 may include a communication processor (CP) for performing a control for communication, and an application processor (AP) for controlling a higher layer such as an application program. The controller 1h-40 may further include a multi-connectivity processor 1h-42 for supporting multi-connection.

FIG. 1I illustrates a block configuration of a transmission and reception point (TRP) in a wireless communication system according to an embodiment of the disclosure.

Referring to FIG. 1I, the base station includes an RF processor 1i-10, a baseband processor 1i-20, a communication unit (or backhaul communication unit) 1i-30, a storage unit (memory) 1i-40, and a controller 1i-50.

The RF processor 1i-10 performs a function for transmitting or receiving a signal through a radio channel, such as band conversion and amplification of a signal. That is, the RF processor 1i-10 up-converts a baseband signal provided from the baseband processor 1i-20 into an RF band signal and then transmits the converted signal through an antenna, and down-converts an RF band signal received through the antenna into a baseband signal. For example, the RF processor 1i-10 may include a transmission filter, a reception filter, an amplifier, a mixer, an oscillator, a DAC, and an ADC. In FIG. 1I, only one antenna is shown, but the first access node may include a plurality of antennas. In addition, the RF processor 1i-10 may include a plurality of RF chains. In addition, the RF processor 1i-10 may perform beamforming. For the beamforming, the RF processor 1i-10 may control a phase and a size of each of the signals transmitted or received through a multiple of antennas or antenna elements. The RF processor may perform a downlink MIMO operation by transmitting one or more layers.

The baseband processor 1i-20 performs a function of a conversion between the baseband signal and the bit string according to the physical layer standard of the first radio access technology. For example, if data is transmitted, the baseband processor 1i-20 generates complex symbols by encoding and modulating a transmission bit stream. In addition, if data is received, the baseband processor 1i-20 reconstructs the received bit string by demodulating and decoding the baseband signal provided from the RF processor 1i-10. For example, in an OFDM scheme, if data is transmitted, the baseband processor 1i-20 may generate complex symbols by encoding and modulating the transmission bit stream, map the complex symbols to subcarriers, and then configure OFDM symbols through an IFFT operation and CP insertion. In addition, if data is received, the baseband processor 1i-20 divides the baseband signal provided from the RF processor 1i-10 in units of OFDM symbols, reconstructs the signals mapped to the subcarriers through an FFT operation, and then reconstructs a reception bit stream through demodulation and decoding. The baseband processor 1i-20 and the RF processor 1i-10 transmit and receive signals as described above. Accordingly, the baseband processor 1i-20 and the RF processor 1i-10 may be referred to as a transmitter, a receiver, a transceiver, a communication unit, or a wireless communication unit.

The communication unit 1i-30 provides an interface for communicating with other nodes in the network.

The storage unit 1i-40 stores data, such as a basic program, an application program, and configuration information for the operation of a main base station. In particular, the storage unit 1i-40 may store information on a bearer allocated to a connected terminal, a measurement result reported from the connected terminal, and the like. In addition, the storage unit 1i-40 may store information that is a criterion for determining whether to provide or terminate multi-connection to the terminal. The storage unit 1i-40 provides stored data at the request of the controller 1i-50.

The controller 1i-50 controls the overall operations of the main base station. For example, the controller 1i-50 transmits or receives a signal through the baseband processor 1i-20 and the RF processor 1i-10 or through a backhaul communication unit 1i-30. In addition, the controller 1i-50 records and reads data in and from the storage unit 1i-40. To this end, the controller 1i-50 may include at least one processor. The controller 1i-50 may further include a multi-connectivity processor 1i-52 for supporting multi-connection.

Second Embodiment

Figure 2A:
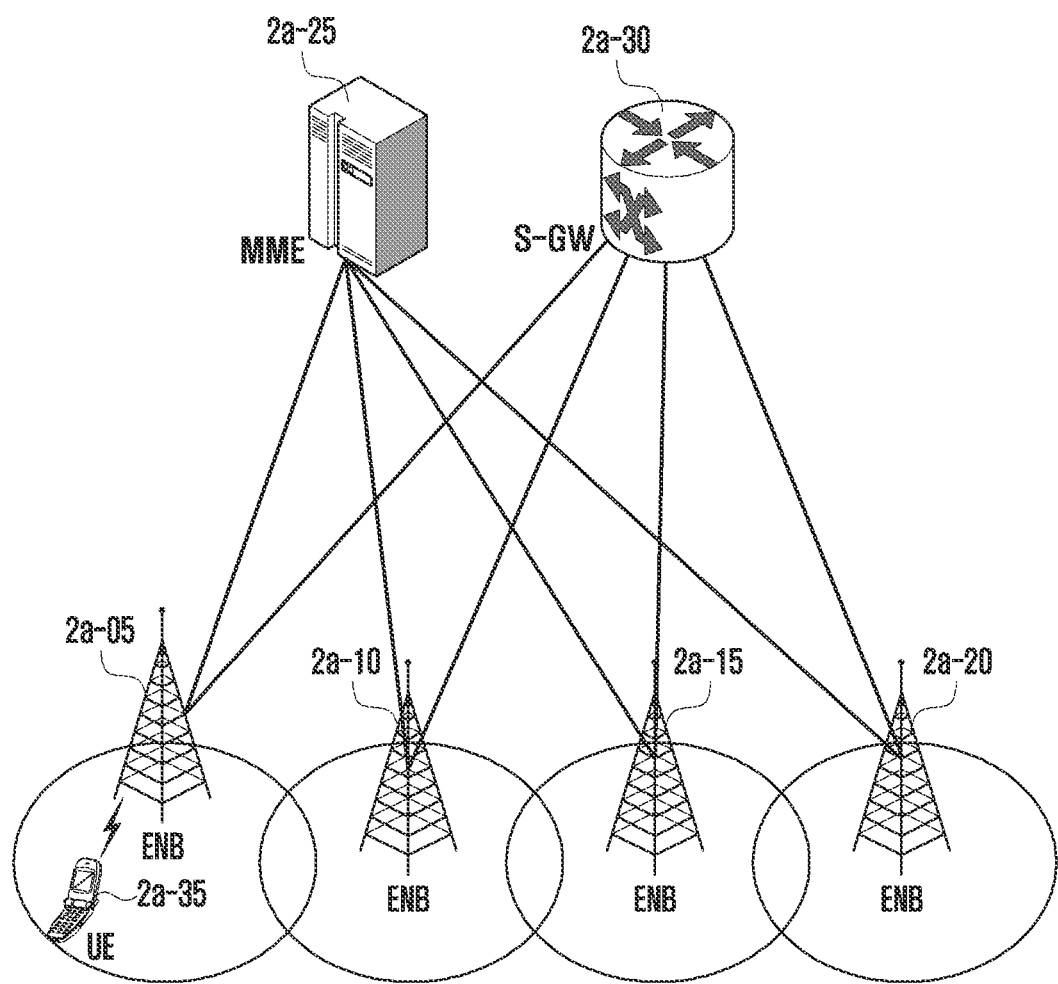
FIG. 2A illustrates a structure of an LTE system according to an embodiment of the disclosure.

FIG. 2A illustrates the structure of an LTE system to according to an embodiment of the disclosure.

Referring to FIG. 2A, a radio access network of an LTE system includes next generation base stations (also referred to as evolved node Bs, hereinafter eNBs, node Bs, or base stations) 2a-05, 2a-10, 2a-15, and 2a-20, a mobility management entity (MME) 2a-25, and a serving gateway (S-GW) 2a-30. A user equipment (hereinafter UE or terminal) 2a-35 accesses an external network through the eNBs 2a-05 to 2a-20 and S-GW 2a-30.

In FIG. 2A, the eNBs 2a-05 to 2a-20 correspond to an existing node B of an UMTS system. The eNBs are connected to the UE 2a-35 through a radio channel, and perform a more complicated role than the existing node B. In the LTE system, since all user traffics including a real-time service, such as voice over IP (VoIP), via the Internet protocol, are serviced through a shared channel, a device that performs schedules by collecting state information, such as buffer states, available transmit power states, and channel states of UEs, is required, and eNB 2a-05 to 2a-20 are in charge of such a function of the device. In general, one eNB controls a plurality of cells. For example, in order to implement a transmission rate of 100 Mbps, the LTE system uses an orthogonal frequency division multiplexing (hereinafter referred to as OFDM) as a radio access technology in the bandwidth of 20 MHz. In addition, the LTE system adopts an AMC scheme for determining a modulation scheme and a channel coding rate based on the channel state of the UE. The S-GW 2a-30 is a device for providing a data bearer and generating or removing a data bearer under a control of the MME 2a-25. The MME is in charge of various control functions in addition to a mobility management function for the UE, and is connected to a plurality of base stations.

Figure 2B:
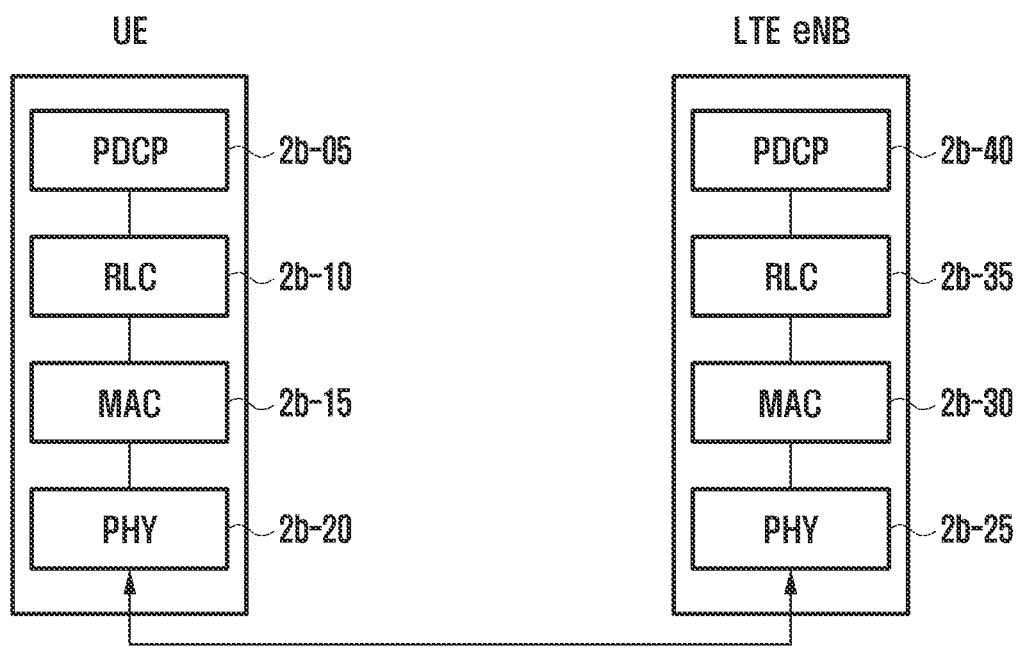
FIG. 2B illustrates a radio protocol architecture in an LTE system according to an embodiment of the disclosure.

FIG. 2B illustrates a radio protocol architecture in an LTE system according to an embodiment of the disclosure.

Referring to FIG. 2B, the radio protocol of the LTE system includes packet data convergence protocols (PDCPs) 2b-05 and 2b-40, RLCs 2b-10 and 2b-35, and medium access controls (MACs) 2b-15 and 2b-30, in a UE and an eNB, respectively. The packet data convergence protocols (PDCPs) 2b-05 and 2b-40 are in charge of an operation, such as IP header compression/restoration. The main functions of PDCPs are summarized as follows.

Header compression and decompression: ROHC only
  Transfer of user data
  In-sequence delivery of higher layer PDUs in a PDCP re-establishment procedure for RLC AM
  Sequence reordering function (For split bearers in DC (only support for RLC AM): PDCP PDU routing for transmission and PDCP PDU reordering for reception)
  Duplicate detection of lower layer SDUs in a PDCP re-establishment procedure for RLC AM
  Retransmission of PDCP SDUs at handover and, for split bearers in DC, of PDCP PDUs at PDCP data-recovery procedure, for RLC AM)
  Ciphering and deciphering
  Timer-based SDU discard function in uplink Radio link controls (hereinafter referred to as RLCs) 2b-10 and 2b-35 may reconfigure a PDCP packet data unit (PDU) in a suitable size and perform an ARQ operation. The main functions of RLCs are summarized as follows.

Transfer of higher layer PDUs
  ARQ function (Error Correction through ARQ (only for AM data transfer))
  Concatenation, segmentation and reassembly of RLC SDUs (only for UM and AM data transfer)
  Re-segmentation of RLC data PDUs (only for AM data transfer))
  Reordering of RLC data PDUs (only for UM and AM data transfer))
  Duplicate detection (only for UM and AM data transfer)
  Protocol error detection (only for AM data transfer)
  RLC SDU discard (only for UM and AM data transfer)
  RLC re-establishment The MACs 2b-15 and 2b-30 are connected to multiple RLC layer entities configured in one terminal, and may perform an operation of multiplexing RLC PDUs with a MAC PDU and demultiplexing the RLC PDUs from the MAC PDU. The main functions of the MAC are summarized as follows.

Mapping between logical channels and transport channels
  Multiplexing/demultiplexing of MAC SDUs belonging to one or different logical channels into/from transport blocks (TB) delivered to/from the physical layer on transport channels
  Scheduling information reporting
  Error correction through hybrid automatic repeat request (HARQ)
  Priority handling between logical channels of one UE
  Priority handling between UEs by means of dynamic scheduling
  MBMS service identification
  Transport format selection
  Padding Physical layers 2b-20 and 2b-25 may perform an operation of channel coding and modulating higher layer data, generating the higher layer data into an OFDM symbol, transmitting the OFDM symbol through a radio channel, or demodulating an OFDM symbol received through a radio channel, channel-decoding the OFDM symbol, and transmitting the OFDM symbol to a higher layer.

Figure 2C:
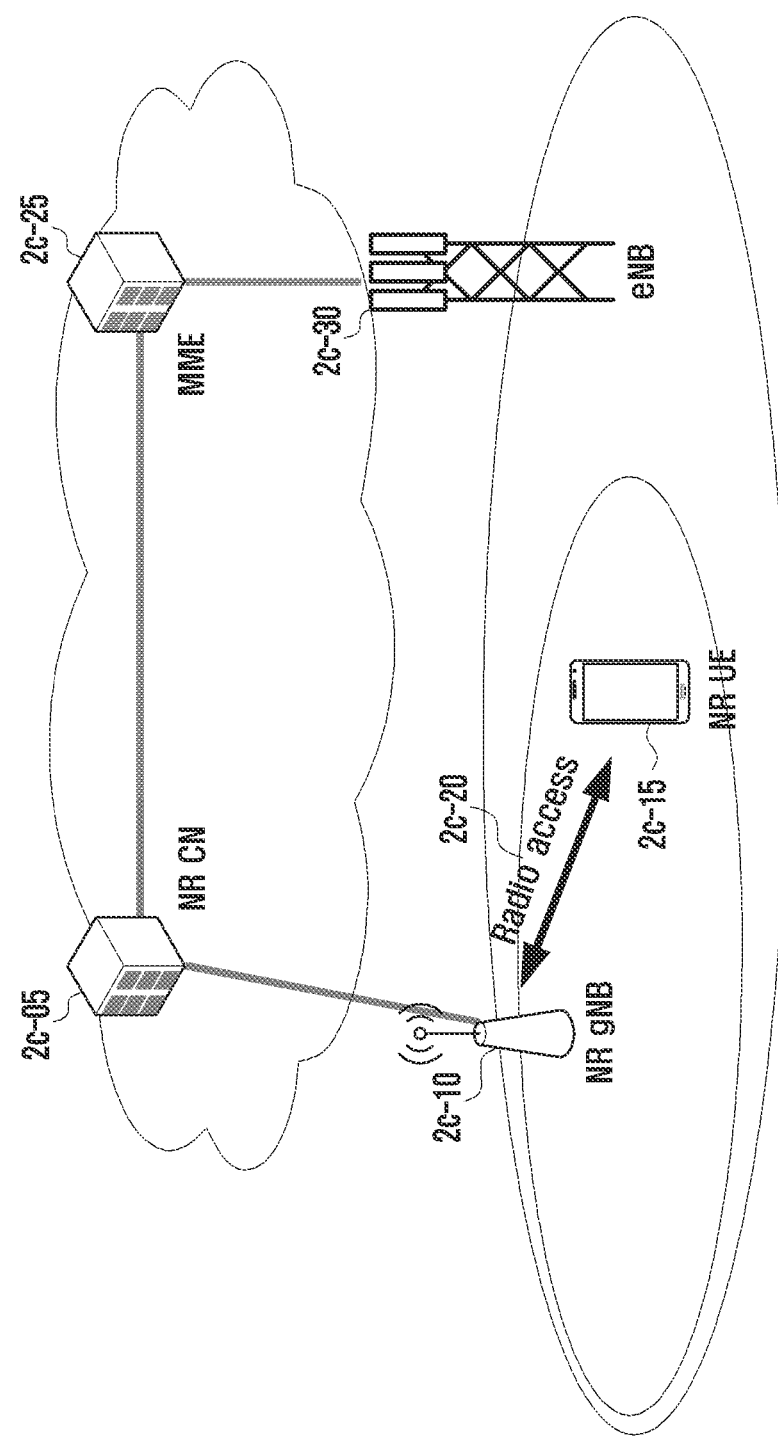
FIG. 2C illustrates a structure of a next generation mobile communication system according to an embodiment of the disclosure.

FIG. 2C illustrates a structure of a next generation mobile communication system according to an embodiment of the disclosure.

Referring to FIG. 2C, a radio access network of a next generation mobile communication system (hereinafter referred to as NR or 5G) includes a new radio node B (hereinafter referred to as NR gNB or NR base station) 2c-10 and a new radio core network (NR CN) 2c-05. A user terminal (a new radio user equipment, hereinafter referred to as NR UE or a terminal) 2c-15 accesses an external network via NR gNB 2c-10 (indicated by reference numeral 2c-20) and NR CN 2c-05.

In FIG. 2C, the NR gNB 2c-10 corresponds to an evolved node B (eNB) of the existing LTE system. The NR gNB is connected to the NR UE 2c-15 via a radio channel and may provide an excellent service as compared to the existing node B. In the next generation mobile communication system, since all types of user traffics are serviced through a shared channel, there is a need for a device for performing scheduling by collecting state information, such as buffer states, available transmission power states, and channel states of UEs. Further, the NR NB 2c-10 is in charge of such function of the device. In general, one NR gNB typically controls a plurality of cells. In order to implement ultra-high speed data transmission as compared to the existing LTE, the NR gNB may have the existing maximum bandwidth or more, and may additionally employ beamforming technology using OFDM as a radio access technology. In addition, the NR gNB adopts an AMC scheme that determines a modulation scheme and a channel coding rate based on the channel state of a UE. The NR CN 2c-05 performs functions, such as mobility support, a bearer configuration, a QoS configuration, and the like. The NR CN 2c-05 is a device that is in charge of various control functions in addition to a mobility management function for a UE, and is connected to a plurality of base stations. In addition, the next generation mobile communication system may also operate in conjunction with the existing LTE system, and the NR CN is connected to an MME 2c-25 via a network interface. The MME is connected to an eNB 2c-30, that is, the existing base station.

Figure 2D:
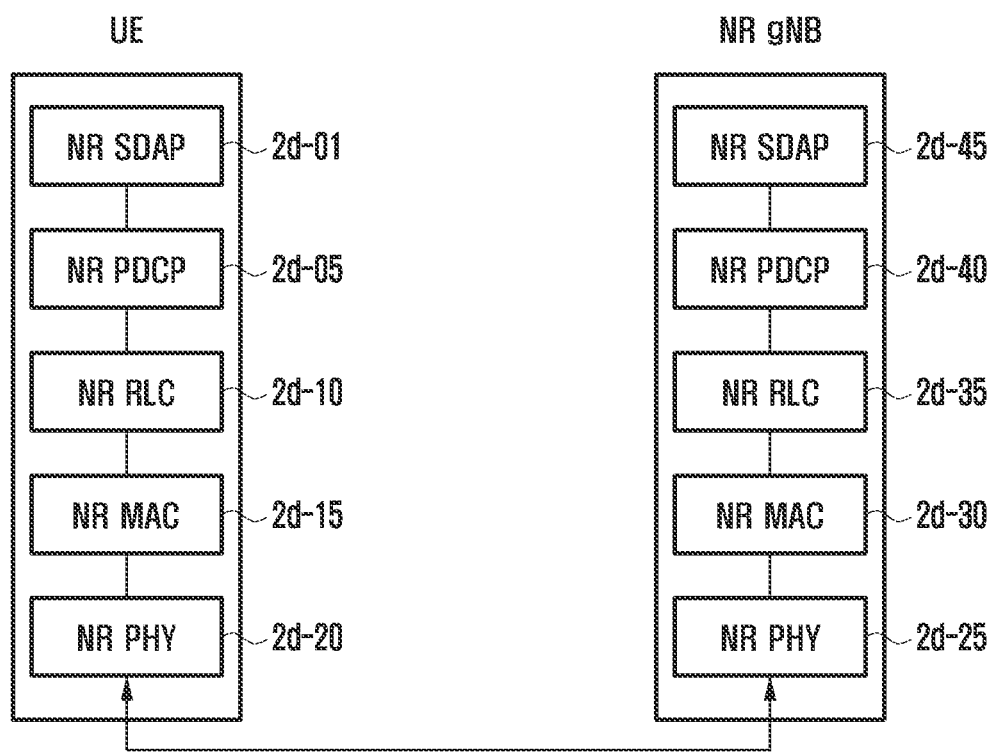
FIG. 2D illustrates a radio protocol architecture of a next generation mobile communication system according to an embodiment of the disclosure.

FIG. 2D illustrates a radio protocol architecture of a next generation mobile communication system according to an embodiment of the disclosure.

Referring to FIG. 2D, the radio protocol of the next generation mobile communication system includes NR SDAPs 2d-01 and 2d-45, NR PDCPs 2d-05 and 2d-40, NR RLCs 2d-10 and 2d-35, and NR MACs 2d-15 and 2d-30, respectively, in a UE and an NR base station.

The main functions of the NR SDAPs 2d-01 and 2d-45 may include some of the following functions.

Transfer of user plane data
  Mapping between a QoS flow and a data bearer (DRB) for both uplink (UL) and downlink (DL)
  Marking QoS flow ID in both UL and DL packets
  Mapping reflective QoS flow to data bearer for UL SDAP PDUs.

A UE may receive a configuration, such as whether to use the header of an SDAP layer entity or the function of the SDAP layer entity, through an RRC message, for each PDCP layer entity, for each bearer, or for each logical channel. If the SDAP header is configured, the UE may be indicated to update or reconfigure mapping information between a QoS flow and a data bearer for the uplink and downlink, via a NAS QoS reflection configuration 1-bit indicator (NAS reflective QoS) and AS QoS reflection configuration 1-bit indicator (AS reflective QoS) of the SDAP header. The SDAP header may include QoS flow ID information indicating QoS. The QoS information may be used as data processing priority, scheduling information, and the like to support a smooth service.

The main function of the NR PDCPs 2d-05 and 2d-40 may include some of the following functions.

Header compression and decompression (ROHC only)
Transfer of user data
In-sequence delivery of higher layer PDUs
Out-of-sequence delivery of higher layer PDUs
PDCP PDU reordering for reception
Duplicate detection of lower layer SDUs
Retransmission of PDCP SDUs
Ciphering and deciphering
Timer-based SDU discard in uplink The reordering function of the NR PDCP device refers to a function of sequentially reordering PDCP PDUs, received from a lower layer, based on a PDCP SN, and may include a function of transmitting data to a higher layer in the sequence of reordering, a function of directly transmitting data to a higher layer without taking the sequence into consideration, a function of reordering the sequence and recording missing PDCP PDUs, a function of providing a state report on the missing PDCP PDUs to a transmission side, and a function of requesting retransmission for the missing PDCP PDUs.

The main functions of the NR RLCs 2d-10 and 2d-35 may include some of the following functions.

Transfer of higher layer PDUs
In-sequence delivery of higher layer PDUs
Out-of-sequence delivery of higher layer PDUs
Error Correction through ARQ
Concatenation, segmentation and reassembly of RLC SDUs
Re-segmentation of RLC data PDUs
Reordering of RLC data PDUs
Duplicate detection
Protocol error detection
RLC SDU discard
RLC re-establishment The in-sequence delivery function of the NR RLC device refers to a function of transmitting RLC SDUs, received from a lower layer, to a higher layer in the sequence of reception, and may include, if one RLC SDU is originally segmented into multiple RLC SDUs and received, a function of reassembling and transmitting the multiple RLC SDUs. The in-sequence delivery function may include a function of reordering the received RLC PDUs based on an RLC SN or PDCP SN, reordering the sequence and recording missing RLC PDUs, providing a state report on the missing RLC PDUs to a transmission side, and requesting retransmission for the missing RLC PDUs. Alternatively, the in-sequence delivery function of the NR RLC device may include a function of sequentially transmitting only the RLC SDUs prior to the missing RLC SDU to a higher layer if the missing RLC SDU occurs, or sequentially transmitting all the RLC SDUs received before a timer starts to a higher layer if the timer expires although there is a missing RLC SDU, or sequentially transmitting all RLC SDUs received so far to a higher layer if a predetermined timer expires although there is a missing RLC SDU. In addition, the RLC PDUs may be processed in the sequence that the RLC PDUS are received (in the sequence of arrival regardless of the sequence of serial number and sequence number), and be transmitted to a PDCP device out of sequence delivery. The in-sequence delivery function may include a function of receiving segments stored in a buffer or segments to be received later, reconfiguring the segments in one complete RLC PDU, processing the RLC PDU, and transmitting the RLC PDU to the PDCP device. The NR RLC layer may not include a concatenation function, and the concatenation function may be performed by the NR MAC layer or may be replaced by a multiplexing function of the NR MAC layer.

The out-of-sequence delivery function of the NR RLC device refers to a function of directly transmitting the RLC SDUs, received from the lower layer, to a higher layer regardless of the order, and may include, if one RLC SDU has been originally segmented into multiple RLC SDUs and received, a function of reassembling the multiple RLC SDUs and transmitting the same, and a function of storing the RLC SNs or PDCP SNs of the received RLC PDUs, reordering the sequence, and recording the missing RLC PDUs.

The NR MACs 2d-15 and 2d-30 may be connected to multiple NR RLC layer entities configured in one UE, and a main function of the NR MAC may include some of the following functions.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding The NR PHY layers 2d-20 and 2d-25 may perform an operation of channel-coding and modulating higher layer data, generating the higher layer data into an OFDM symbol, transmitting the OFDM symbols via a radio channel, or demodulating and channel decoding of the OFDM symbols received via the radio channel, and transferring the OFDM symbol to a higher layer.

In the LTE system, a UE performs frequency measurement while performing a cell reselection procedure in the RRC idle mode. The frequency measured while performing the cell reselection procedure may denote intra-frequency measurement or serving cell or Pcell measurement for frequencies broadcasted by a cell configured or camped on by a base station. However, inter-frequency measurement is not performed except for intra-frequency measurement or serving cell measurement, and the frequency measurement result is not separately reported to a network.

That is, if the UE finds a suitable cell by performing the cell reselection procedure, camps on the cell, and then is switched to the RRC connected mode by performing an RRC connection re-establishment procedure, the base station may provide configurations, to a UE in the RRC connected mode, including: frequencies or frequency bands (e.g., a frequency list) to be measured; the sequence in which measurements are performed based on a priority configured for each frequency; a filtering method (e.g., an L1 filtering, L2 filtering, or L3 filtering method, a calculation method using a coefficient) to be used for measurement of the intensity of the frequency when measuring the frequency; an event or condition in which the frequency measurement is to begin; an event or condition in which the frequency measurement is to begin; a criterion for performing measurement when compared to a current serving cell (or a frequency on which the UE currently camps); an event or condition in which a result of the frequency measurement is to be reported; the criterion or the condition that should be satisfied for frequency reporting when compared to the current serving cell (or a frequency on which the UE currently camps on); and a period in which a result of the frequency measurement is to be reported. The UE measures corresponding frequencies according to the frequency configuration, configured by the base station as described above, and reports the frequency measurement results to the base station based on the corresponding event or condition. In addition, the base station may determine whether to apply a carrier aggregation or dual connectivity technology to the UE based on the frequency measurement result received from the UE.

The disclosure proposes a method in which the UE performs frequency measurement in an RRC idle mode or an RRC inactive mode corresponding to a mode before the UE is switched to an RRC connected mode, indicates a result of frequency measurement to a base station if the UE establishes a connection with a network, and enters the RRC connected mode to report a result of early frequency measurement in the next generation mobile communication system. Based on the method, the base station may rapidly configure a frequency aggregation technology or a dual connectivity technology in the UE, based on the result measured by the UE in the RRC idle mode or the RRC inactive mode.

In more detail, in a case of switching a UE in the RRC connected mode, which has established a connection with a network, to an RRC idle mode or an RRC inactive mode, the base station may: configure, through an RRC message, frequency information or frequencies to be measured by the UE in the RRC idle mode or the RRC inactive mode, time (or period) information to be measured by the UE in the RRC idle mode or the RRC inactive mode, or area information (or a cell list) to be measured by the UE in the RRC idle mode or the RRC inactive mode; and then instruct the UE, through the RRC message, to perform frequency measurement in the RRC idle mode or the RRC inactive mode. In addition, the disclosure proposes an efficient operation of the UE such that the UE performs a procedure of, for example, reading system information of the newly camped-on cell while performing a cell reselection operation every time the UE moves, and determining whether to continue or end frequency measurement, whether to extend a measurement period (for example, restart a timer), whether to report a frequency or discard a result of the frequency measurement in the RRC idle mode or the RRC inactive mode according to the system information.

In the disclosure, a bearer may denote an SRB and a DRB, the SRB denotes a signaling radio bearer, and a DRB denotes a data radio bearer. The UM DRB denotes a DRB using an RLC layer entity operating in a UM mode, and an AM DRB denotes a DRB using an RLC layer entity operating in an AM mode.

Figure 2E:
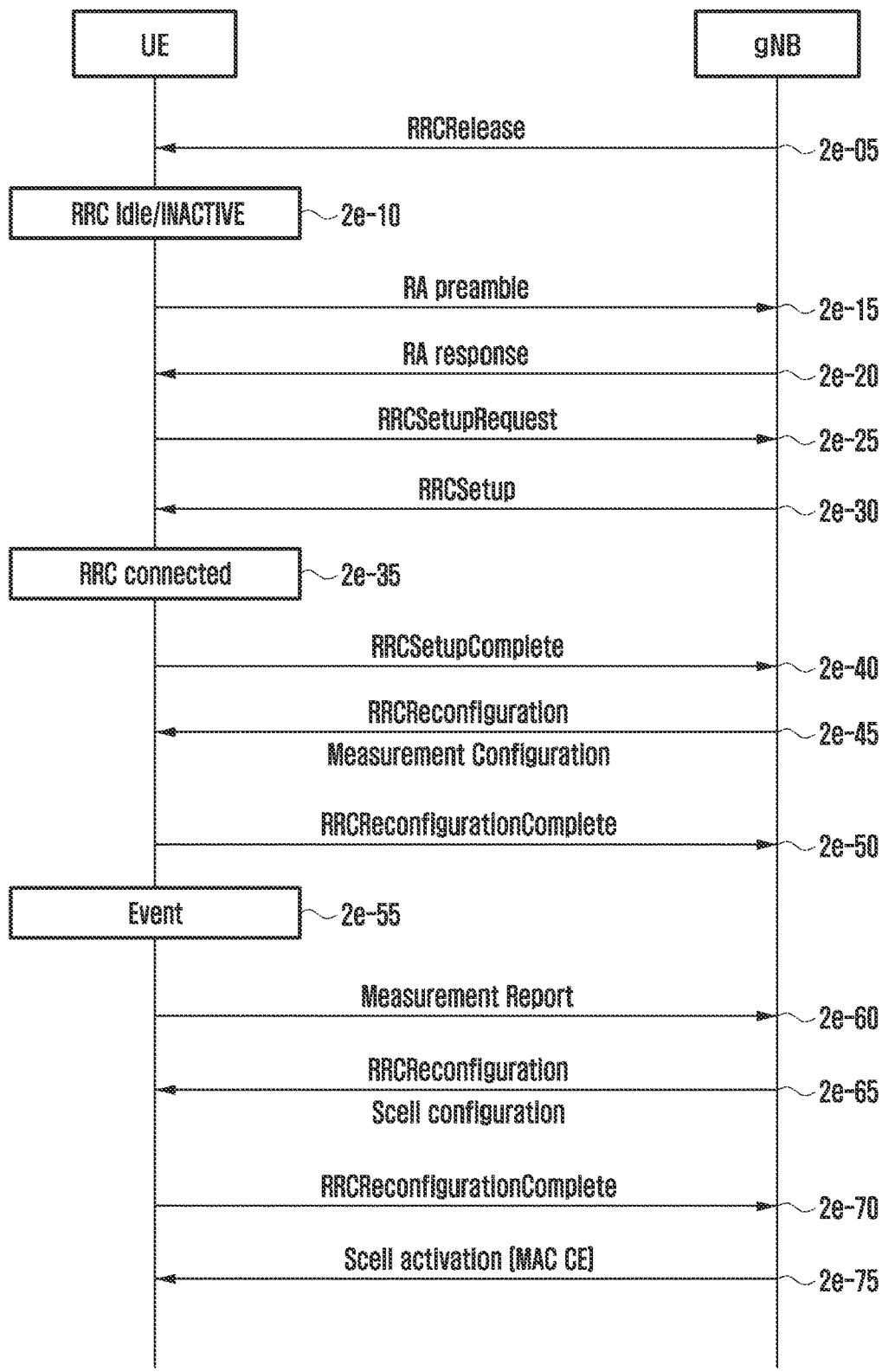
FIG. 2E illustrates a procedure in which a UE is switched from an RRC idle mode or an RRC inactive mode to an RRC connected mode and configures a carrier aggregation technology in a next generation mobile communication system according to an embodiment of the disclosure.

FIG. 2E illustrates a procedure, in which a UE is switched from an RRC idle mode or an RRC inactive mode to an RRC connected mode and configures a carrier aggregation technology, in a next generation mobile communication system according to an embodiment of the disclosure.

Referring to FIG. 2E, the base station may switch the RRC connected mode UE, which has established a connection with a network UE, to the RRC idle mode or the RRC inactive mode for a predetermined cause. The predetermined cause may be a lack of scheduling resources of a base station or stopping of data transmission or reception to or from the UE for a predetermined time.

In the above, the base station may transmit an RRCRelease message to the UE to indicate to switch the UE to the RRC idle mode or the RRC inactive mode. In the RRCRelease message, an indicator (suspend-config) may indicate to switch the UE to the RRC inactive mode, and if the indicator (suspend-config) is not included in the RRCRelease message, the UE may be switched to the RRC idle mode (indicated by reference numeral 2e-05).

If a connection with the network is necessary for some causes, the UE is switched to the RRC idle mode or the RRC inactive mode, and may perform a random access procedure, receive a random access response, request an RRC connection configuration, and receive an RRC message so as to perform an RRC connection configuration (indicated by reference numerals 2e-10, 2e-15, 2e-20, 2e-25, 2e-30, 2e-35, and 2e-40).

The UE establishes reverse transmission synchronization with the base station through a random access procedure and transmits an RRCSetupRequest message to the base station (indicated by reference numeral 2e-25). The RRCSetupRequest message may include a cause (establishmentCause) for establishing a connection with an identifier of the UE.

The base station transmits an RRCSetup message so that the UE establishes an RRC connection (indicated by reference numeral 2e-30). The RRCSetup message may include at least one of configuration information for each logical channel, configuration information for each bearer, configuration information of a PDCP layer entity, configuration information for an RLC layer entity, and configuration information of a MAC layer entity.

The RRCSetup message may allocate a bearer identifier (for example, an SRB identifier or a DRB identifier) to each bearer, and may indicate configurations of a PDCP layer entity, an RLC layer entity, a MAC layer entity, and a PHY layer entity for each bearer. In addition, the base station may configure, through the RRCSetup message, a length (for example, 12 bits or 18 bits) of a PDCP serial number used by the PDCP layer entity for each bearer, and a length (for example, 6 bits or 12 bits or 18 bits) of the RLC serial number used by the RLC layer entity. In addition, the base station may indicate, through the RRCSetup message, whether to use a header compression and decompression protocol for the PDCP layer entity in the uplink or the downlink, for each bearer, and may indicate whether to perform an integrity protection or verification procedure. In addition, the base station may indicate whether to perform an out-of-order delivery function in the PDCP layer entity.

The UE, which has established the RRC connection, transmits an RRCSetupComplete message to the base station (indicated by reference numeral 2e-40). The RRCSetupComplete message may include a control message called "SERVICE REQUEST" requesting the AMF or MME to establish a bearer configuration for a predetermined service. The base station may transmit the SERVICE REQUEST message received in an RRCSetupComplete message to the AMF or MME, and the AMF or MME may determine whether to provide a service requested by the UE.

As a result of determination, if the AMF or MME determines to provide a service requested by the UE, the AMF or MME transmits a message called "INITIAL CONTEXT SETUP REQUEST" to the base station. The INITIAL CONTEXT SETUP REQUEST message may include information, such as quality of service (QoS) information to be applied if a data radio bearer (DRB) is configured, and security related information (for example, security key and security algorithm) to be applied to the DRB.

The base station transmits or receives a SecurityModeCommand message and a SecurityModeComplete message to configure security with the UE, and if the security configuration is completed, the base station transmits an RRCReconfiguration message to the UE (indicated by reference numeral 2e-45).

The RRCReconfiguration message may allocate a bearer identifier (for example, an SRB identifier or a DRB identifier) to each bearer, and may indicate, for each bearer, configurations of a PDCP layer entity, an RLC layer entity, a MAC layer entity, and a PHY layer entity. In addition, the RRCReconfiguration message may configure, for each bearer, a length (e.g., 12 bits or 18 bits) of a PDCP serial number used by the PDCP layer entity, and a length (e.g., 6 bits, 12 bits, or 18 bits) of an RLC serial number used by the RLC layer entity. In addition, the RRCReconfiguration message may indicate, for each bearer, whether to use a header compression and decompression protocol for the PDCP layer entity in the uplink or the downlink, and may indicate whether to perform an integrity protection or verification procedure. In addition, the RRCReconfiguration message may indicate whether the PDCP layer entity performs out-of-order delivery.

In addition, the RRCReconfiguration message may include configuration information of a DRB in which user data is to be processed (indicated by reference numeral 2e-45), and the UE configures the DRB by applying the information and transmits an RRCReconfigurationComplete message to the base station (indicated by reference numeral 2e-50). After completing DRB configuration with the UE, the base station may transmit an INITIAL CONTEXT SETUP COMPLETE message to the AMF or MME and complete the connection.

If the above process is completed, the UE transmits or receives data through the base station and a core network (indicated by reference numerals 2e-55 and 2e-60). According to some embodiments, the data transmission process largely includes three operations: RRC connection configuration, security configuration, and DRB configuration. In addition, the base station may transmit an RRCReconfiguration message in order to update, add, or change the configuration to the UE for a predetermined cause (indicated by reference numeral 2e-65).

The RRCReconfiguration message may configure frequency configuration information to be measured by the UE (for example, a list of frequencies to be measured or a period for measuring a frequency, a condition for measuring a frequency, a condition for a frequency report after frequency measurement, a cell identifier for reporting a frequency, and the like).

According to the frequency measurement configuration information, the UE performs frequency measurement and if a predetermined condition is satisfied or event occurs (for example, if a signal strength of a specific frequency is better than a predetermined reference (for example, a threshold value) or a signal strength of a current serving cell (frequency) is smaller than a predetermined reference (for example, a threshold value)) (indicated by reference numeral 2e-55), the UE may report a result of the frequency measurement to the base station (indicated by reference numeral 2e-60).

If the base station receives the frequency measurement result, the base station includes Scell configuration information in the RRCReconfiguration message based on the frequency measurement result (indicated by reference numeral 2e-65) and transmits the RRCReconfiguration message to the UE to configure a secondary Scell, and may configure the carrier aggregation technology for the UE. The base station may include secondary cell group configuration information in the RRCReconfiguration message, transmit the RRCReconfiguration message to the UE, and configure the dual connectivity technology for the UE (indicated by reference numeral 2e-65). The UE applies information included in the RRCReconfiguration message and transmits an RRCReconfigurationComplete message to the base station (indicated by reference numeral 2e-70).

If the base station has configured the carrier aggregation technology for the UE, the base station may switch the S cells configured above to an active, inactive or dormant state using a MAC control element (MAC CE) (indicated by reference numeral 2e-75).

As described above, the procedure of configuring the carrier aggregation technology or the dual connectivity technology for the UE by the base station may be summarized as follows. First, if the UE establishes a connection with the base station, and the base station configures frequency measurement configuration information for the UE, the UE performs frequency measurement based on the frequency measurement configuration information and reports the measurement result to the base station. Further, in order to configure the carrier aggregation technology for the UE based on the frequency measurement result of the UE, the base station may configure, through the RRC message, configuration information for the secondary cell, and may transmit the MAC CE to enable activation, dormancy, or inactivation of the S cell. In addition, the base station may configure secondary cell group configuration information in order to configure the dual connectivity technology for the UE based on the frequency measurement result of the UE.

As described above, if the base station configures the carrier aggregation technology or the dual connectivity technology for the UE, since the UE first enters the RRC connected mode, receives the frequency configuration information, performs the frequency measurement, and reports the measurement, the measurement report is performed very late. Therefore, there is a problem that the carrier aggregation technology or the dual connectivity technology is configured late. Therefore, in order to resolve the problem, in the following, the disclosure enables the UE to efficiently perform frequency measurement in the RRC idle mode and immediately report the frequency measurement result if the connection with the network is established.

Figure 2F:
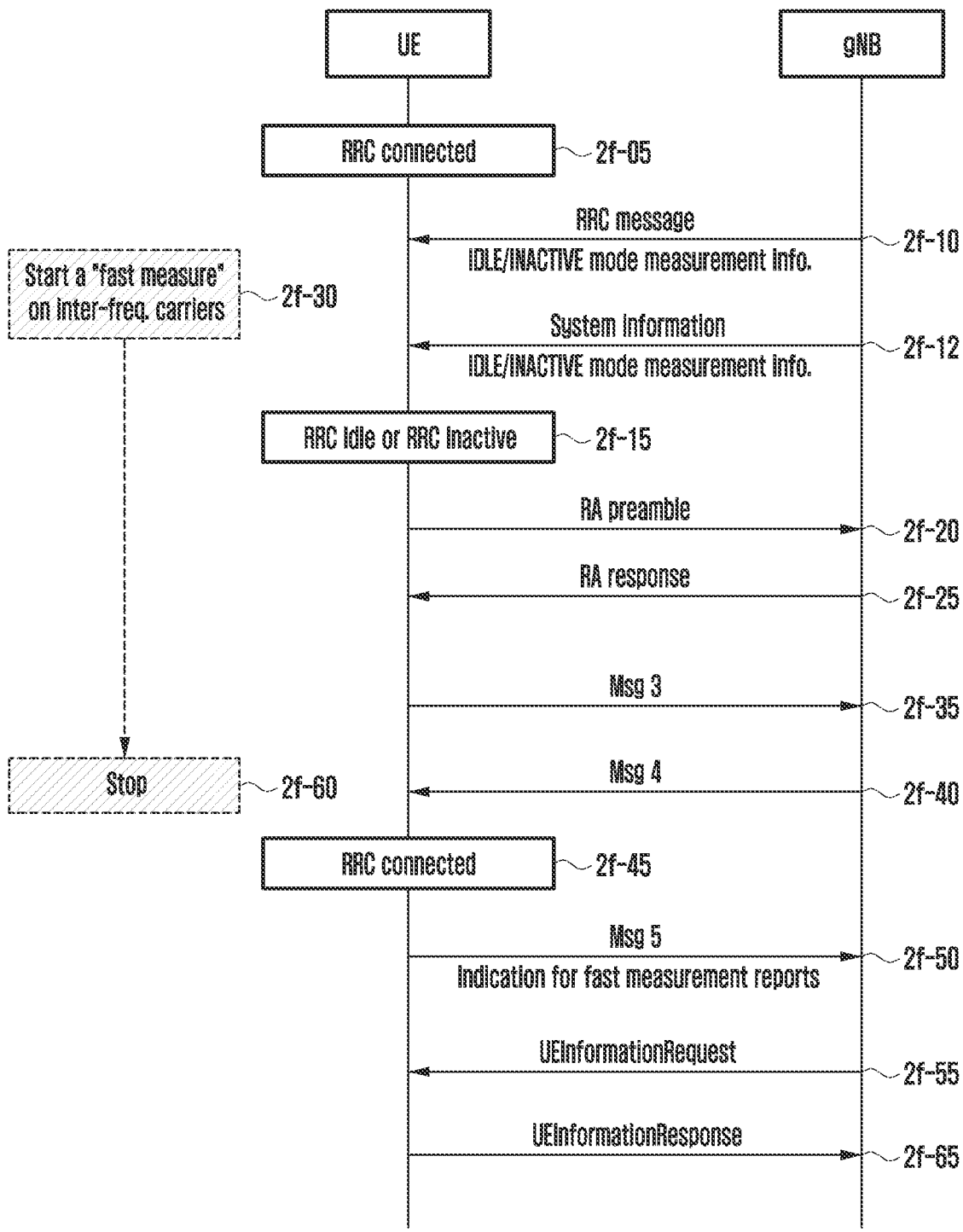
FIG. 2F illustrates second embodiment in which a UE is enabled to perform early measurement in an RRC idle mode or an RRC inactive mode and to make a fast frequency measurement report in a next generation mobile communication system according to an embodiment of the disclosure.

FIG. 2F illustrates a second embodiment in which a terminal is enabled to perform early measurement and to make a fast frequency measurement report in an RRC idle mode or an RRC inactive mode in a next generation mobile communication system according to an embodiment of the disclosure.

According to the second embodiment, a plurality of frequency measurement groups may be configured for the UE, if a base station configures, through an RRCRelease message, frequency measurement configuration information for the UE to perform frequency measurement in an RRC idle mode or an RRC inactive mode.

For example, the base station may provide configurations, to the UE, including a first LTE frequency group and a second LTE frequency group, and may allow the UE to perform the frequency measurement for each of the two groups in the RRC idle mode or the RRC inactive mode and separately store the measurement result for each group and report. For example, the UE may report frequencies with the best signal in the first LTE frequency group and frequencies with the best signal in the second LTE frequency group. In other words, instead of reporting frequencies with the best signal in all of the groups, the UE may configure a plurality of frequency groups to report frequencies with the best signal for each group. Therefore, as the base station efficiently configures a plurality of frequency groups, the carrier aggregation technology or the dual connectivity technology (for example, LTE DC) may be rapidly configured based on the frequency measurement report for each group of the UE.

For example, the base station may provide configurations, to the UE, including a first LTE frequency group and a second NR frequency group, and may allow the UE to perform the frequency measurement for each of the two groups in the RRC idle mode or the RRC inactive mode and separately store the measurement result for each group and report. For example, the UE may report frequencies with the best signal in the first LTE frequency group and frequencies with the best signal in the second NR frequency group. In other words, instead of reporting frequencies with the best signal in all of the groups, the UE may configure a plurality of frequency groups to report frequencies with the best signal for each group. Therefore, as the base station efficiently configures a plurality of frequency groups, the carrier aggregation technology or the dual connectivity technology (for example, EN-DC or NE-DC (dual connectivity between an LTE base station and an NR base station) may be rapidly configured based on the frequency measurement report for each group of the UE.

For example, the base station may provide configurations, in the UE, including a first NR frequency group and a second NR frequency group, and may allow the UE to perform the frequency measurement for each of the two groups in the RRC idle mode or the RRC inactive mode and separately store the measurement result for each group and report. For example, the UE may report frequencies with the best signal in the first NR frequency group and frequencies with the best signal in the second NR frequency group. In other words, instead of reporting frequencies with the best signal in all of the groups, the UE may configure a plurality of frequency groups to report frequencies with the best signal for each group. Therefore, as the base station efficiently configures a plurality of frequency groups, the carrier aggregation technology or the dual connectivity technology (for example, NR-DC (dual connectivity between NR base stations) may be rapidly configured based on the frequency measurement report for each group of the UE.

In the second embodiment, the UE capable of performing early frequency measurement and fast reporting a result of frequency measurement in the RRC idle mode or the RRC inactive mode may be a UE corresponding to one or a plurality of the following cases.

1. All of UEs having a capability of supporting a method for performing frequency measurement and making a fast frequency measurement report in RRC idle mode or RRC inactive mode.

2. A UE having received configuration information, which indicates the UE to perform frequency measurement in the RRC idle mode or the RRC inactive mode in a case where the base station switches the UE from the RRC connected mode to the RRC idle mode or the RRC inactive mode, through an RRC message, among the RRC idle mode or inactive mode UEs. For example, a UE for which the base station configures frequency configuration information, a measurement period (e.g., a timer value) for performing frequency measurement, or area configuration information (e.g., a list of cell identifiers) for performing frequency measurement in the RRC idle mode or the RRC inactive mode.

Referring to FIG. 2F, the UE in the RRC connected mode 2f-05 may be switched to the RRC idle mode or the RRC inactive mode by the base station for a predetermined cause (for example, no data is transmitted or received for a predetermined period of time) (indicated by reference numeral 2f-15). In the above, the base station transmits an RRC message if the base station switches the mode of the UE (indicated by reference numeral 2f-10). For example, an RRCRelease message (indicating switching to the RRC idle mode) or an RRCRelease message (indicating switching to the RRC inactive mode) including suspend-config may be transmitted. The RRC message may include a plurality of pieces of information or parts thereof to be applied if the UE performs early frequency measurement in the RRC idle mode or the RRC inactive mode.

Frequency configuration information to be measured in the RRC idle mode or the RRC inactive mode
Frequency configuration information
LTE frequency measurement information group or list (EUTRA frequency configuration information/list/group)
The base station provides configurations, to a UE, including frequencies (e.g., a frequency list) or frequency bands to be measured; and a priority for each frequency. That is, the base station may provide configurations, to a UE, including: the sequence in which measurements are performed based on the priority configured for each frequency; a filtering method (e.g., an L1 filtering, L2 filtering, or L3 filtering method, a calculation method using a coefficient) to be used for measurement of the intensity of the frequency when measuring the frequency; an event or condition in which the frequency measurement is to begin; a criterion (e.g., in a case where a signal strength is equal to or greater than the indicated threshold value) for performing measurement and reporting when compared to a current serving cell (or a frequency on which the UE currently camps; an event or condition in which the measured frequency result is to be reported; the criterion or the condition that should be satisfied for frequency reporting when compared to the current serving cell (or the frequency on which the UE currently camps on); and a period in which the frequency measurement result is to be reported.
NR frequency measurement information group or list (NR frequency configuration information/list/group)
The base station may configure, to the UE, frequencies or frequency bands (for example, frequency list) to be measured; SSB identifier information of each frequency or SSB transmission resources (frequency and time resources), or the priority for each frequency (or each SSB). That is, the base station may provide configurations, to a UE, frequency measurement configuration information (early measurement setup) including: the sequence in which measurements are performed based on SSB identifier information of each frequency or SSB transmission resources (frequency and time resources), or the priority configured for each frequency; a filtering method (e.g., an L1 filtering, L2 filtering, or L3 filtering method, a calculation method using a coefficient) to be used for measurement of the intensity of the frequency when measuring the frequency; an event or condition in which the frequency measurement is to begin; a criterion (e.g., in a case where a signal strength is equal to or greater than the indicated threshold value) for performing measurement and reporting when compared to a current serving cell (or a frequency on which the UE currently camps; an event or condition in which the measured frequency result is to be reported; the criterion or the condition that should be satisfied for frequency reporting when compared to the current serving cell (or the frequency on which the UE currently camps on); and a period in which the frequency measurement result is to be reported.

A period of time for performing frequency measurement or a timer value (for example T331) for performing frequency measurement in the RRC idle mode or the RRC inactive mode. For example, if the RRCRelease message indicates the UE to perform frequency measurement in the RRC idle mode or the RRC inactive mode, the UE may start a timer to perform frequency measurement while the timer is running, and the frequency measurement may be stopped if the timer expires.

Area information for performing frequency measurements in the RRC idle mode or the RRC inactive mode. For example, if the area information indicates a list of physical cell identifiers (PCID) and the UE is located in a cell indicated by the area information, frequency measurement may be performed and if the UE is located out of cell indicated by the area information, the frequency measurement may be stopped. For example, if UE is located out of the cell indicated by the area information, the timer may be stopped and frequency measurement may be stopped.

A measurement report threshold value may be configured and a plurality of frequencies, which have a better signal strength than the threshold value, among the configured frequency group may be reported.

In the above, if the UE performs frequency measurement ("early measurement") in the RRC idle mode or the RRC inactive mode, the frequency measurement may start if one of the following conditions is satisfied (indicated by reference numeral 2*f*-30).

1. In a case where the UE has received the RRCRelease message, if the RRCRelease message includes an indicator indicating the UE to perform frequency measurement in the RRC idle mode or the RRC inactive mode, and frequency information to be measured and a period of time (e.g., a timer value) for measuring the frequency are configured therein, the UE may start a timer and perform frequency measurement according to the frequency information.

2. In a case where the UE has received the RRCRelease message, if the RRCRelease message includes an indicator indicating the UE to perform frequency measurement in the RRC idle mode or the RRC inactive mode and a period of time (e.g., a timer value) for measuring the frequency is configured but frequency information to be measured is not included, the UE may start the timer and if the frequency information, which is to be measured in the RRC idle mode or the RRC inactive mode, is broadcasted in the system information, the UE may perform frequency measurement according to the frequency information. If the UE moves to another cell, and if frequency information to be measured in the RRC idle mode or the RRC inactive mode is broadcasted in the system information of a newly camped-on cell, the UE may perform frequency measurement according to the new frequency information.

That is, in the case of not configuring frequency measurement configuration information for performing the frequency measurement in the RRC idle mode or the RRC inactive mode through the RRCRelease message, the UE may perform frequency measurement in the RRC idle mode or the RRC inactive mode, based on the case where the frequency configuration information for performing frequency measurement in the RRC idle mode or the RRC inactive mode is broadcasted in the system information. If the UE moves to camp on a new cell, the frequency measurement information may be updated with frequency configuration information, which is broadcasted to a new cell and used for frequency measurement in the RRC idle mode or the RRC inactive mode, and may perform again frequency measurement (indicated by reference numeral 2*f*-12).

However, in the case of configuring the frequency measurement configuration information for performing frequency measurement in the RRC idle mode or the RRC inactive mode through the RRCRelease message, the UE may preferentially employ frequency measurement configuration information configured in the RRCRelease message prior to frequency measurement information in the RRC idle mode or the RRC inactive mode, broadcasted in system information, and may perform frequency measurement. That is, if the frequency measurement configuration information for performing frequency measurement in the RRC idle mode or the RRC inactive mode is configured in the RRCRelease message, the UE does not reflect or consider the frequency configuration information broadcasted in the system information or discard the frequency configuration information.

According to one or a plurality of the conditions as described above, the UE may start early frequency measurement. The UE may transmit a random access preamble to the base station (2*f*-20), receive a random access response (2*f*-25) from the base station, transmit message 3 (e.g., RRCSetupRequest or RRCResumeRequest message) to the base station (indicated by reference numeral 2*f*-35) while performing frequency measurement, receive message 4 (e.g., RRCSetup or RRCResume message) from the base station in response thereto and may be aware that a random access procedure has been successful (indicated by reference numeral 2*f*-40), and may be switched to the RRC connected mode (indicated by reference numeral 2*f*-45).

In the above, through the system information (for example, SIB2), which has been received by the UE in a current cell prior to establishing a connection, if an indicator supporting frequency measurement in the RRC idle mode or the RRC inactive mode or an indicator capable of receiving a result of frequency measurement in the RRC idle mode or the RRC inactive mode is broadcasted, the UE may provide, to the base station, a notification that the UE includes a result of the frequency measurement in the RRC idle mode or the RRC inactive mode, via message 5. As another method, indicators indicating LTE frequency measurement support and NR frequency measurement support, respectively, may be defined and used.

In the case of transmitting message 5 (for example, RRC Setup Complete or RRC Resume Complete), the UE may transmit message 5 by including an indicator indicating that the UE has performed early frequency measurement in the RRC idle mode or the RRC inactive and there is a frequency measurement result to report. Message 5 may include a new indicator defined to indicate that there is a result of early frequency measurement, and may reuse an indicator indicating that there is UE information already defined in the RRC message (RRC Setup Complete or RRC Resume Complete) (indicated by reference numeral 2f-50).

If the base station identifies, via an indicator included in message 5, that the UE has performed early frequency measurement in the RRC idle mode or the RRC inactive mode and has a measurement result to report, the base station may transmit a message (UEInformationRequest) indicating to report the measurement result to the UE in order to rapidly receive a frequency measurement result report (indicated by reference numeral 2f-55). For example, the base station may request frequency measurement result information from the UE, using the UEinformationRequest through a DL-DCCH message. Upon receiving the message, the UE may rapidly report a result of early frequency measurement to the base station (UEInformationResponse, indicated by reference numeral 2f-65). For example, upon receiving the message, the UE may report through a UL-DCCH message a frequency measurement report by using a UEInformationResponse message. In the above, the frequency measurement results may include serving cell/frequency measurement results (e.g., NR-SS RSRP/RSRQ), neighbor cell/frequency measurement results of a serving cell/frequency, neighbor cell/frequency measurement results that may be measured by the UE, and cell/frequency measurement results indicated to be measured.

In the above, the conditions in which the UE stops early frequency measurement may be as follows.

1. After transmitting, to the base station, message 5 indicating that there is a measurement result to report,
2. If the measurement report timer (e.g., T331) expires,
3. If the UE is out of the area indicated in the RRC idle mode or RRC inactive mode frequency measurement area information configured in the RRCRelease message, The UE may stop frequency measurement in the RRC idle mode or the RRC inactive mode according to one or multiple conditions (indicated by reference numeral 2f-60).

In the above, the UE performs measurement on frequencies that may be measured by the UE itself, for example, frequencies that the UE itself supports, based on the fast frequency configuration-related information, and at this time, the UE may preferentially select a frequency to be measured according to a predetermined priority.

The second embodiment proposes a method for performing early frequency measurement and fast reporting in an RRC idle mode or an RRC inactive mode. The disclosure proposes a (2-1-1)-th embodiment for a detailed UE operation in a case where a UE has received the RRCRelease message with respect to the second embodiment, as follows.

In a case where the UE has received the RRCRelease message:
  If the RRCRelease message includes configuration information (measIdleConfig) for measuring frequency in the RRC idle mode or the RRC inactive mode,
    The UE initializes and clears UE-internal variables storing the RRC idle mode or the RRC inactive mode frequency measurement configuration information and UE-internal variables storing the measurement result,
  The UE stores, in the UE-internal variables (VarMeasIdleConfig) storing the measurement configuration information, a measurement period (or a timer value, measureDuration) included the RRC idle mode or RRC inactive mode frequency measurement configuration information, and
  The UE starts a timer (for example, T331) by configuring the measurement period (or a timer value) included the RRC idle mode or RRC inactive mode frequency measurement configuration information.
  If the RRC idle mode or the RRC inactive mode frequency measurement configuration information includes LTE or NR frequency measurement list or group information,
    The UE stores the LTE or NR frequency measurement list or group information in the UE-internal variables storing the RRC idle mode or the RRC inactive mode frequency measurement configuration information.
  Otherwise, if the RRC idle mode or RRC inactive mode frequency measurement configuration information does not include the LTE or the NR frequency measurement list or group information,
    If there is LTE or the NR frequency measurement list or group information broadcasted in the system information, the UE stores the RRC idle mode or RRC inactive mode frequency measurement configuration information in the UE-internal variables (for example, VarMeasIdleConfig).
    Specifically, if the UE is in the RRC idle mode or the RRC inactive mode and the system information (for example, SIB5) includes the RRC idle mode or RRC inactive mode frequency measurement configuration information (measIdleConfigSIB), and if the UE supports the frequency measurement in order to perform a carrier aggregation technology or a dual connectivity technology,
      If the timer T331 is running and there is no frequency measurement configuration information in the UE-internal variables storing the RRC idle mode or RRC inactive mode frequency measurement configuration information,
      The UE updates, stores, or replaces the frequency measurement configuration information received from the system information.
      In addition, the UE starts the frequency measurement in the RRC idle mode or the RRC inactive mode according to the embodiments of the UE operation proposed below.
  If the RRC idle mode or RRC inactive mode frequency measurement configuration information includes NR frequency measurement list or group information,
    The NR frequency measurement list or group information is stored in the UE-internal variables storing the RRC idle mode or RRC inactive mode frequency measurement configuration information.
  Otherwise, if the RRC idle mode or RRC inactive mode frequency measurement configuration information does not include the NR frequency measurement list or group information,
if there is NR frequency measurement list or group information broadcasted in the system information, the UE stores the NR frequency measurement list or group information in the UE-internal variables storing the RRC idle mode or the RRC inactive mode frequency measurement configuration information.
The UE starts frequency measurement in the RRC idle mode or the RRC inactive mode according to embodiments of the UE operation proposed below, and stores and reports the frequency measurement result.
If the UE has received the RRCRelease message and the UE is switched to the RRC idle mode,
The UE resets a MAC layer entity.
Stop all timers except T320, T322, T325, T330, and T331.
Since the disclosure operates the timer (T331) indicating a period for performing the frequency measurement in the RRC idle mode or RRC inactive mode, the timer needs to be operated in the RRC idle mode or RRC inactive mode and thus the disclosure proposes a method relating to not stopping the timer even if a state is switched.
If leaving the RRC connected mode according to a suspension indication of the RRC layer entity, that is, if the UE is switched to the RRC inactive mode, the following operation may be additionally performed.
Reestablish RLC layer entities for all SRBs and DRBs.
Save a UE context. The UE context may include an RRC configuration, a security context, PDCP configuration information, an ROHC context, a cell identifier, and the like.

The second embodiment proposes a method for performing early frequency measurement and fast reporting in an RRC idle mode or an RRC inactive mode. The disclosure proposes a (2-1-2)-th embodiment for a detailed UE operation in a case where a UE has received the RRCRelease message with respect to the second embodiment, as follows.
In a case where the UE has received the RRCRelease message:
If the RRCRelease message includes configuration information (measIdleConfig) for measuring frequency in the RRC idle mode or the RRC inactive mode,
The UE initializes and clears UE-internal variables storing the RRC idle mode or the RRC inactive mode frequency measurement configuration information and UE-internal variables storing the measurement result,
The UE stores, in the UE-internal variables (VarMeasIdleConfig) storing the measurement configuration information, a measurement period (or a timer value, measureDuration) included the RRC idle mode or RRC inactive mode frequency measurement configuration information, and
The UE starts a timer (for example, T331) by configuring the measurement period (or a timer value) included the RRC idle mode or RRC inactive mode frequency measurement configuration information.
If the RRC idle mode or the RRC inactive mode frequency measurement configuration information includes LTE or NR frequency measurement list or group information,
The UE stores the LTE or NR frequency measurement list or group information in the UE-internal variables storing the RRC idle mode or the RRC inactive mode frequency measurement configuration information.
Otherwise, if the RRC idle mode or RRC inactive mode frequency measurement configuration information does not include the LTE or the NR frequency measurement list or group information,
UE finds a suitable cell by performing a cell selection or reselection procedure, camps on the cell, and acquires system information (for example, SIB5).
If there is LTE or the NR frequency measurement list or group information broadcasted in the system information, the UE stores the same in the UE-internal variables (for example, VarMeasIdleConfig) storing the RRC idle mode or RRC inactive mode frequency measurement configuration information.
Specifically, if the UE is in the RRC idle mode or the RRC inactive mode and the system information (for example, SIB5) includes the RRC idle mode or RRC inactive mode frequency measurement configuration information (measIdleConfigSIB), and if the UE supports the frequency measurement in order to perform a carrier aggregation technology or a dual connectivity technology,
If the timer T331 is running and there is no frequency measurement configuration information in the UE-internal variables storing the RRC idle mode or RRC inactive mode frequency measurement configuration information,
The UE updates, stores, or replaces the frequency measurement configuration information received from the system information.
In addition, the UE starts the frequency measurement in the RRC idle mode or the RRC inactive mode according to the embodiments of the UE operation proposed below.
If there is no LTE or NR frequency measurement list or group information broadcasted in the system information,
The UE stops the timer (e.g., T331).
If the RRC idle mode or RRC inactive mode frequency measurement configuration information includes NR frequency measurement list or group information,
The NR frequency measurement list or group information is stored in the UE-internal variables storing the RRC idle mode or RRC inactive mode frequency measurement configuration information.
Otherwise, if the RRC idle mode or RRC inactive mode frequency measurement configuration information does not include the NR frequency measurement list or group information,
If there is NR frequency measurement list or group information broadcasted in the system information, the UE stores the NR frequency measurement list or group information in the UE-internal variables storing the RRC idle mode or the RRC inactive mode frequency measurement configuration information.

The UE starts frequency measurement in the RRC idle mode or the RRC inactive mode according to embodiments of the UE operation proposed below, and stores and reports the frequency measurement result.

If the UE has received the RRCRelease message and the UE is switched to the RRC idle mode, The UE resets a MAC layer entity.

Stop all timers except T320, T322, T325, T330, and T331.

Since the disclosure operates the timer (T331) indicating a period for performing the frequency measurement in the RRC idle mode or RRC inactive mode, the timer needs to be operated in the RRC idle mode or RRC inactive mode and thus the disclosure proposes a method relating to not stopping the timer even if a state is switched.

If leaving the RRC connected mode according to a suspension indication of the RRC layer entity, that is, if the UE is switched to the RRC inactive mode, the following operation may be additionally performed.

Reestablish RLC layer entities for all SRBs and DRBs.

Save a UE context. The UE context may include an RRC configuration, a security context, PDCP configuration information, an ROHC context, a cell identifier, and the like.

The second embodiment proposes a method for performing early frequency measurement and fast reporting in an RRC idle mode or an RRC inactive mode. The disclosure proposes a (2-1-3)-th embodiment for a detailed UE operation in a case where a UE has received the RRCRelease message with respect to the second embodiment, as follows.

In a case where the UE has received the RRCRelease message:

If the RRCRelease message includes configuration information (measIdleConfig) for measuring frequency in the RRC idle mode or the RRC inactive mode, The UE initializes and clears UE-internal variables storing the RRC idle mode or the RRC inactive mode frequency measurement configuration information and UE-internal variables storing the measurement result, The UE stores, in the UE-internal variables (VarMeasIdleConfig) storing the measurement configuration information, a measurement period (or a timer value, measureDuration) included the RRC idle mode or RRC inactive mode frequency measurement configuration information, and The UE starts a timer (for example, T331) by configuring the measurement period (or a timer value) included the RRC idle mode or RRC inactive mode frequency measurement configuration information.

If the RRC idle mode or the RRC inactive mode frequency measurement configuration information includes LTE or NR frequency measurement list or group information, The UE stores the LTE or NR frequency measurement list or group information in the UE-internal variables storing the RRC idle mode or the RRC inactive mode frequency measurement configuration information.

Otherwise, if the RRC idle mode or RRC inactive mode frequency measurement configuration information does not include the LTE or the NR frequency measurement list or group information, The UE acquires system information (e.g., SIB5) from the current cell (a suitable cell) before leaving the RRC connected mode. If system information is stored in the UE, the stored system information may be used, or new system information may be received in the current cell.

If there is LTE or the NR frequency measurement list or group information broadcasted in the system information, the UE stores the same in the UE-internal variables (for example, VarMeasIdleConfig) storing the RRC idle mode or RRC inactive mode frequency measurement configuration information.

Specifically, if the UE is in the RRC idle mode or the RRC inactive mode and the system information (for example, SIB5) includes the RRC idle mode or RRC inactive mode frequency measurement configuration information (measIdleConfigSIB), and if the UE supports the frequency measurement in order to perform a carrier aggregation technology or a dual connectivity technology, If the timer T331 is running and there is no frequency measurement configuration information in the UE-internal variables storing the RRC idle mode or RRC inactive mode frequency measurement configuration information, The UE updates, stores, or replaces the frequency measurement configuration information received from the system information.

In addition, the UE starts the frequency measurement in the RRC idle mode or the RRC inactive mode according to the embodiments of the UE operation proposed below.

If the RRC idle mode or RRC inactive mode frequency measurement configuration information includes NR frequency measurement list or group information, The NR frequency measurement list or group information is stored in the UE-internal variables storing the RRC idle mode or RRC inactive mode frequency measurement configuration information.

Otherwise, if the RRC idle mode or RRC inactive mode frequency measurement configuration information does not include the NR frequency measurement list or group information, If there is NR frequency measurement list or group information broadcasted in the system information, the UE stores the NR frequency measurement list or group information in the UE-internal variables storing the RRC idle mode or the RRC inactive mode frequency measurement configuration information.

The UE starts frequency measurement in the RRC idle mode or the RRC inactive mode according to embodiments of the UE operation proposed below, and stores and reports the frequency measurement result.

If the UE has received the RRCRelease message and the UE is switched to the RRC idle mode,
The UE resets a MAC layer entity.
Stop all timers except T320, T322, T325, T330, and T331.
Since the disclosure operates the timer (T331) indicating a period for performing the frequency measurement in the RRC idle mode or RRC inactive mode, the timer needs to be operated in the RRC idle mode or RRC inactive mode and thus the disclosure proposes a method relating to not stopping the timer even if a state is switched.
If leaving the RRC connected mode according to a suspension indication of the RRC layer entity, that is, if the UE is switched to the RRC inactive mode, the following operation may be additionally performed.
Reestablish RLC layer entities for all SRBs and DRBs.
Save a UE context. The UE context may include an RRC configuration, a security context, PDCP configuration information, an ROHC context, a cell identifier, and the like.

The second embodiment proposes a method for performing early frequency measurement and fast reporting a result of frequency measurement in an RRC idle mode or an RRC inactive mode. The disclosure proposes a (2-2)-th embodiment for a detailed UE operation of performing frequency measurement, storing, and reporting a measurement result, with respect to the second embodiment, as follows.

If a timer (the T331 timer) that permits frequency measurement in the RRC idle mode or the RRC inactive mode is running, the UE operates as follows.
If the UE-internal variables storing the RRC idle mode or RRC inactive mode frequency measurement configuration information includes the LTE frequency measurement list or group information (measIdleCarrierListEUTRA), the UE performs frequency measurements as follows, with respect to each pieces of frequency information or each entry of the LTE frequency measurement list or group.
If the UE supports a carrier aggregation technology or a dual connectivity technology with a current serving frequency (a serving carrier) and the frequency, and supports a bandwidth indicated by the frequency information,
The UE performs frequency measurement at the frequency and bandwidth indicated by the frequency information.
If cell identifier list information (e.g., a cell identifier list measCellList) for frequency measurement in the RRC idle mode or the RRC inactive mode is included or configured,
The UE considers a serving cell (or Pcell) and cells indicated in the cell identifier list, as cells capable of performing frequency measurement in the RRC idle mode or the RRC inactive mode.
Otherwise, if a cell identifier list (e.g., a cell identifier list measCellList) for frequency measurement in the RRC idle mode or the RRC inactive mode is not included or is not configured,
The UE considers a serving cell (or Pcell) and cells in which RSRP or RSRQ measurement result is greater than a configured threshold value and having the strongest signal strength, as cells capable of performing frequency measurement in the RRC idle mode or the RRC inactive mode. The base station may configure whether to select several strongest cells among the cells.
A result of the frequency measurement in the RRC idle mode or the RRC inactive mode is stored in the UE-internal variables (for example, VarMeasIdleReport). In a case where the measurement result is stored, the NR frequency measurement list or group information (measIdleCarrierListNR) or the LTE frequency measurement list or group information (measIdleCarrierListNR) may be separately stored and reported later.
Otherwise, if the UE does not support a carrier aggregation technology or a dual connectivity technology between the current serving frequency (a serving carrier) and the frequency, or does not support the bandwidth indicated by the frequency information,
The UE does not consider the RRC idle mode or the RRC inactive mode frequency measurement in the frequency information, and does not perform the frequency measurement.
If the UE-internal variables storing the RRC idle mode or RRC inactive mode frequency measurement configuration information includes an NR frequency measurement list or group information (measIdle-CarrierListNR), the UE performs frequency measurements as follows with respect to each piece of frequency information or each entry of the NR frequency measurement list or group.
If the UE supports a current serving frequency (a serving carrier) or an SSB, supports a carrier aggregation technology or a dual connectivity technology with the frequency or the SSB, and supports a bandwidth part (BWP) or a bandwidth indicated by the frequency information or SSB information,
A frequency measurement is performed at a frequency and a bandwidth or a bandwidth part or a synchronization system block (SSB, a signal for synchronizing with a base station), indicated by the frequency information.
If cell identifier list information (e.g., cell identifier list measCellList) for frequency measurement in the RRC idle mode or the RRC inactive mode is included or configured,
The UE considers a serving cell (or Pcell) and cells indicated in the cell identifier list, as cells capable of performing frequency measurement in an RRC idle mode or an RRC inactive mode.
Otherwise, if a cell identifier list (e.g., a cell identifier list measCellList) for frequency measurement in the RRC idle mode or the RRC inactive mode is not included or is not configured,
The UE considers a serving cell (or Pcell), SSBS, and cells in which RSRP or RSRQ measurement result is greater than a configured threshold value and having the strongest signal strength, as cells capable of performing frequency measurement in the RRC idle mode or the RRC inactive mode. The base station may configure whether to select several strongest cells among the cells.

A result of the frequency measurement in the RRC idle mode or the RRC inactive mode is stored in the UE-internal variables (for example, VarMeasIdleReport). In a case where the measurement result is stored, the NR frequency measurement list or group information (measIdleCarrierListNR) or the LTE frequency measurement list or group information (measIdleCarrierListNR) may be separately stored and reported later.

Otherwise, if the UE does not support a carrier aggregation technology or a dual connectivity technology between the current serving frequency (a serving carrier) and the frequency, or does not support the bandwidth indicated by the frequency information, The UE does not consider the RRC idle mode or the RRC inactive mode frequency measurement in the frequency information, and does not perform the frequency measurement.

If area information (for example, a validity area) or a cell identifier list is configured in a UE-internal variables storing the RRC idle mode or the RRC inactive mode frequency measurement configuration information, and the UE selects or camps-on cells rather than cells or an area indicated by the area information, The UE stops the timer T331 and stops frequency measurement in the RRC idle mode or the RRC inactive mode.

The second embodiment proposes a method for performing early frequency measurement and fast reporting a result of frequency measurement in an RRC idle mode or an RRC inactive mode. The disclosure proposes a (2-3)-th embodiment for a detailed operation of a UE timer, with respect to the second embodiment, as follows.

The UE operates a timer T331 for performing frequency measurement in the RRC idle mode or the RRC inactive mode, and the UE performs frequency measurement in the RRC idle mode or the RRC inactive mode only while the timer is running, and if the timer expires, the UE stops performing the frequency measurement in the RRC idle mode or the RRC inactive mode.

The UE receives configuration information for frequency measurement in the RRC idle mode or the RRC inactive mode from the RRC message and starts a timer if the measurement period is configured.

The UE may establish a connection with a network while performing frequency measurement in the RRC idle mode or the RRC inactive mode, may stop the timer if the RRCSetup message or the RRCResume message is received via message 4, or may stop the timer if area configuration information is configured and the UE selects and camps on a cell located out of the area.

If the timer expires or stops, the UE releases information of the UE-internal variables (e.g., VarMeasIdleConfig) storing the RRC idle mode or RRC inactive mode frequency measurement configuration information.

The second embodiment proposes a method for performing early frequency measurement and fast reporting in an RRC idle mode or an RRC inactive mode. The disclosure proposes a (2-4)-th embodiment for a detailed UE operation in a case where a UE has received the RRCRelease message, with respect to the second embodiment, as follows.

If the UE has received the RRCSetup message or the RRCResume message, via message 4, from the base station, the following operation may be performed.

If the system information (e.g., SIB2) broadcasts and/or includes an indicator (idle or inactive mode measurement) that supports frequency measurement in the RRC idle mode or the RRC inactive mode, and the UE includes a frequency measurement result measured in the RRC idle mode or the RRC inactive mode, The UE configures message 5 by including an indicator (idle or inactive Measavailable) that the RRCSetupComplete message or the RRCResumeComplete message includes a result of the frequency measurement in the RRC idle mode or the RRC inactive mode. Accordingly, the message may indicate that there is frequency measurement information in the RRC idle mode or the RRC inactive mode to be reported to the base station.

The UE stops the timer (e.g., T331) for the frequency measurement in the RRC idle mode or the RRC inactive mode because the frequency measurement result is to be reported.

If the UE has received a message (UE information request) requesting information of the UE from the base station, the message includes an indicator requesting the frequency measurement in the RRC idle mode or the RRC inactive mode results, and the UE includes a result of the frequency measurement in the RRC idle mode or the RRC inactive mode, The UE may include the result of frequency measurement in the RRC idle mode or the RRC inactive mode in a message (UE information response) transmitting the UE information and transmit the same, and the UE may report the frequency measurement result based on a frequency list configured in the RRC message of the base station or system information or in group units. For example, the UE may report the measurement results for the LTE frequency list group and the NR frequency list group, respectively, and the measurement results may be reported for the first NR frequency list group and the second NR frequency list group, respectively.

If the UE reports a result of the frequency measurement in the RRC idle mode or the RRC inactive mode, the UE receives a response indicating that the base station has successfully received the measurement report (HARQ ACK or RLC ACK), and discards a result of the frequency measurement in the RRC idle mode or the RRC inactive mode from the UE-internal variables.

In the disclosure, the LTE frequency list group or the NR frequency list group may be included in one configuration information and be broadcasted in the system information (SIB5). The LTE frequency list group or the NR frequency list group may be broadcasted in different system information (for example, SIB3 or SIB5 or another SIB) so that the UE may distinguish the same. In addition, the LTE frequency list group or the NR frequency list group may include intra-frequency configuration information as well as inter-frequency configuration information.

Figure 2G:
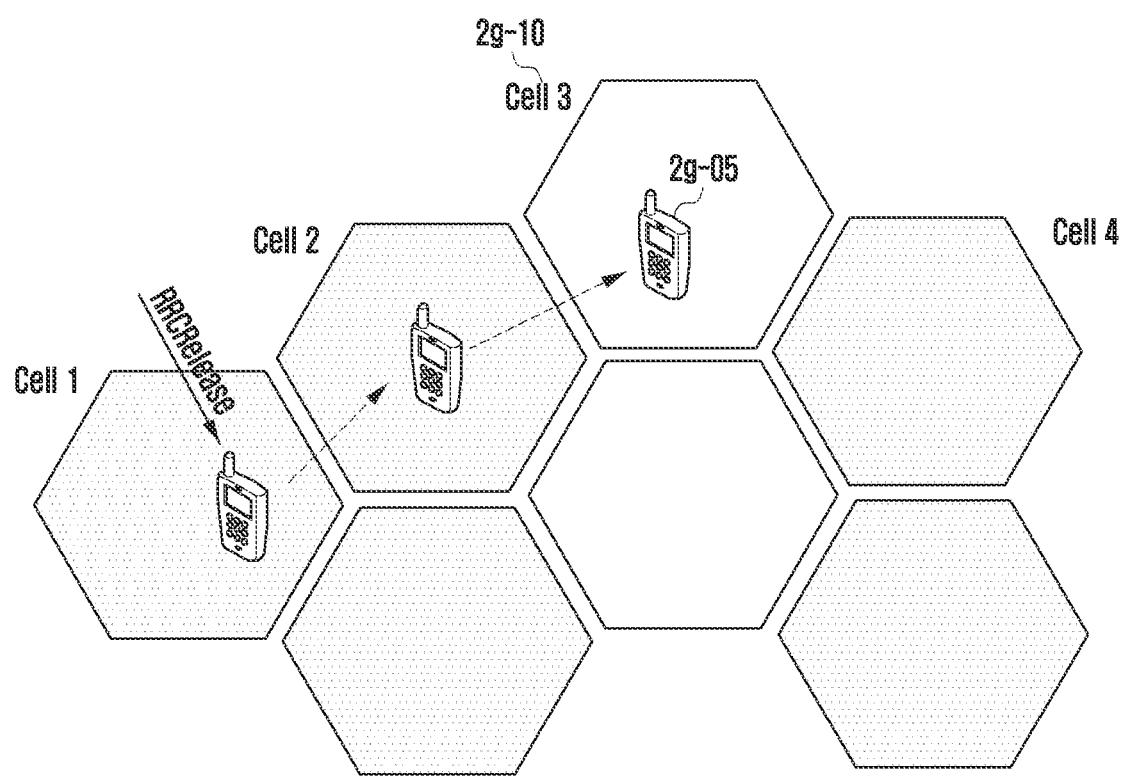
FIG. 2G illustrates a case in which unnecessary frequency measurement is performed in a case where a UE performs frequency measurement in an RRC idle mode or an RRC inactive mode according to an embodiment of the disclosure.

FIG. 2G illustrates a case in which unnecessary frequency measurement is performed if a UE performs the RRC idle mode or RRC inactive mode frequency measurement according to an embodiment of the disclosure.

Referring to FIG. 2G, if the UE receives the RRCRelease message, is switched to the RRC idle mode or the RRC inactive mode, and receives an indication to perform frequency measurement in the RRC idle mode or the RRC inactive mode, the UE may start frequency measurement if the UE starts a timer (for example, T331) and receives frequency configuration information from the RRC message or system information. However, since the RRC idle mode or the RRC inactive mode UE has mobility, the UE may move to another cell and camp thereon.

If the UE camps on a cell that does not support the RRC idle mode or RRC inactive mode frequency measurement or a cell that may not receive the RRC idle mode or RRC inactive mode frequency measurement result (indicated by reference numeral 2g-10), the UE may not receive a measure result report even if frequency measurements are taken in the RRC idle mode or in the RRC inactive mode (indicated by reference numeral 2g-05). That is, the UE battery is wasted by unnecessary frequency measurement. Therefore, in order to solve the above problem, with respect to the second embodiment, the additional UE operation based on system information is proposed as follows.

If the system information (for example, SIB2) of a cell, camped on by the UE performing the RRC idle mode or RRC inactive mode frequency measurement, indicates that the cell does not support RRC idle mode or RRC inactive mode frequency measurement or indicates that the cell may not report the RRC idle mode or RRC inactive mode frequency measurement result (a base station may not receive or does not support the frequency measurement result report), The UE may stop the timer T331 for frequency measurement in the RRC idle mode or the RRC inactive mode and stop the RRC idle mode or the RRC inactive mode frequency measurement (indicated by reference numeral 2g-15). In addition, the UE may release the RRC idle mode or RRC inactive mode frequency measurement configuration information stored in the UE.

Figure 2H:
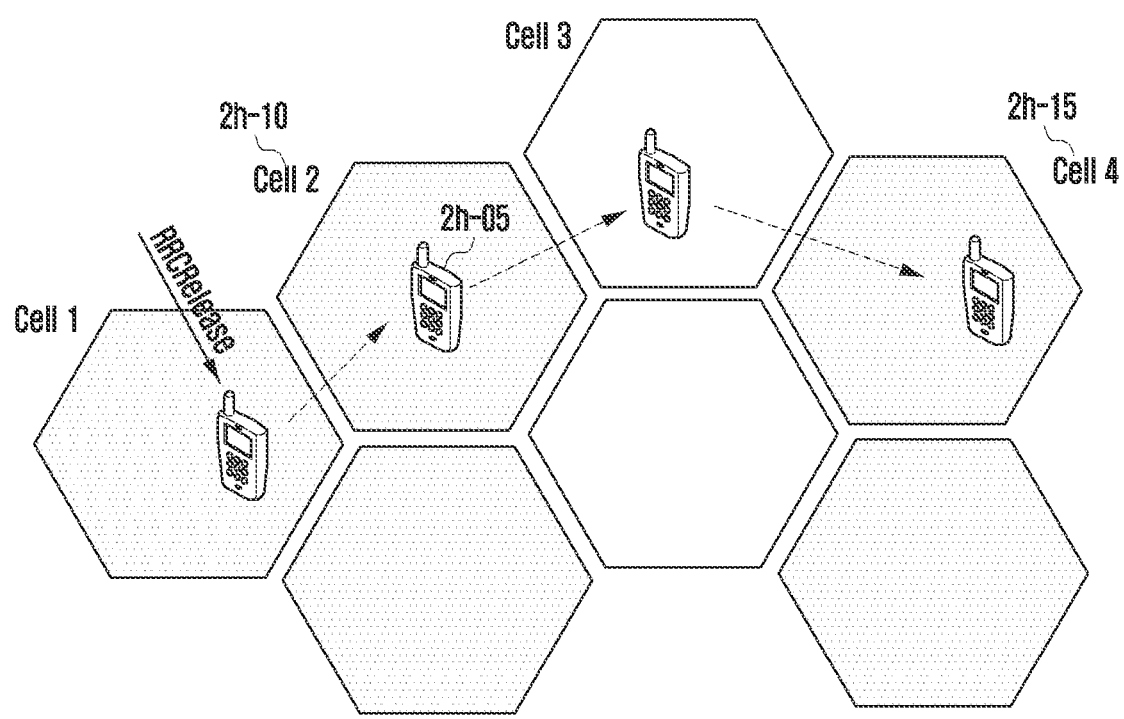
FIG. 2H illustrates a problem in which, in a case where a UE performs frequency measurement in an RRC idle mode or an RRC inactive mode, the UE reports a result of frequency measurement, measured in another cell, to a current cell according to an embodiment of the disclosure.

FIG. 2H illustrates a problem in which, in a case where a UE performs frequency measurement in an RRC idle mode or an RRC inactive mode, the UE reports a result of frequency measurement, measured in another cell, to a current cell according to an embodiment of the disclosure.

Referring to FIG. 2H, if the UE receives the RRCRelease message, is switched to the RRC idle mode or the RRC inactive mode, and receives an indication to perform frequency measurement in the RRC idle mode or the RRC inactive mode, the UE may start frequency measurement if the UE starts a timer (for example, T331) and receives frequency configuration information from the RRC message or system information. However, since the RRC idle mode or the RRC inactive mode UE has mobility, the UE may move to another cell and camp thereon (indicated by reference numeral 2h-05).

If the timer expires while the UE is performing the RRC idle mode or RRC inactive mode frequency measurement, the UE may store the measurement result. For example, the timer may expire in a cell 2h-10. If the UE moves back to camp on another cell 2h-15 and connects access, a problem may occur in which the UE reports results of measurement measured in the cell 2h-10 and a cell 2h-15. That is, because the results of measurement measured in the cell 2h-10 and the cell 2h-15 may be different from each other, the UE may report wrong information. The above problem may occur if the UE escapes from an area designated in area information configured to perform the RRC idle mode or the RRC inactive mode frequency measurement. That is, although the RRC idle mode or the RRC inactive mode frequency measurement is performed and the measurement result is stored, the UE may report the frequency measurement result from another cell outside the configured area.

Therefore, in order to solve the above problem, an additional UE operation based on system information, for the second embodiment, is proposed as follows:

If the timer T331 for frequency measurement in the RRC idle mode or the RRC inactive mode is stopped or expired (the timer may be stopped if the cell does not support the RRC idle mode or the RRC inactive mode frequency measurement or the UE is outside the configured area information, or the frequency measurement result report is completed.)

The UE may stop the RRC idle mode or RRC inactive mode frequency measurement. In addition, the RRC idle mode or RRC inactive mode frequency measurement configuration information stored in the UE may be released.

In addition, the UE may release or discard the RRC idle mode or RRC inactive mode frequency measurement result stored in the UE.

Alternatively, instead of discarding the RRC idle mode or RRC inactive mode frequency measurement result even if the timer is stopped, the UE may define time information (time stamp) and include the time information in the frequency measurement result. For example, the UE may include absolute time information in the frequency measurement result. That is, by defining a variable for recording date, time, minutes, and seconds, the base station which has received the frequency measurement information may identify the absolute time information and determine the validity of the frequency measurement result. Alternatively, the UE may include a relative time in the frequency measurement result. For example, a time difference between a time point at which the frequency is measured and the measurement result is stored and a time point at which the measurement result is reported may be reported as the relative time, and the base station may identify the relative time information and determine the validity of the frequency measurement result.

As another method, if the UE escapes from an area designated to perform the RRC idle mode or the RRC inactive mode frequency measurement configuration, which is configured in the RRCRelease message, the UE may discard the stored frequency measurement result or the stored frequency configuration information.

As another method, by identifying the system information of a cell camped-on by the UE, if the system information does not indicate to report the RRC idle mode or the RRC inactive mode frequency measurement configuration result or the system information does not broadcast the RRC idle mode or RRC inactive mode frequency measurement configuration information (for example, a frequency list to be measured), the UE may discard the frequency measurement result or the frequency configuration information, which are stored in the UE. In addition, in a case where the UE receives the RRCRelease message, if there is no RRC idle mode or RRC inactive mode frequency measurement configuration information, the UE may discard the frequency measurement result or the frequency configuration information, which are stored in the UE. For example, if one or more of the plurality of conditions are satisfied as follows, the UE may stop frequency measurement in the RRC idle mode or the RRC inactive mode or discard the frequency measurement result or the frequency configuration information, which are stored in the UE.

The UE identifies system information of the cell, which is camped-on by the UE, and determines that the system information does not indicate to report the RRC idle mode or the RRC inactive mode frequency measurement configuration result, Or the system information does not broadcast the RRC idle mode or RRC inactive mode frequency measurement configuration information (for example, a frequency list to be measured), Or in a case where the UE receives the RRCRelease message, if there is no RRC idle mode or RRC inactive mode frequency measurement configuration information, Alternatively, if the UE is out of an area designated to perform the RRC idle mode or the RRC inactive mode frequency measurement configuration, which is configured in the RRCRelease message, The UE may stop the RRC Idle mode or RRC inactive mode frequency measurement. In addition, the UE may release the RRC idle mode or RRC inactive mode frequency measurement configuration information stored in the UE.

Further, the UE may release or discard the RRC idle mode or RRC inactive mode frequency measurement result stored in the UE.

In another method, a new timer is introduced to prevent the old frequency measurement from being reported. A timer value is included and configured in the frequency measurement configuration information (early measurement configuration) for the RRC idle mode or the RRC inactive mode of the RRCRelease message. The new timer may be used to indicate a period for determining the validity of the frequency measurement result, and it may be determined that the stored frequency measurement result value is valid only if the new timer is running, and if the new timer expires, the UE may discard the stored frequency measurement result values so as not to report the message to the base station.

In addition, the new timer may be operated for each terminal, and if the timer indicating the frequency measurement period expires or if the frequency measurement is stopped, the UE may start the new timer. If the new timer expires, the UE may determine the stored frequency measurement result to be no longer valid and discarded. The UE may stop the new timer if the UE receives a request to report the frequency measurement result from the base station while the new timer is being operated or if the UE tries to include the frequency measurement result in the RRC message and transmit the RRC message to the base station.

In addition, the new timer may be operated for each frequency or cell, and the UE may start a new timer if a timer indicating the frequency measurement period expires or if the frequency measurement is stopped. Alternatively, the UE may perform frequency measurement for each cell or frequency, and may start or restart a new timer corresponding to each cell or frequency at each time a new frequency measurement result is stored for each cell or frequency. If the new timer expires, the UE may determine that the stored frequency measurement results for a frequency or a cell in which the new timer is operated are no longer valid and discard the measurement results. The UE may stop the new timer if the UE receives a request to report a frequency measurement result from the base station while the new timer is being operated or if the UE tries to include the frequency measurement result in the RRC message and transmit the RRC message to the base station.

FIG. 2I illustrates a problem in which, in a case where a UE performs frequency measurement in an RRC idle mode or an RRC inactive mode according to an embodiment of the disclosure, if the UE camps on a cell that does not support frequency measurement in the RRC idle mode or the RRC inactive mode and returns to a cell that supports the same, the UE no longer performs frequency measurement.

Referring to FIG. 2I, if the UE receives the RRCRelease message, is switched to the RRC idle mode or the RRC inactive mode, and receives an indication to perform frequency measurement in the RRC idle mode or the RRC inactive mode, the UE may start frequency measurement if the UE starts a timer (for example, T331) and receives frequency configuration information from the RRC message or system information. However, since the RRC idle mode or the RRC inactive mode UE has mobility, the UE may move to another cell and camp thereon.

UEs 2i-10 and 2i-20 may camp on a cell 2i-02 that does not support RRC idle mode or RRC inactive mode frequency measurement, or a cell 2i-03 that may not receive results of frequency measurement in the RRC idle mode or RRC inactive mode. For example, the timer may be stopped or expired in the cell 2i-03. The UE may move again to re-camp on the cell 2i-02 or 2i-04 that supports the RRC idle mode or RRC inactive mode frequency measurement.

As another example, the UEs 2i-10 and 2i-20 may camp on another cell 2i-03 out of the area information configured for the RRC idle mode or the RRC inactive mode frequency measurement. The UE may move again and return to the area configuration information to camp on.

If the UE performing the RRC idle mode or RRC inactive mode frequency measurement as described above camps on a cell that does not support the RRC idle mode or RRC inactive mode frequency measurement, or escapes from an area designated in area information configured to perform the RRC idle mode or the RRC inactive mode frequency measurement, if the timer expires, the RRC idle mode or the RRC inactive mode frequency measurement is stopped and is not restarted. If the UE has high mobility, there may be no benefit in the RRC idle mode or the RRC inactive mode frequency measurement proposed in the disclosure.

Therefore, in order to solve the above problem, an additional UE operation based on the system information, for the second embodiment, is proposed as follows.

If the timer T331 for frequency measurement in the RRC idle mode or the RRC inactive mode is stopped or expired (that is, the timer is not running), and the system information of a cell, camped on by the UE, indicates that the cell supports the RRC idle mode or RRC inactive mode frequency measurement, Alternatively, if the timer T331 for frequency measurement in the RRC idle mode or the RRC inactive mode is stopped or expired (i.e., the timer is not running), and if the UE re-camps on a cell included in the area configuration information for the RRC idle mode or the RRC inactive mode frequency measurement, The UE receives or acquires frequency measurement configuration information for frequency measurement in the RRC idle mode or the RRC inactive mode from system information (e.g., SIB5) of a cell camped-on by the UE, and stores the same.

The UE starts a timer T331 for frequency measurement in the RRC idle mode or the RRC inactive mode.

The UE may perform the RRC idle mode or RRC inactive mode frequency measurement according to the frequency measurement configuration information.

Alternatively, even if the timer is running, if a predetermined condition as the following operation is satisfied, the timer may be restarted to extend an RRC idle mode or the RRC inactive mode frequency measurement time.

If the system information of a cell, camped-on by the UE, indicates that the cell supports the RRC idle mode or RRC inactive mode frequency measurement, Alternatively, if the UE camps on a cell included in area configuration information for frequency measurement in the RRC idle mode or the RRC inactive mode, In the case of not configuring the frequency measurement configuration information through the RRCRelease message or in the case of configuring the frequency measurement configuration information through the RRCRelease message but the timer expires, The UE receives or acquires frequency measurement configuration information for frequency measurement in the RRC idle mode or the RRC inactive mode from the system information (e.g., SIB5) of a cell, camped-on by the UE, and stores the same.

The UE starts or restarts the timer T331 for frequency measurement in the RRC idle mode or the RRC inactive mode.

The RRC idle mode or RRC inactive mode frequency measurement is performed according to the frequency measurement configuration information.

Alternatively, in the case of configuring, in the UE, area configuration information (configuration information for an area in which the frequency measurement configuration is valid) among configuration information for the RRC idle mode or the RRC inactive mode frequency measurement through the RRCRelease message, the RRC idle mode or the RRC inactive mode frequency measurement may be stopped or restarted while the timer indicating the frequency measurement period is running (if the timer does not expire) based on the system information of a cell identifier or the cell, which is camped on by the UE. In more detail, the UE in the RRC idle mode or RRC inactive mode moves while performing a cell selection or reselection procedure and camps on a serving cell, and if a physical cell identity of the serving cell, camped-on by the UE, is included in the area configuration information, the UE may continuously perform frequency measurement and continuously operating a timer for indicating a period of frequency measurement. However, if the RRC idle mode or RRC inactive mode UE moves and camps on a serving cell while performing a cell selection or reselection procedure, and if a physical cell identity of the serving cell, camped-on by the UE, is not included in the area configuration information, the UE may stop frequency measurement, continuously operate a timer for indicating a period of frequency measurement, and maintain the frequency measurement configuration information configured in the RRC message (if frequency measurement information (or a frequency measurement list) has been configured in the RRC message). If the UE reselects a cell having a cell identifier included in the area configuration information and re-camps on the cell, the UE restart the frequency measurement while the timer is running (if the timer has not expired). The frequency measurement configuration information may be released or discarded if the timer indicating the frequency measurement period expires.

1> If the UE indicates that system information of a cell, camped-on by the UE, supports RRC idle mode or RRC inactive mode frequency measurement, or if a timer for frequency measurement is running (if the timer for frequency measurement has not expired), 1> Alternatively, if the UE camps on a cell having a frequency or cell identifier included in the area configuration information (configuration information configured in the RRC message (e.g., RRCRelease)) for frequency measurement in the RRC idle mode or the RRC inactive mode, or if the timer for frequency measurement is running (if the timer for frequency measurement has not expired), 2> If the base station has not configured the frequency measurement configuration information in the RRCRelease message or if the UE does not receive the frequency measurement configuration (or frequency measurement list) through the RRCRelease message, 3> The UE receives or acquires frequency measurement configuration information for the RRC idle mode or the RRC inactive mode frequency measurement in system information (e.g., SIB5) of a cell, camped-on by the UE, and stores the same.

3> The UE performs or restarts the RRC idle mode or RRC inactive mode frequency measurement according to the frequency measurement configuration information.

2> If the base station has configured the frequency measurement configuration information in the RRCRelease message or if the UE receives the frequency measurement configuration (or a frequency measurement list) through the RRCRelease message or if the timer for frequency measurement is running (if the timer frequency measurement has not expired), 3> RRC idle mode or RRC inactive mode frequency measurement is performed or restarted according to the frequency measurement configuration information configured in the RRCRelease message.

1> If the UE does not indicate that system information of a cell, camped-on by the UE, supports RRC idle mode or RRC inactive mode frequency measurement, or if a timer for frequency measurement is running (if the timer for frequency measurement has not expired), 1> Alternatively, if the UE camps or re-camps on a cell having a frequency or cell identifier, which is not included in the area configuration information (configuration information configured in the RRC message (e.g., RRCRelease)) for the RRC idle mode or the RRC inactive mode frequency measurement, or if the timer for frequency measurement is running (if the timer for frequency measurement has not expired), The UE stops frequency measurement for the RRC idle mode or the RRC inactive mode.

(The timer indicating the frequency measurement period is continuously running).

Figure 2J:
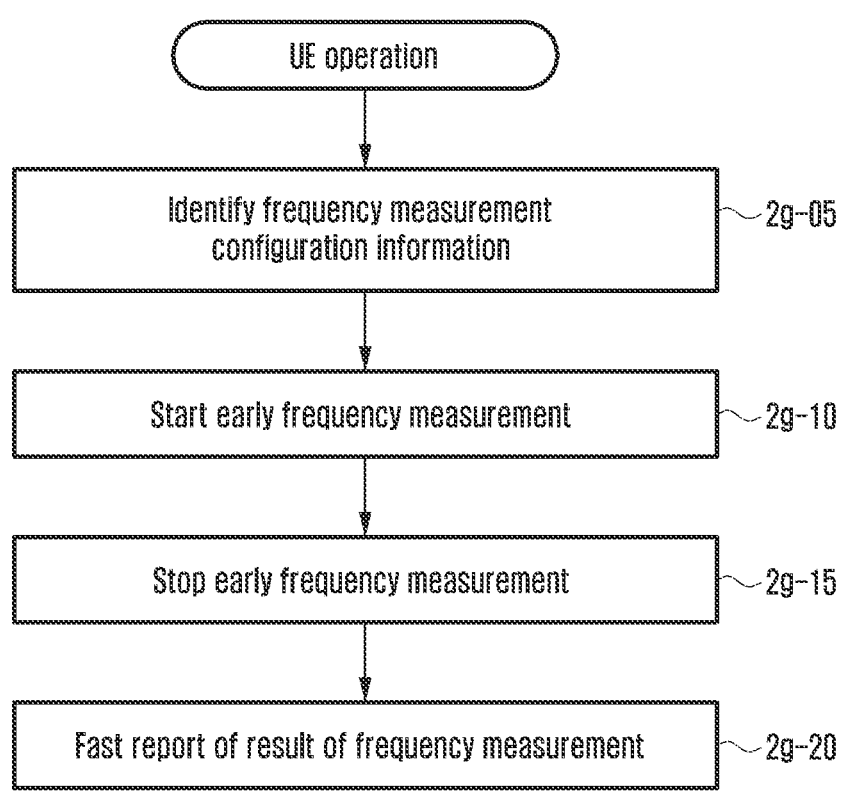
FIG. 2J illustrates a UE operation of performing frequency measurement in an RRC idle mode or RRC inactive mode and reporting a result of frequency measurement according to an embodiment of the disclosure.

FIG. 2J illustrates a UE operation of performing frequency measurement in an RRC idle mode or RRC inactive mode and reporting a result of frequency measurement according to an embodiment of the disclosure.

Referring to FIG. 2J, upon receiving an RRC message, the UE operates a timer for frequency measurement in the RRC idle mode or the RRC inactive mode, and if the RRC message includes frequency measurement configuration information for frequency measurement in an RRC idle mode or an RRC inactive mode (indicated by reference numeral 2*j*-05), the UE performs frequency measurement in the RRC idle mode or the RRC inactive mode based on the information (indicated by reference numeral 2*j*-10). If the RRC message does not include frequency measurement configuration information for frequency measurement in the RRC idle mode or the RRC inactive mode, the UE may receive frequency information from the system information (indicated by reference numeral 2*j*-05) to perform frequency measurement in the RRC idle mode or the RRC inactive mode (indicated by reference numeral 2*j*-10). If the UE performs frequency measurement, the UE stores the measurement result, and if system information of a cell that has established a connection with a network includes an indicator indicating to support the frequency measurement in the RRC idle mode or the RRC inactive mode, the UE receives message 4 at the time of establishing a connection to a network and stops the timer (indicated by reference numeral 2*j*-15) and may notify that message 5 includes a result of the frequency measurement in the RRC idle mode or the RRC inactive mode. In addition, if the base station requests a result of the frequency measurement in the RRC idle mode or the RRC inactive mode, the UE reports the measurement result to the base station (indicated by reference numeral 2*j*-20), and if the measurement result is successfully reported, the UE discards the measurement result.

Figure 2K:
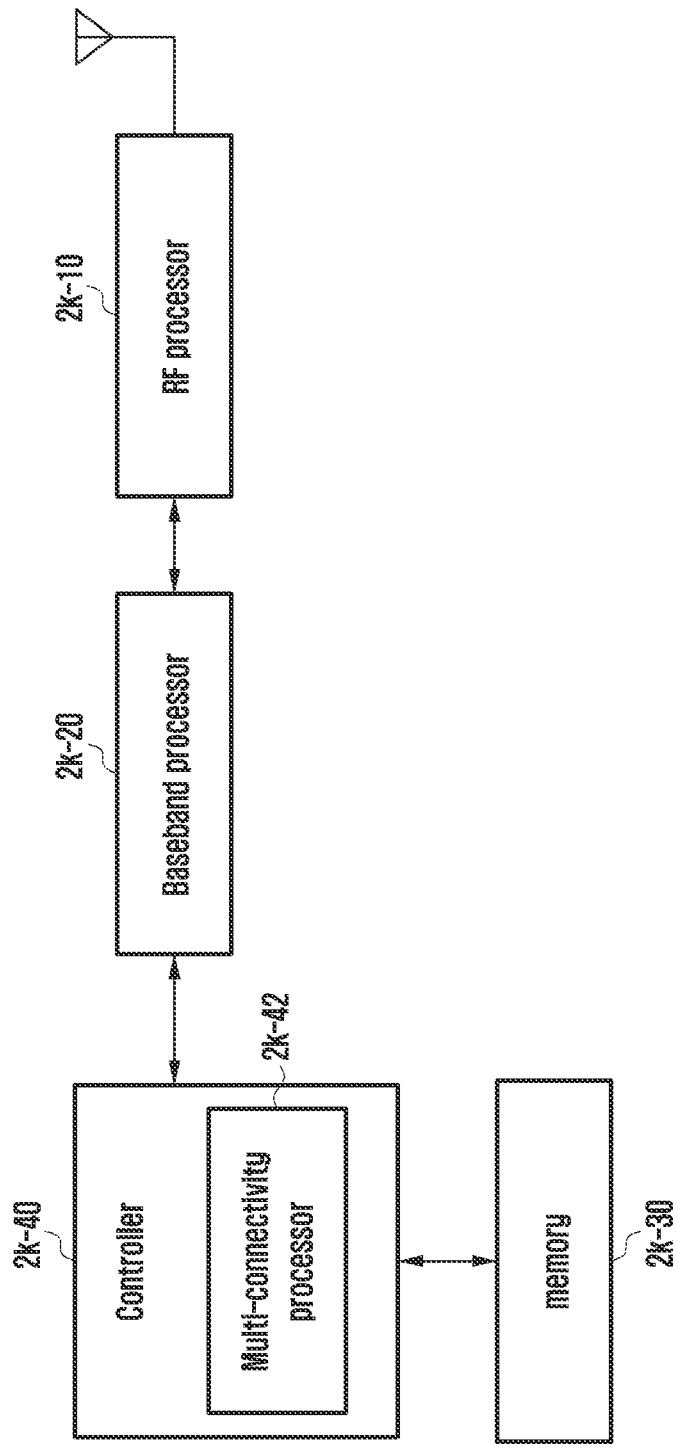
FIG. 2K illustrates a structure of a UE according to an embodiment of the disclosure.

FIG. 2K illustrates a structure of a UE according to an embodiment of the disclosure.

Referring to FIG. 2K, the UE includes a radio frequency (RF) processor 2*k*-10, a baseband processor 2*k*-20, a storage unit (memory) 2*k*-30, and a controller 2*k*-40.

The RF processor 2*k*-10 performs a function for transmitting or receiving a signal through a radio channel, such as band conversion and amplification of a signal. That is, the RF processor 2*k*-10 up-converts a baseband signal provided from the baseband processor 2*k*-20 into an RF band signal and transmits the same through an antenna, and down-converts a RF band signal, received through the antenna, to a baseband signal. For example, the RF processor 2*k*-10 may include a transmission filter, a reception filter, an amplifier, a mixer, an oscillator, a digital to analog converter (DAC), an analog to digital converter (ADC), and the like. In FIG. 2K, only one antenna is shown, but the UE may include a plurality of antennas. In addition, the RF processor 2*k*-10 may include a plurality of RF chains. Moreover, the RF processor 2*k*-10 may perform beamforming. For the beamforming, the RF processor 2*k*-10 may control a phase and a size of each signal transmitted or received through a multiple of antennas or antenna elements. In addition, the RF processor may perform MIMO, and may receive multiple layers in the case of performing the MIMO operation. The RF processor 2*k*-10 may perform reception beam sweeping by appropriately configuring a plurality of antennas or antenna elements under the control of the controller, or may adjust a direction and a beam width of the reception beam so that the reception beam is coordinated with the transmission beam.

The baseband processor 2*k*-20 performs a function for a conversion between a baseband signal and a bit stream according to a physical layer standard of the system. For example, if data is transmitted, the baseband processor 2*k*-20 generates complex symbols by encoding and modulating a transmission bit stream. In addition, if data is received, the baseband processor 2*k*-20 reconstructs the received bit string by demodulating and decoding the baseband signal provided from the RF processor 2*k*-10. For example, in an OFDM scheme, if data is transmitted, the baseband processor 2*k*-20 generates complex symbols by encoding and modulating a transmission bit stream, mapping the complex symbols to subcarriers, and then configures OFDM symbols through an IFFT operation and a cyclic prefix (CP) insertion. Further, if data is received, the baseband processor 2*k*-20 divides the baseband signal provided from the RF processor 2*k*-10 in units of OFDM symbols, reconstructs the signals mapped to the subcarriers through an FFT operation, and then reconstructs a reception bit stream through demodulation and decoding.

The baseband processor 2*k*-20 and the RF processor 2*k*-10 transmit and receive signals as described above. Accordingly, the baseband processor 2*k*-20 and the RF processor 2*k*-10 may be referred to as a transmitter, a receiver, a transceiver, or a communication unit. Furthermore, at least one of the baseband processor 2*k*-20 and the RF processor 2*k*-10 may include a plurality of communication modules to support different radio access technologies. In addition, at least one of the baseband processor 2*k*-20 and the RF processor 2*k*-10 may include different communication modules to process signals of different frequency bands. For example, the different radio access technologies may include an LTE network, an NR network, and the like. Further, the different frequency bands may include a super high frequency (SHF) (for example, 2.5 GHz and 5 GHz) band and a millimeter (mm) wave (for example, 60 GHz) band.

The storage unit 2*k*-30 stores data, such as a basic program, an application program, and configuration information for the operation of the UE. The storage unit 2*k*-30 provides stored data at the request of the controller 2*k*-40.

The controller 2*k*-40 controls overall operations of the UE. For example, the controller 2*k*-40 transmits or receives a signal through the baseband processor 2*k*-20 and the RF processor 2*k*-10. In addition, the controller 2*k*-40 records and reads data in and from the storage unit 2*k*-30. To this end, the controller 2*k*-40 may include at least one processor. For example, the controller 2*k*-40 may include a communication processor (CP) for performing a control for communication, and an application processor (AP) for controlling a higher layer such as an application program. The controller 2*k*-40 may further include a multi-connectivity processor 2*k*-42 for supporting multi-connection.

Figure 2L:
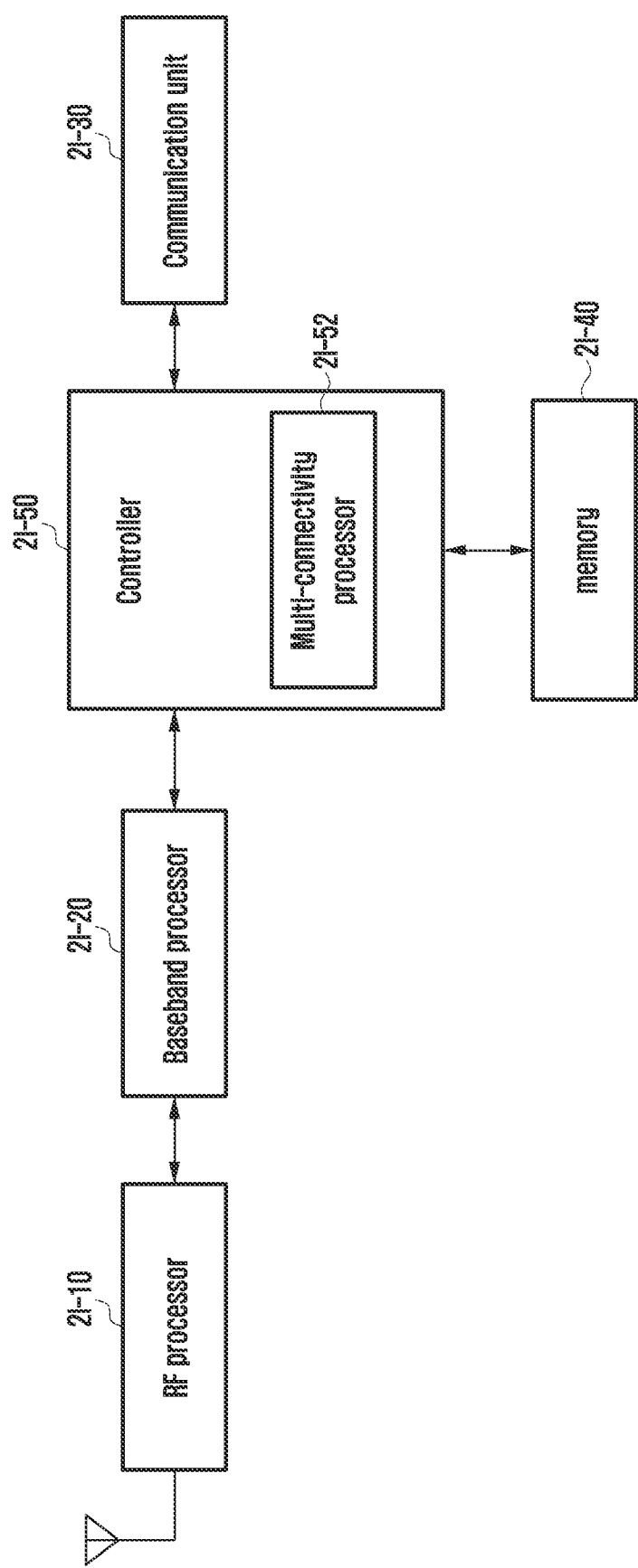
FIG. 2L illustrates a block configuration of a TRP in a wireless communication system according to an embodiment of the disclosure.

FIG. 2L illustrates a block configuration of a TRP in a wireless communication system according to an embodiment of the disclosure.

Referring to FIG. 2L, the base station includes an RF processor 2*l*-10, a baseband processor 2*l*-20, a backhaul communication unit 2*l*-30, a storage unit (memory) 2*l*-40, and a controller 2*l*-50.

The RF processor 2*l*-10 performs a function for transmitting or receiving a signal through a radio channel, such as band conversion and amplification of a signal. That is, the RF processor 2*l*-10 up-converts a baseband signal provided from the baseband processor 2*l*-20 into an RF band signal and then transmits the converted signal through an antenna, and down-converts an RF band signal received through the antenna into a baseband signal. For example, the RF processor 2*l*-10 may include a transmission filter, a reception filter, an amplifier, a mixer, an oscillator, a DAC, and an ADC. In FIG. 2L, only one antenna is shown, but the first access node may include a plurality of antennas. In addition, the RF processor 2*l*-10 may include a plurality of RF chains. In addition, the RF processor 2*l*-10 may perform beamforming. For the beamforming, the RF processor 2*l*-10 may control a phase and a size of each of the signals transmitted or received through a multiple of antennas or antenna elements. The RF processor may perform a downlink MIMO operation by transmitting one or more layers.

The baseband processor 2*l*-20 performs a function of a conversion between the baseband signal and the bit string according to the physical layer standard of the first radio access technology. For example, if data is transmitted, the baseband processor 2*l*-20 generates complex symbols by encoding and modulating a transmission bit stream. In addition, if data is received, the baseband processor 2l-20 reconstructs the received bit string by demodulating and decoding the baseband signal provided from the RF processor 2l-10. For example, in an OFDM scheme, if data is transmitted, the baseband processor 2l-20 may generate complex symbols by encoding and modulating the transmission bit stream, map the complex symbols to subcarriers, and then configure OFDM symbols through an IFFT operation and CP insertion. In addition, if data is received, the baseband processor 2l-20 divides the baseband signal provided from the RF processor 2l-10 in units of OFDM symbols, reconstructs the signals mapped to the subcarriers through an FFT operation, and then reconstructs a reception bit stream through demodulation and decoding. The baseband processor 2l-20 and the RF processor 2l-10 transmit and receive signals as described above. Accordingly, the baseband processor 2l-20 and the RF processor 2l-10 may be referred to as a transmitter, a receiver, a transceiver, a communication unit, or a wireless communication unit.

The communication unit 2l-30 provides an interface for communicating with other nodes in the network.

The storage unit 2l-40 stores data, such as a basic program, an application program, and configuration information for the operation of the main base station. In particular, the storage unit 2l-40 may store information on a bearer allocated to a connected terminal, a measurement result reported from the connected terminal, and the like. In addition, the storage unit 2l-40 may store information that is a criterion for determining whether to provide or terminate multi-connection to the terminal. The storage unit 2l-40 provides stored data at the request of the controller 2l-50.

The controller 2l-50 controls the overall operations of the main base station. For example, the controller 2l-50 transmits or receives a signal through the baseband processor 2l-20 and the RF processor 2l-10 or through a backhaul communication unit 2l-30. In addition, the controller 2l-50 records and reads data in and from the storage unit 2l-40. To this end, the controller 2l-50 may include at least one processor. The controller 2l-50 may further include a multi-connectivity processor 2l-52 for supporting multi-connection.

The above embodiments may be implemented separately and in combination. Further, it will be apparent that not only the respective embodiments may be combined with each other, but also all or a part of one embodiment may be combined with all or a part of one or more other embodiments.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a wireless communication system, the method comprising:
   receiving a radio resource control (RRC) release message including a measurement configuration for an RRC inactive-state;
   receiving, from a base station, first system information associated with an RRC inactive measurement; and
   in case that neither first information on a list of carriers for a first radio access technology (RAT) to be measured during the RRC inactive nor second information on a list of carriers for a second RAT to be measured during the RRC inactive is included in the measurement configuration,
   performing, based on third information on a list of carriers for the first RAT and fourth information on a list of carriers for the second RAT included in the first system information, a measurement for the list of carriers for the first RAT in the third information and the list of carriers for the second RAT in the fourth information while the UE is in the RRC inactive,
   wherein the first RAT corresponds to an evolved universal mobile telecommunications system terrestrial radio access (EUTRA), and the second RAT corresponds to a new radio (NR).

2. The method of claim 1, further comprising:
   in case that the measurement configuration includes at least one of the first information or the second information, performing, based on at least one of the first information or the second information, a measurement for at least one of the list of carriers for the first RAT in the first information or the list of carriers for the second RAT in the second information while the UE is in the RRC inactive.

3. The method of claim 1, further comprising:
   transmitting, to the base station, an RRC resume complete message including information indicating that the UE has available measurement information;
   receiving, from the base station, a UE information request message requesting the available measurement information; and
   transmitting, to the base station, a UE information response message including a result of the measurement performed while the UE is in the RRC inactive,
   wherein the result of the measurement includes at least one of a first result for the list of carriers for the first RAT or a second result for the list of carriers for the second RAT.

4. The method of claim 1, wherein the measurement is performed, in case that a second system information received from the base station includes information indicating the UE to perform the measurement and report a result of the measurement.

5. The method of claim 1,
   wherein the RRC release message further includes measurement duration information, validity area information, and threshold information,
   wherein a T331 timer is started based on a value of the measurement duration information, and
   wherein the measurement is performed during the T331 timer is running.

6. A method performed by a base station in a wireless communication system, the method comprising:
   transmitting a first system information associated with a radio resource control (RRC) inactive measurement;
   receiving, from a user equipment (UE) which received an RRC release message including a measurement configuration for an RRC inactive, a random access preamble;
   transmitting, to the UE, a random access response based on the random access preamble;
   receiving, from the UE, an RRC resume request message based on the random access response;
   transmitting, to the UE, an RRC resume message based on the RRC resume request message; and
   receiving, from the UE, an RRC resume complete message including information indicating that the UE has available measurement information,
   wherein, in case that neither first information on a list of carriers for a first radio access technology (RAT) to be measured during the RRC inactive nor second information on a list of carriers for a second RAT to be measured during the RRC inactive is included in the measurement configuration, a measurement, based on third information on a list of carriers for the first RAT and fourth information on a list of carriers for the second RAT included in the first system information, for the list of carriers for the first RAT in the third information and the list of carriers for the second RAT in the fourth information is performed while the UE is in the RRC inactive, and wherein the first RAT corresponds to an evolved universal mobile telecommunications system terrestrial radio access (EUTRA), and the second RAT corresponds to a new radio (NR).

7. The method of claim 6, wherein, in case that the measurement configuration includes at least one of the first information or the second information, the measurement, based on at least one of the first information or the second information, for at least one of the list of carriers for the first RAT in the first information or the list of carriers for the second RAT in the second information is performed while the UE is in the RRC inactive.

8. The method of claim 6, further comprising:
transmitting, to the UE, a UE information request message requesting the available measurement information based on the information indicating that the UE has available measurement information; and
receiving, from the UE, a UE information response message including a result of the measurement performed while the UE is in the RRC inactive,
wherein the result of the measurement includes at least one of a first result for the list of carriers for the first RAT or a second result for the list of carriers for the second RAT.

9. The method of claim 6, wherein the measurement is performed, in case that a second system information includes information indicating the UE to perform the measurement and report a result of the measurement.

10. The method of claim 6,
wherein the RRC release message further includes measurement duration information, validity area information, and threshold information,
wherein a T331 timer is started based on a value of the measurement duration information, and
wherein the measurement is performed during the T331 timer is running.

11. A user equipment (UE) in a wireless communication system, the UE comprising:
a transceiver; and
a controller configured to:
receive a radio resource control (RRC) release message including a measurement configuration for an RRC inactive,
receive, from a base station, first system information associated with an RRC inactive measurement, and
in case that neither first information on a list of carriers for a first radio access technology (RAT) to be measured during the RRC inactive nor second information on a list of carriers for a second RAT to be measured during the RRC inactive is included in the measurement configuration, perform, based on third information on a list of carriers for the first RAT and fourth information on a list of carriers for the second RAT included in the first system information, a measurement for the list of carriers for the first RAT in the third information and the list of carriers for the second RAT in the fourth information while the UE is in the RRC inactive, wherein the first RAT corresponds to an evolved universal mobile telecommunications system terrestrial radio access (EUTRA), and the second RAT corresponds to a new radio (NR).

12. The UE of claim 11, wherein, in case that the measurement configuration includes at least one of the first information or the second information, the controller is configured to perform, based on at least one of the first information or the second information, a measurement for at least one of the list of carriers for the first RAT in the first information or the list of carriers for the second RAT in the second information while the UE is in the RRC inactive.

13. The UE of claim 11, wherein the controller is further configured to:
transmit, to the base station, an RRC resume complete message including information indicating that the UE has available measurement information,
receive, from the base station, a UE information request message requesting the available measurement information, and
transmit, to the base station, a UE information response message including a result of the measurement performed while the UE is in the RRC inactive,
wherein the result of the measurement includes at least one of a first result for the list of carriers for the first RAT or a second result for the list of carriers for the second RAT.

14. The UE of claim 11, wherein the measurement is performed, in case that a second system information received from the base station includes information indicating the UE to perform the measurement and report a result of the measurement.

15. The UE of claim 11,
wherein the RRC release message further includes measurement duration information, validity area information, and threshold information,
wherein a T331 timer is started based on a value of the measurement duration information, and
wherein the measurement is performed during the T331 timer is running.

16. A base station in a wireless communication system, the base station comprising:
a transceiver; and
a controller configured to:
transmit a first system information associated with a radio resource control (RRC) inactive measurement,
receive, from a user equipment (UE) which received an RRC release message including a measurement configuration for an RRC inactive, a random access preamble,
transmit, to the UE, a random access response based on the random access preamble,
receive, from the UE, an RRC resume request message based on the random access response,
transmit, to the UE, an RRC resume message based on the RRC resume request message, and
receive, from the UE, an RRC resume complete message including information indicating that the UE has available measurement information,
wherein, in case that neither first information on a list of carriers for a first radio access technology (RAT) to be measured during the RRC inactive nor second information on a list of carriers for a second RAT to be measured during the RRC inactive is included in the measurement configuration, a measurement, based on third information on a list of carriers for the first RAT and fourth information on a list of carriers for the second RAT included in the first system information, for the list of carriers for the first RAT in the third information and the list of carriers for the second RAT in the fourth information is performed while the UE is in the RRC inactive, and wherein the first RAT corresponds to an evolved universal mobile telecommunications system terrestrial radio access (EUTRA), and the second RAT corresponds to a new radio (NR).

17. The base station of claim 16, wherein, in case that the measurement configuration includes at least one of the first information or the second information, the measurement, based on at least one of the first information or the second information, for at least one of the list of carriers for the first RAT in the first information or the list of carriers for the second RAT in the second information is performed while the UE is in the RRC inactive.

18. The base station of claim 16, wherein the controller is further configured to:

transmit, to the UE, a UE information request message requesting the available measurement information based on the information indicating that the UE has available measurement information, and receive, from the UE, a UE information response message including a result of the measurement performed while the UE is in the RRC inactive, wherein the result of the measurement includes at least one of a first result for the list of carriers for the first RAT or a second result for the list of carriers for the second RAT.

19. The base station of claim 16, wherein the measurement is performed, in case that a second system information includes information indicating the UE to perform the measurement and report a result of the measurement.

20. The base station of claim 16, wherein the RRC release message further includes measurement duration information, validity area information, and threshold information, wherein a T331 timer is started based on a value of the measurement duration information, and wherein the measurement is performed during the T331 timer is running.

* * * * *